US008998498B2

(12) United States Patent
Mizuki et al.

(10) Patent No.: US 8,998,498 B2
(45) Date of Patent: Apr. 7, 2015

(54) TAPERED ROLLER BEARING AND MANUFACTURING METHOD FOR RETAINER OF TAPERED ROLLER BEARING

(75) Inventors: Hironori Mizuki, Fujisawa (JP); Yasuhiro Ishimori, Fujisawa (JP); Masahiro Kita, Fujisawa (JP); Hiroki Maejima, Fujisawa (JP); Kinji Yukawa, Fujisawa (JP); Tomoharu Saito, Fujisawa (JP); Yingyi Wen, Fujisawa (JP)

(73) Assignee: NSK Ltd., Tokyo (JP)

( * ) Notice: Subject to any disclaimer, the term of this patent is extended or adjusted under 35 U.S.C. 154(b) by 77 days.

(21) Appl. No.: 13/510,531

(22) PCT Filed: Nov. 17, 2010

(86) PCT No.: PCT/JP2010/070477
§ 371 (c)(1),
(2), (4) Date: Jun. 18, 2012

(87) PCT Pub. No.: WO2011/062188
PCT Pub. Date: May 26, 2011

(65) Prior Publication Data
US 2012/0263405 A1    Oct. 18, 2012

(30) Foreign Application Priority Data

Nov. 17, 2009   (JP) .................................. 2009-261470
Apr. 22, 2010   (JP) .................................. 2010-098588
Sep. 23, 2010   (JP) .................................. 2010-212904
Sep. 23, 2010   (JP) .................................. 2010-212905
Oct.  1, 2010   (JP) .................................. 2010-223638
Nov.  9, 2010   (JP) .................................. 2010-250480
Nov. 12, 2010   (JP) .................................. 2010-253468
Nov. 12, 2010   (JP) .................................. 2010-253469

(51) Int. Cl.
*F16C 19/00*      (2006.01)
*F16C 33/48*      (2006.01)
(Continued)

(52) U.S. Cl.
CPC ......... *F16C 33/4635* (2013.01); *F16C 33/4682* (2013.01); *F16C 33/6681* (2013.01); *F16C 19/364* (2013.01)

(58) Field of Classification Search
CPC ............... F16C 33/4635; F16C 33/467; F16C 33/4682; F16C 33/6681; F16C 33/3887; F16C 19/364; F16C 3/46; F16C 33/1617; F16C 33/4623; F16C 33/4629
USPC .......................... 384/462, 466, 470, 572, 576
See application file for complete search history.

(56) References Cited

U.S. PATENT DOCUMENTS 1,232,523 A  *  7/1917  Folk ............................... 384/580
2,219,031 A  * 10/1940  Frauenthal et al. ........... 384/572
(Continued)

FOREIGN PATENT DOCUMENTS

DE    102004031027 A1 *  1/2006
DE    102009039719 A1 *  3/2011
(Continued)

OTHER PUBLICATIONS

Japanese translation of Korean Office Action dated Oct. 14, 2013 (eight (8) pages).
(Continued)

*Primary Examiner* — Alan B Waits
(74) *Attorney, Agent, or Firm* — Crowell & Moring LLP

(57) ABSTRACT

A tapered roller bearing improves durability during a state of insufficient lubrication by sufficiently lengthening the time until rotation becomes impossible due to seizure. Oil retaining concave sections, recessed outward in the radial direction, are formed in portions on the inner circumferential surface of a large-diameter rim section of the retainer whose phase in the circumferential direction coincides with the pockets. A portion of the bottom surface of each of the oil retaining concave sections, open to the inside surface of the pocket, face a concave section formed in an end surface on the large-diameter side of tapered roller that is held inside the pocket. When lubrication becomes insufficient, oil remaining in the concave sections is effectively used for lubricating areas of sliding contact between the end surfaces on the large-diameter side and the inside surface in the axial direction of a large-diameter side flange section.

10 Claims, 42 Drawing Sheets

(51) Int. Cl.
    *F16C 33/56*   (2006.01)
    *F16C 33/46*   (2006.01)
    *F16C 33/66*   (2006.01)
    *F16C 19/36*   (2006.01)

(56) References Cited

U.S. PATENT DOCUMENTS

| | | | |
|---|---|---|---|
| 4,425,011 A * | 1/1984 | Cunningham et al. | 384/571 |
| 5,391,005 A * | 2/1995 | Alling | 384/575 |
| 6,206,576 B1 * | 3/2001 | Wiehl | 384/575 |
| 8,596,877 B2 * | 12/2013 | Kanbori et al. | 384/571 |
| 2011/0142389 A1 * | 6/2011 | Takeuchi et al. | 384/572 |
| 2013/0004113 A1 * | 1/2013 | Ueno | 384/576 |

FOREIGN PATENT DOCUMENTS

| | | | |
|---|---|---|---|
| JP | 61-188026 U | | 11/1986 |
| JP | 62-98029 A | | 5/1987 |
| JP | 6-48011 B2 | | 6/1994 |
| JP | 2006-329260 A | | 12/2006 |
| JP | 2007-40512 A | | 2/2007 |
| JP | 2007-270851 A | | 10/2007 |
| JP | 2008-240900 A | | 10/2008 |
| JP | 2009-52657 A | | 3/2009 |
| JP | 2010-174918 A | | 8/2010 |

OTHER PUBLICATIONS

Mechanical English translation of JP 2007-40512 A, previously cited and filed as B1 in the Information Disclosure Statement filed on May 17, 2012 (eleven (11) pages).

Mechanical English translation of JP 2007-270851 A, previously cited and filed as B2 in the Information Disclosure Statement filed on May 17, 2012 (five (5) pages).

Mechanical English translation of JP 2008-240900 A, previously cited and filed as B3 in the Information Disclosure Statement filed on May 17, 2012 (nine (9) pages).

Mechanical English translation of JP 2009-52657 A, previously cited and filed as B4 in the Information Disclosure Statement filed on May 17, 2012 (twelve (12) pages).

Mechanical English translation of JP 2006-329260 A, previously cited and filed as B6 in the Information Disclosure Statement filed on May 17, 2012 (eleven (11) pages).

International Search Report dated Feb. 22, 2011 including English-language translation (Six (6) pages).

Japanese Office Action dated Aug. 4, 2014, including partial English translation (three (3) pages).

* cited by examiner

Fig.35                                          PRIOR ART

TAPERED ROLLER BEARING AND MANUFACTURING METHOD FOR RETAINER OF TAPERED ROLLER BEARING

TECHNICAL FIELD

The present invention relates to an improvement of a tapered roller bearing for supporting various kinds of rotating shafts that rotate in a state wherein a large radial load and thrust load are applied, such as the axle of a railroad vehicle, the transmission shaft of a drive apparatus, or a pinion shaft of a differential gear of an automobile, and a manufacturing method for a retainer that is assembled in this tapered roller bearing.

BACKGROUND ART

For example, a tapered roller bearing 1 such as illustrated in FIG. 35 is assembled in the rotation support section for a rotating shaft that rotates while supporting a large radial load and thrust load, such as the pinion shaft of a differential gear for example.

The tapered roller bearing 1 of a first example of conventional construction comprises an outer ring 2 and inner ring 3 that are arranged so as to be concentric with each other, a plurality of tapered rollers 4 and a retainer 5. The outer ring 2 has a partial tapered concave shaped outer raceway 6 formed around the inner circumferential surface. The inner ring 3 is located on the inner diameter side of the outer ring 2, and has a partial tapered convex shaped inner raceway 7 formed around the outer circumferential surface. A large-diameter side flange section 8 is formed around the end section on the large-diameter side of the outer circumferential surface of the inner ring 3, and similarly a small-diameter side flange section 9 is formed around the end section of the small diameter side so that each of the flange sections 8, 9 protrude outward in the radial direction from the inner raceway 7. Each tapered roller 4 is located between the outer raceway 6 and inner raceway 7 so as to be able to roll freely, with the end surface (head section) 10 on the large-diameter side each facing the inside surface 11 in the axial direction of the large-diameter side flange section 8. Moreover, a retainer 5 holds the tapered rollers 4.

The retainer 5 comprises a ring-shaped large-diameter side rim section 12 and ring-shaped small-diameter side rim section 13 that are concentric with each other and spaced apart from each other in the axial direction, and a plurality of column sections 14 that span between these rim sections 12, 13. The portions that are surrounded by the perimeters of these rim sections 12, 13 and a pair of adjacent column sections 14 form pockets 15 for holding the tapered rollers 4 so as to be able to roll freely. The retainer 5 that is illustrated in FIG. 35 is formed by bending metal plate, and the overall rigidity is maintained by forming an inward-facing flange shaped bent plate section 16 that is bent inward in the radial direction from the end section on the small-diameter side.

FIG. 36 to FIG. 38 illustrate a second example of a conventionally known tapered roller bearing 1a in which a retainer 5a having a different shape is assembled. This retainer 5a is formed into a single piece by injection molding of synthetic resin, or by cutting of a metal material. The basic construction is the same as the retainer 5 that was assembled in the first example of conventional construction, and comprises a ring-shaped large-diameter side rim section 12a and ring-shaped small-diameter side rim section 13a that are spaced apart from each other in the axial direction, and a plurality column sections 14a, with the portions that are surrounded by the perimeters of these rim sections 12a, 13a and a pair of adjacent column sections 14a forming pockets 15a. In this example, the rigidity can be sufficiently maintained by the rim sections 12a, 13a themselves, so differing from the first example of conventional construction, there is no bent plate section formed on the retainer 5a. Moreover, a circular concave section 20 is formed in the center section of the end surface on the large-diameter side of the tapered rollers 4a.

In the case of either construction, as the tapered roller bearing 1, 1a operates, the tapered rollers 4, 4a tend to displace toward the large-diameter side of the partial tapered concave shaped outer raceway 6 and partial tapered convex shaped inner raceway 7 due to a large radial load that is applied from these raceways 6, 7. As a result, during operation of the tapered roller bearing 1, 1a, as the outer ring 2 and inner ring 3 rotate relative to each other, the end surfaces 10 on the large-diameter side of each roller 4, 4a is caused to rub against the inside surface 11 in the axial direction of the large-diameter side flange section 8, and the rollers 4, 4a rotate and revolve. In this case, the state of friction between the end surfaces 10 on the large-diameter side of the rollers 4, 4a, and the inside surface 11 in the axial direction of the large-diameter side flange section 8 is mainly just a state of sliding friction, so from the aspect of maintaining the wear resistance and resistance to seizure, it is a very severe condition. Therefore, conventionally, construction is such that a sufficient amount of lubrication oil is supplied to a rotation support unit in which the tapered roller bearing 1, 1a is assembled, and a sufficient film of lubrication oil is formed between the sliding surfaces of the end surfaces 10 on the large-diameter side of the rollers 4, 4a and the inside surface 11 in the axial direction of the large-diameter side flange section 8.

In the rotation support unit in which the tapered roller bearing 1, 1a is assembled, there is no particular problem as long as a sufficient amount of lubrication oil is supplied. However, regardless of the type of rotation support unit in which the tapered roller bearing 1, 1a is assembled, it is not possible to completely rule out the possibility that due to some kind of trouble or faulty maintenance, the lubrication oil that is supplied to the tapered roller bearing 1, 1a will become insufficient or dried up. In the case where the lubrication oil that is supplied to the tapered roller bearing 1, 1a becomes insufficient or dried up, first, the wear of the sliding surfaces with the most severe condition of the end surfaces 10 on the large-diameter side of the rollers and the inside surface 11 in the axial direction of the large-diameter side flange section 8 advances considerably. Furthermore, in a severe case, the end surfaces 10 on the large-diameter side of the rollers 4, 4a and the inside surface 11 in the axial direction of the large-diameter side flange section 8 will stick, and it will become impossible for the tapered rollers 4, 4a to rotate and revolve, and furthermore, the rolling surfaces of these tapered rollers 4, 4a and the outer raceway 6 will stick, and it will become impossible for the outer ring 2 to rotate relative to the inner ring 3, causing so called seizure to occur.

When this kind of seizure occurs, normal operation of the vehicle (railroad car, automobile or the like) as well as moving the vehicle becomes difficult, and it becomes easy for problems to occur such as delays in restoring the railroad, causing traffic jams and the like. When it becomes impossible for the rotation support unit to turn, this may cause trouble to occur in other parts, and it becomes easy for problems to occur that require much money and time to repair.

As illustrated in the third example of conventional construction in FIG. 39, such problems easily occur in the case of a tapered roller bearing 1b having a large contact angle, or in other words, when the contact angle with respect to the center axis of the outer raceway 6a that is formed around the inner circumferential surface of the outer ring 2a and the inner raceway 7a that is formed around the outer circumferential surface of the inner ring 3a is large, and when the angle of inclination between the axis of rotation of the tapered rollers 4a and the center axis of the outer ring 2a and inner ring 3a is large. For example, in the case of a tapered roller bearing 1b having a contact angle that is 20° or more, the component force that causes the rollers 4a to displace toward the large diameter side due to a large load (radial load and thrust load) that is applied during operation becomes large, and thus the contact pressure in the area of sliding between the end surfaces 10 on the large-diameter side of the tapered rollers 4a and the inside surface 11 in the axial direction of the large-diameter side flange section 8 that is formed around the outer circumferential surface on the end section of the inner ring 3a becomes large. As a result, the lubrication state becomes insufficient, and it becomes easy for severe wear to occur at the areas of sliding contact between these surfaces 10, 11. Particularly, when the contact angle is 25° or more, this tendency appears even more.

In the case of the retainer 5b that is assembled in the tapered roller bearing 1b having a large contact angle as illustrated in FIG. 39, the difference between the diameter of the large-diameter side rim section 12b and the diameter of the small-diameter side rim section 13b is large as illustrated in FIG. 40 to FIG. 41, and the angle of inclination of the column sections 14b that span between these rim sections 12b, 13b is large.

When the retainer 5a that is illustrated in FIG. 37 and FIG. 38, or the retainer 5b that is illustrated in FIG. 39 is manufactured using synthetic resin, a die 24 apparatus that comprises a pair of dies 22, 23 that move close or far from each other in the axial direction as illustrated in FIG. 42 is used, and the retainer is formed by injection molding by performing so-called axial drawing. In other words, with these dies 22, 23 facing each other, pressure is applied to thermoplastic synthetic resin, which is in a heated and molten state, and fed through a plurality of feed holes called gates into the formation space (cavity) that is formed between these dies 22, 23. Then, after the synthetic resin has cooled and hardened, the dies 22, 23 are separated and the formed retainer 5b (5a) is removed.

As described above, in a tapered roller bearing 1, 1a, 1b that uses any one of the retainers 5, 5a, 5b having the construction described above, there is a possibility that significant wear or seizure will occur. In consideration of the situation described above, JP2007-40512(A) and JP2007-270851(A) disclose construction wherein a small amount of lubrication oil is used effectively to lubricate the areas of sliding contact between the end surfaces on the large-diameter side of the tapered rollers and the inside surface in the axial direction of the large-diameter side flange section. FIG. 43 to FIG. 45 illustrate two examples of the conventional construction disclosed in JP2007-40512(A).

First, in the case of the fourth example of conventional construction illustrated in FIG. 43, an oil retaining section 17 is formed all the way around the circumference on the end section of the large-diameter side of the inner circumferential surface of the retainer 5c by bending the end section on the large-diameter side of the retainer 5c made of metal plate inward in the radial direction. In this fourth example of conventional construction, lubrication oil that is stored in the oil retaining section 17 is supplied to the areas of sliding contact between the end surfaces 10 on the large-diameter side of the tapered rollers 4 and the inside surface in the axial direction of the large-diameter side flange section 8 in order to suppress wear when lubrication becomes insufficient.

Next, in the case of a fifth example of conventional construction illustrated in FIG. 44 and FIG. 45, an oil retaining section 17a is formed on the end section on the small-diameter side of the outer circumferential surface of the retainer 5d by bending the end section on the small-diameter side of the retainer 5d outward in the radial direction. A plurality of partition plates 18 divide this oil retaining section 17a into a plurality of sections in the circumferential direction. In this fifth example of conventional construction, lubrication oil that adheres to the outer circumferential surface of the retainer 5d and that has reached the small-diameter end section of this retainer 5d is prevented from flowing away, and this lubrication oil is supplied to the areas of sliding contact between the end surfaces 10 on the large-diameter side of the tapered rollers 4 and the inside surface 11 in the axial direction of the large-diameter flange section 8, suppressing wear when lubrication becomes insufficient.

In the two examples of conventional construction described above, even though durability is improved when compared with the first through third examples of conventional construction, it is not always possible to efficiently supply a small amount of lubrication oil to the areas of contact between the end surfaces 10 on the large-diameter side of the rollers 4 and the inside surface 11 in the axial direction, and thus effective use of the small amount of oil is not sufficiently achieved. For example, in the case of the fourth example of conventional construction illustrated in FIG. 43, with oil accumulated as is in the oil retaining section 17, the amount of lubrication oil that does not adhere to the end surfaces 10 on the large-diameter side of the tapered rollers 4 increases, and thus it becomes difficult to effectively use the small amount of remaining lubrication oil. Moreover, in the case of the fifth example of conventional construction illustrated in FIG. 44 and FIG. 45, the oil retaining section 17a is formed in a part that is greatly separated from the areas of contact between the end surfaces 10 on the large-diameter side and the inside surface 11 in the axial direction, so it is difficult to effectively use the small amount of lubrication oil for lubricating these areas of contact. This aspect of not being able to effectively use the small amount of lubrication oil to lubricate the areas of contact between the end surfaces 10 on the large-diameter side and the inside surface 11 in the axial direction is the same even when these forms of conventional construction are combined and a plurality of partition plates 18 as illustrated in FIG. 45 are provided on the oil retaining unit 17 that is illustrated in FIG. 43.

JP2007-270851(A) discloses construction wherein lubrication oil that is guided over the inner circumferential surface of the retainer is guided to the area of sliding contact between the end surfaces on the large-diameter side of the tapered rollers and the inside surface in the axial direction of the large-diameter side flange section by way of a large-diameter side flange that faces inward and is provided on the edge section on the end of the large-diameter side of the retainer. In the case of construction such as disclosed in JP2007-270851 (A) as well, even though it is possible to improve durability more than in the case of the first through third examples of conventional construction, from the aspect of efficiently supplying a small amount of lubrication oil to the areas of sliding contact between the end surfaces on the large-diameter side and inside surface in the axial direction, there is still room for improvement.

RELATED LITERATURE

Patent Literature

[Patent Literature 1] JP2007-40512(A)
[Patent Literature 2] JP2007-270851(A)

SUMMARY OF THE INVENTION

Problem to be Solved by the Invention

Taking the above situation into consideration, the object of the present invention is to achieve construction of a tapered roller bearing that improves durability in the state of insufficient lubrication, or in other words, makes it possible to sufficiently extend the time from when the lubrication state becomes insufficient until rotation becomes impossible due to seizure, and achieve a suitable manufacturing method in order to obtain a retainer for achieving that construction.

Means for Solving the Problems

The tapered roller bearing of the present invention, similar to a conventionally known tapered roller bearing as described above, comprises an outer ring, an inner ring, a plurality of tapered rollers and a retainer.

The outer ring has a partial tapered concave shaped outer raceway formed around the inner circumferential surface thereof. On the other hand, the inner ring is placed on the inner-diameter side of the outer ring so as to be concentric with the outer ring, and has a partial tapered convex inner raceway formed around the outer circumferential surface thereof, and a large-diameter side flange section that protrudes outward in the radial direction from the end section on the large-diameter side of the inner raceway. Moreover, the tapered rollers are placed between the inner raceway and the outer raceway so as to be able to roll freely and such that the end surface on the large-diameter side of the rollers face the side surface in the axial direction of the large-diameter side rim section. Furthermore, the retainer holds the tapered rollers.

The retainer comprises a large-diameter side rim section and a small-diameter side rim section that are ring shaped and that are placed concentric with each other and spaced apart in the axial direction, and a plurality of column sections that span between both of the rim sections. And the portions that are surrounded by both rim sections and a pair of column sections that are adjacent to each other in the circumferential direction form pockets for holding the tapered rollers.

Particularly, in the tapered roller bearing of the present invention, oil retaining concave sections that are recessed outward in the radial direction are formed in portions of the inner circumferential surface of the large-diameter side rim section which coincide with at least part of the pockets in phase of the circumferential direction. The portions of the bottom surfaces of the oil retaining concave sections that are open to the inner surface of the pockets face toward the end surfaces on the large-diameter side of the tapered rollers that are held inside the pockets, preferably the concave sections formed on the end surfaces on the large-diameter side. However, the concave sections on the end surfaces on the large-diameter side can be omitted.

When embodying this kind of tapered roller bearing of the present invention, preferably dams that block the inside section of the oil retaining concave sections and the surface on the outside end of the large-diameter rim section are formed on the side of the outside end surface of the large-diameter side rim section of the oil retaining concave sections, and these dams prevent the inside section of the oil retaining concave section from connecting in the axial direction with the outside end surfaces of large-diameter side rim section. More specifically, depth is provided to the oil retaining concave sections in a direction that is recessed outward in the radial direction more than the inner circumferential surface of the large-diameter side rim section from the end sections on the opening side on the pocket side to the back end section on the side of the surface on the outside end. In other words, a stepped section is formed between the back end section of the bottom surface of the oil retaining concave sections and the inner circumferential surface of the large-diameter side rim sections.

Moreover, preferably, the number of oil retaining concave sections is the same as the number of pockets. Also, the oil retaining concave sections that are formed independent from each other in the circumferential direction are open toward the pockets.

Moreover, preferably, the bottom sections of the oil retaining concave sections are inclined in a direction outward in the radial direction going toward the pockets. More preferably, the inner circumferential surface of the large-diameter rim section is a cylindrical shaped surface that is parallel with the center axis of the retainer, or is an inclined surface that inclines in a direction outward in the radial direction going toward the pockets.

When embodying the tapered roller bearing of the present invention, preferably, the position in the radial direction of the edge on the inside end of the outer peripheral surface of the large-diameter side rim section of the retainer is located further on the outside in the radial direction of the inner ring and the outer ring than the position in the radial direction of the intersecting point between the generating line of the inner circumferential surface of the outer ring and the generating line of the end surface on the large-diameter side of the outer ring. The edge on the inside end of the outer peripheral surface of the large-diameter side rim section is one of the end edges in the axial direction thereof that is near the end surface on the large-diameter side of each of the tapered rollers.

In this case, preferably, the position in the radial direction of the edge on the inside end of the inner peripheral surface of the large-diameter side rim section is located further on the inside in the radial direction of the inner ring and the outer ring than the position in the radial direction of the center point of the end surface on the large-diameter side of each of the tapered rollers. The edge on the inside end of the inner peripheral surface of the large-diameter side rim section is one of the end edges in the axial direction thereof that is near the end surface on the large-diameter side of each of the tapered rollers.

When embodying the tapered roller bearing of the present invention, preferably, a ridge that protrudes inward in the radial direction is formed around the entire circumference of part of the inner circumferential surface of the large-diameter side rim section that is nearer the surface on the outside end of the large-diameter side rim section than the oil retaining concave sections.

The position in the axial direction of the ridge on the inner circumferential surface of the large-diameter side rim section can be set to be between a position that comes in contact with the outside end sections of the oil retaining concave sections in the middle section in the axial direction of this inner circumferential surface and the outside end section of the large-diameter side rim section. Preferably, the position in the axial direction of the ridge on the inner circumferential surface of the large-diameter side rim section is set on the side of the oil retaining concave sections, more specifically, in the portion in contact with or near the oil retaining concave sections, thus the lubrication oil that is located on the inner circumferential surface of the large-diameter side rim section between the ridge and the pockets and located in the portions that are separated from the oil retaining concave sections can be effectively collected inside the oil retaining concave sections. However, when the direction of inclination of this portion is regulated, for example, when this portion is inclined in a direction outward in the radial direction going toward the oil retaining concave sections, thus the lubrication oil that exists in this portion can be efficiently collected in the oil retaining concave sections, the ridge can be formed near the outside end section of the large-diameter side rim section.

Furthermore, when embodying the tapered roller bearing of the present invention, preferably, at least part of the inner circumferential surface of the small-diameter side rim section is located further on the outside in the radial direction of the inner ring and outer ring than the center axis of the tapered rollers.

When embodying the tapered roller bearing of the present invention, preferably, the retainer of the tapered roller bearing is made of synthetic resin. More preferably, the retainer is made by feeding pressurized molten thermoplastic synthetic resin through a plurality of feed opening into the formation space of a die apparatus. Therefore, in the retainer there is a weld that occurs due to the collision between the molten synthetic resins that are fed from different feed openings. In the present invention, preferably this weld exists in the portion that is separated from the connecting section between the rim sections and the column sections Moreover, preferably, when embodying the present invention, the tapered roller bearing is located between the driving source of a self-propelled vehicle (not a vehicle that is pulled by a truck or locomotive engine, but a vehicle that comprises a driving source for moving the vehicle itself) and the drive wheels, and is used for supporting the rotating shaft of the vehicle drive system that transmits the rotation driving force of the drive source to the drive wheels. This kind of rotating shaft of the driving system of a vehicle, includes, for example, a pinion shaft of an automobile differential gear, the power transmission shaft of an automobile transmission (including an automatic transmission, manual transmission and transaxle), the power transmission shaft of the drive section of a railway car, and the like.

The retainer made of synthetic resin that is assembled in the tapered roller bearing of the present invention is formed by feeding pressurized molten thermoplastic synthetic resin through a plurality of feed openings into the formation space of a die apparatus. In this case, in the die apparatus used for injection molding of this synthetic resin retainer, the feed openings are formed in the portions for forming both rim sections of the formation space, and the positions of the feed openings of the respective portions for forming both rim sections are in step with each other in the circumferential direction of these portions.

Alternatively, a die apparatus is used that satisfies the following conditions (1) to (3).

(1) The die apparatus has axial drawing construction wherein a pair of dies that are arranged concentric with each other move together or apart in the axial direction.

(2) Of the end surfaces in the axial direction of the dies that face each other, a concave molding section is formed on the end surface in the axial direction of one of the dies, and a convex molding section is formed on the end surface in the axial direction of the other die.

(3) Convex sections for forming the oil retaining concave sections are provided on the end surface in the axial direction of the one die.

In this case, preferably, the one die has a stepped section on the tip end section of the convex molding sections for forming the oil retaining concave sections.

Effect of the Invention

With the tapered roller bearing of the present invention that is constructed as described above, by functioning as described below, it is possible to improve durability during a state of insufficient lubrication, or in other words, it is possible to sufficiently extend the time from when a state of insufficient lubrication occurs until rotation becomes impossible due to seizure.

During operation of a rotating mechanical device in which the tapered roller bearing of the present invention is assembled, as in the case of a typical tapered roller bearing, the lubrication oil flows though the internal bearing space between the inner circumferential surface of the outer ring and the outer circumferential surface of the inner ring from the small-diameter side of the outer raceway and inner raceway toward the large-diameter side due to the pumping action that is caused by centrifugal force that occurs due to the revolving motion of the tapered rollers, which is unique in tapered roller bearings. When there is a sufficient amount of lubrication oil, the oil that flows in the internal bearing space in this way sufficiently lubricates the areas of sliding contact between the end surfaces on the large-diameter side of the tapered rollers and the inside surface in the axial direction of the large-diameter flange section on the outer circumferential surface of the inner ring. In this state, part of the lubrication oil that flows through the internal bearing space flows into the oil retaining concave sections that are formed on the inner circumferential surface of the large-diameter side rim section through the opening section on the pocket side, and is discharged to the outside edge side in the axial direction of this large-diameter side rim section. In other words, the lubrication oil that has previously entered into the oil retaining concave sections is pushed out from the oil retaining concave sections by the lubrication oil that newly flows in from the opening sections. Therefore, during normal operation in which there is a sufficient supply of lubrication oil, there is always lubrication oil accumulated inside the oil retaining concave sections.

From this state, when the lubrication oil supply pump fails, or when there is leakage of lubrication oil from inside the casing, for example, the amount of lubrication oil that flows through the internal bearing space decreases or becomes zero, and feeding lubrication oil through the openings on the pocket side and into to the oil retaining concave sections is reduced or stopped. When the oil that is fed through the opening sections is reduced or stopped in this way, the lubrication oil that is already accumulated inside the oil retaining concave sections is no longer pushed out from the oil retaining concave sections toward the outside edge side of the large-diameter side rim section, and remains in the oil retaining concave sections. Preferably, the lubrication oil that is accumulated inside the oil retaining concave sections is fed to a portion on the end surfaces on the large-diameter side of the tapered rollers that are held inside the pockets, and preferably enters inside concave sections that are formed on these end surfaces on the large-diameter side, and due to the rotating motion of the tapered rollers, is fed to the areas of sliding contact between the end surfaces on the large-diameter side and the inside surface in the axial direction of the large-diameter side flange section so as to lubricate these areas of sliding contact. At the instant that trouble or leakage occurs, a large portion of the lubrication oil that is accumulated inside the oil retaining concave sections can be used for lubricating the areas of sliding contact. Therefore, it is possible to sufficiently lengthen the time from when a state of insufficient lubrication occurs until rotation becomes impossible due to seizure. Consequently, it is possible to move the vehicle to an out of the way location, it is possible to shorten the amount of time necessary for restoring a railway, or it is possible to make it more difficult for traffic jams to occur. Furthermore, it is possible to make it more difficult for insufficient lubrication to lead to the rotating support unit not being able to rotate, it is possible to make it more difficult for trouble to occur in other parts, and it is possible to make it more difficult for problems to occur such as an increase in costs and time required for making repairs.

By forming the oil retaining concave sections in portions that correspond with at least part of the pockets, lubrication oil is supplied to the end surfaces on the large-diameter side of the tapered rollers that are held inside the pockets, and preferably is supplied to the inside surface in the axial direction of the large-diameter flange section by way of concave sections that are formed on these end surfaces on the large-diameter side, and thus performing lubrication of the areas of sliding contact between the inside surface in the axial direction and the end surfaces on the large-diameter side of other tapered rollers. It is possible to provide one oil retaining concave section for every other pocket in the circumferential direction, or it is possible to provide one oil retaining concave section for every third pocket. Moreover, as long as the oil retaining concave sections have a certain amount of depth on the inside surface side of the large-diameter side rim section that faces the end surfaces on the large-diameter side of the tapered rollers so that lubrication oil can be temporarily stored, the shape can be such that the depth becomes zero on the outside end surface side of the large-diameter side rim section, or in other words, the shape can be such that the depth gradually decreases going from the inside end surface side toward the outside end surface side, and disappears in the middle section in the axial direction of the inner circumferential surface of this large-diameter side rim section.

However, by providing a dam on the outside end surface side of the large-diameter side rim section of the oil retaining concave sections, together with increasing the capacity of the oil retaining concave sections and increasing the amount of lubrication oil that is accumulated in the oil retaining concave sections, the lubrication oil that is accumulated inside the oil retaining concave sections when there is insufficient lubrication can be effectively used for lubricating the areas of sliding contact between the end surfaces on the large-diameter side of the tapered rollers and the inside surface in the axial direction of the large-diameter side flange section without being lost to the outside end surface side of the large-diameter side rim section.

Alternatively, by making the number of oil retaining concave sections the same as the number of pockets, and by forming these oil retaining concave sections independent of each other in the circumferential direction such that they are open toward the pockets, the total amount of lubrication oil that is accumulated in all of the oil retaining concave sections, or in other words, the total amount of lubrication oil that is accumulated in the retainer can be sufficiently maintained, which is useful from the aspect of lengthening the time from when a state of insufficient lubrication occurs until rotation becomes impossible.

Furthermore, by making the bottom section of the oil retaining concave sections inclined outward in the radial direction going toward the pockets, or by making the inner circumferential surface of the large-diameter side rim section a cylindrical surface that is parallel with the center axis of the retainer, or an inclined surface that inclines outward in the radial direction going toward the pockets, the lubrication oil that is accumulated inside the oil retaining concave sections, and furthermore, the lubrication oil that adheres to the inner circumferential surface of the large-diameter side rim sections is efficiently guided toward the end surfaces on the large-diameter side of the tapered rollers. Particularly, in the case of an inclined surface, the amount of lubrication oil that flows out to the outside end surface side of the large-diameter side rim section is zero or kept to a very small amount, and the lubrication oil that is adhered to the inner circumferential surface can be used more efficiently. As a result, at the instant that a state of insufficient lubrication occurs, the lubrication oil that is accumulated on the end section on the large-diameter side of the retainer can be effectively used for lubricating the areas of sliding contact between the end surfaces on the large-diameter side of the tapered rollers and the inside surface in the axial direction of the large-diameter side flange section, and thus it is possible to lengthen the time from when a state of insufficient lubrication occurs until rotation becomes impossible.

In the tapered roller bearing of the present invention, by locating the position in the radial direction of the edge on the inside end of the large-diameter side rim section further on outside than the position in the radial direction of the intersecting point between generating lines of the inner circumferential surface of the outer ring and the end surfaces on the large-diameter side, the strength and rigidity of the large-diameter side rim section is maintained, and the capacity of the oil retaining concave sections is increased, and at the same time, a large portion of the lubrication oil that exists inside the internal bearing space at the instant when trouble or leakage occurs can be used for lubricating the areas of sliding contact.

In other words, by making the outer diameter of the large-diameter side rim section large, it is possible to make the thickness in the radial direction of the large-diameter side rim section large, and thus it is possible to maintain the strength and rigidity of this large-diameter side rim section, and by deepening the oil retaining concave sections, it is possible to maintain the capacity of the oil retaining concave sections. Moreover, the width dimension of the annular clearance that exists around the entire circumference between the end section of the opening on the large-diameter side of the inner circumferential surface of the outer ring and the outer circumferential surface of the large-diameter side rim section is kept small, and this annular clearance is in a state that bends outward in the radial direction from the end section on the large-diameter side of the internal bearing space. In this preferred state, the internal bearing space and the annular clearance are not connected in a straight line, so the resistance acts against the lubrication oil that flows through the internal bearing space by the pumping action that occurs due to the operation of the tapered roller bearing from flowing out from the internal bearing space. Therefore, at the instant when trouble or leakage occurs, a very large portion of the lubrication oil that is inside the internal bearing space can be used for lubricating the areas of sliding contact.

Therefore, after a state of insufficient lubrication occurs, in addition to a large portion of the lubrication oil that exists in the large capacity oil retaining concave sections, part of the lubrication oil that exists in the internal bearing space at the instant that trouble or leakage occurs can be used for lubricating the areas of sliding contact. As a result, it is possible to sufficiently lengthen the time from when a state of insufficient lubrication occurs until rotation becomes impossible due to seizure.

Furthermore, in the present invention, the position in the radial direction of the edge on the inside end of the inner circumferential surface of the large-diameter side rim section that is near the end surfaces on the large-diameter side of the tapered rollers can be located further on the inside in the radial direction of the inner ring and the outer ring than the position in the radial direction of the center point of the end surfaces on the large-diameter side of the tapered rollers. In this case, the thickness dimension in the radial direction of the large-diameter side rim section can be increased more, and thus it is possible to maintain the strength and rigidity of the large-diameter side rim section, and by deepening the oil retaining concave sections even more, it is possible to increase even more the amount of lubrication oil that can be stored in the oil retaining concave sections. Moreover, it is possible to make the width dimension in the radial direction of the annular clearance that exists between the inner circumferential surface of the large-diameter side rim section and the end section on the large-diameter side of the outer circumferential surface of the inner ring small. In other words, the width dimension in the radial direction of the large-diameter side rim section, which becomes a resistance against the flow of lubrication oil out from the internal bearing space, is increased, and thus the amount of lubrication oil that is accumulated inside the internal bearing space at the time when a state of insufficient lubrication occurs can be increased even more. As a result, after a state of insufficient lubrication occurs, it is possible to increase the amount of lubrication oil that can be used for lubricating the areas of sliding contact, and thus it is possible to lengthen the amount of time from when insufficient lubrication occurs until seizure occurs.

In the tapered roller bearing of the present invention, a ridge that protrudes inward in the radial direction can be formed around the entire circumference of part of the inner circumferential surface of the large-diameter side rim section in the portion nearer the outside end surface of the large-diameter side rim section than the oil retaining concave sections. In this preferred state, when there is a sufficient amount of lubrication oil that is supplied, part of the lubrication oil that flows inside the internal bearing space flows into the oil retaining concave sections and so more overflows, however, the lubrication oil that overflows from the oil retaining concave sections is accumulated in the portion on the inner circumferential surface of the large-diameter side rim section that is nearer to the pockets than the ridge. As the amount of lubrication oil that accumulates in this portion increases, this lubrication oil flows over the inner circumferential edge of the ridge and flows out from the side of the edge on the outside end in the axial direction of the large-diameter side rim section. In other words, the lubrication oil that has previously entered into the oil retaining concave sections is pushed out from the oil retaining concave sections by the lubrication oil that newly flows in through the opening section, and is accumulated in the portion on the inner circumferential surface of the large-diameter side rim section that is nearer to the pockets than the ridge.

When, from this state, the amount of lubrication oil that flows through the internal bearing space is reduced or becomes zero due to trouble or leakage, not only the lubrication oil that is accumulated inside the oil retaining concave sections, but also the lubrication oil that is accumulated in the portion on the inner circumferential surface of the large-diameter side rim section nearer to the pockets than the ridge enters into the oil retaining concave sections as the lubrication oil inside the oil retaining concave sections decreases, so it is possible to supply lubrication oil by way of the oil retaining concave sections for lubricating the areas of sliding contact. Therefore, a large portion of the lubrication oil that is accumulated in the portion on the inner circumferential surface of the large-diameter side rim section that is nearer to the pockets than the ridge can be used for lubricating the areas of sliding contact, so it is further possible to sufficiently lengthen the time from when a state of insufficient lubrication occurs until rotation becomes impossible due to seizure.

Furthermore, in the tapered roller bearing of the present invention, the inner circumferential surface of the small-diameter side rim section is located further on the outside in the radial direction of the inner ring and outer ring than the center axis of the tapered rollers. In this case, fluid which includes the lubrication oil that exists around the tapered roller bearing can easily enter into the internal bearing space, so even in a state where there is an insufficient amount of lubrication oil around the tapered roller bearing, the lubrication oil that is around the bearing can be efficiently taken into the internal bearing space, and thus it is possible to further increase the amount of lubrication oil that is fed to the areas of sliding contact.

In other words, after a state of insufficient lubrication occurs, the lubrication oil that can be used for lubricating the areas of sliding contact, in addition to a large portion that exists inside the large-capacity oil retaining concave sections, includes the small amount of lubrication oil that is in a drop or mist form that exists around the tapered roller bearing. Therefore, it is possible to more sufficiently lengthen the time from when a state of insufficient lubrication occurs until rotation becomes impossible due to seizure.

By making the retainer of the tapered roller bearing of the present invention using synthetic resin, it is possible to lighten weight of the retainer and lower the cost. The retainer can be made of metal such as a ferrous alloy or copper alloy, however, in that case, it is necessary to perform cutting of a circular ring-shaped material, or use a press to perform bending of a plate shaped material to obtain an intermediate material that does not have the oil retaining concave sections, then, after that, perform cutting of the sections where the oil retaining concave sections are to be, and form the oil retaining concave sections. Therefore, even though a metal retainer is advantageous from the aspect of having high strength and rigidity, and is capable of maintaining durability under normal use, the weight and manufacturing cost increases. On the other hand, by making the retainer using synthetic resin, it is possible to reduce the weight due to the low specific gravity of the material. Moreover, by making the retainer by injection molding as will be explained, the oil retaining concave sections can be formed at the same time as the other parts of the retainer, so it is possible to lower the manufacturing costs.

Making the retainer using injection molding in which thermoplastic synthetic resin is heated, and in a molten state is pressurized and fed into a formation space or cavity of a die apparatus, is advantageous from the aspect of lowering manufacturing cost. When performing injection molding of synthetic resin, the synthetic resin that is fed through openings called gates into the formation space collides with synthetic resin that comes from the opposite site at a specified place inside the formation space, and at that place, a portion called a weld that has low strength against stress is formed. On the other hand, the tapered rollers that are held inside the pockets when the retainer is in use may press in the circumferential direction against the column sections that partition both sides in the circumferential direction of the pockets. As a result of this pressure, stress is applied in a bending direction to the connecting sections between both end sections of these column sections and the large-diameter side and small-diameter side rim sections. When welds are located in these connecting sections, there is a possibility that damage such as cracking will occur with long-term use. By constructing the retainer as described above, welds do not exist in the connecting sections, so it becomes easier to maintain durability of the retainer. In other words, even though the cross-sectional area of the retainer is not large, that is, it is not necessary to make the retainer large, the required durability can be ensured.

The intended use and site of usage of the tapered roller bearing of the present invention are not particularly limited, however, preferably it is used in the rotation support section of the drive system of a self-propelled vehicle. In the case of a self-propelled vehicle, it is generally difficult to supply lubrication oil from the outside, and lubrication is performed by only the greases inside the tapered roller bearing, or the lubrication oil such as differential oil and mission oil that is stored inside the housing that houses the rotation support section. Moreover, the bearing is often used over a long period of time, and monitoring of the lubrication state is not performed very often. For these reasons, there is a possibility that a state of insufficient lubrication will suddenly occur, and occurs more often in a self-propelled vehicle than in the rotation support section of machine tools or industrial machinery. In the case of damage, such as seizure, due to insufficient lubrication, the effect to the surroundings, as described above, is greater than in the case of machine tools or industrial machinery. By using the tapered roller bearing of the present invention in the rotation support section of the drive system of a self-propelled vehicle, it is possible to more remarkably obtain the effect of the invention.

The retainer of the tapered roller bearing of the present invention, having the weld in a portion that is separated from the connecting section between both rim sections and the column sections can be easily obtained by the following manufacturing method. In other words, molten synthetic resin is fed into the formation space of the die apparatus from feed openings that are formed in portions of the formation space for forming both rim sections, whose phase coincides with each other in the circumferential direction, and after flowing in the circumferential direction through the formation space for forming both rim sections, enters into the formation space for forming the column sections from both ends of the formation space for forming the column sections. As a result, the molten synthetic resin collides in the middle section of the formation space for forming the column sections, and a weld is formed in that portion, so the weld is not formed in the connecting sections between the column sections and both rim sections. In this way, with the present invention, it is possible to obtain at low cost a retainer whose durability can easily be maintained.

Furthermore, by using a die apparatus having axial drawing type construction, in which there is one die comprising convex sections for forming the oil retaining concave sections in part of the concave molding section, and another die comprising a convex molding section, it is possible to efficiently make a retainer having oil retaining concave sections using synthetic resin with a comparatively simple die apparatus.

Moreover, by using a die having a stepped section on the tip end sections of the convex sections for forming the oil retaining concave sections as one of the dies, a dam is formed on the outside end surface side of the large-diameter rim section of the oil retaining concave sections, and thus it is possible to efficiently make a synthetic resin retainer having construction such that lubrication oil can be more effectively used. By maintaining the cross-sectional area of the tip end section of the concave sections for forming the oil retaining concave sections so that the tip end section does not become thin, it is possible to make it difficult for the tip end section to become damaged, and thus it is possible to maintain the durability of the die apparatus.

BEST MODES FOR CARRYING OUT THE INVENTION

Example 1

Figure 35:
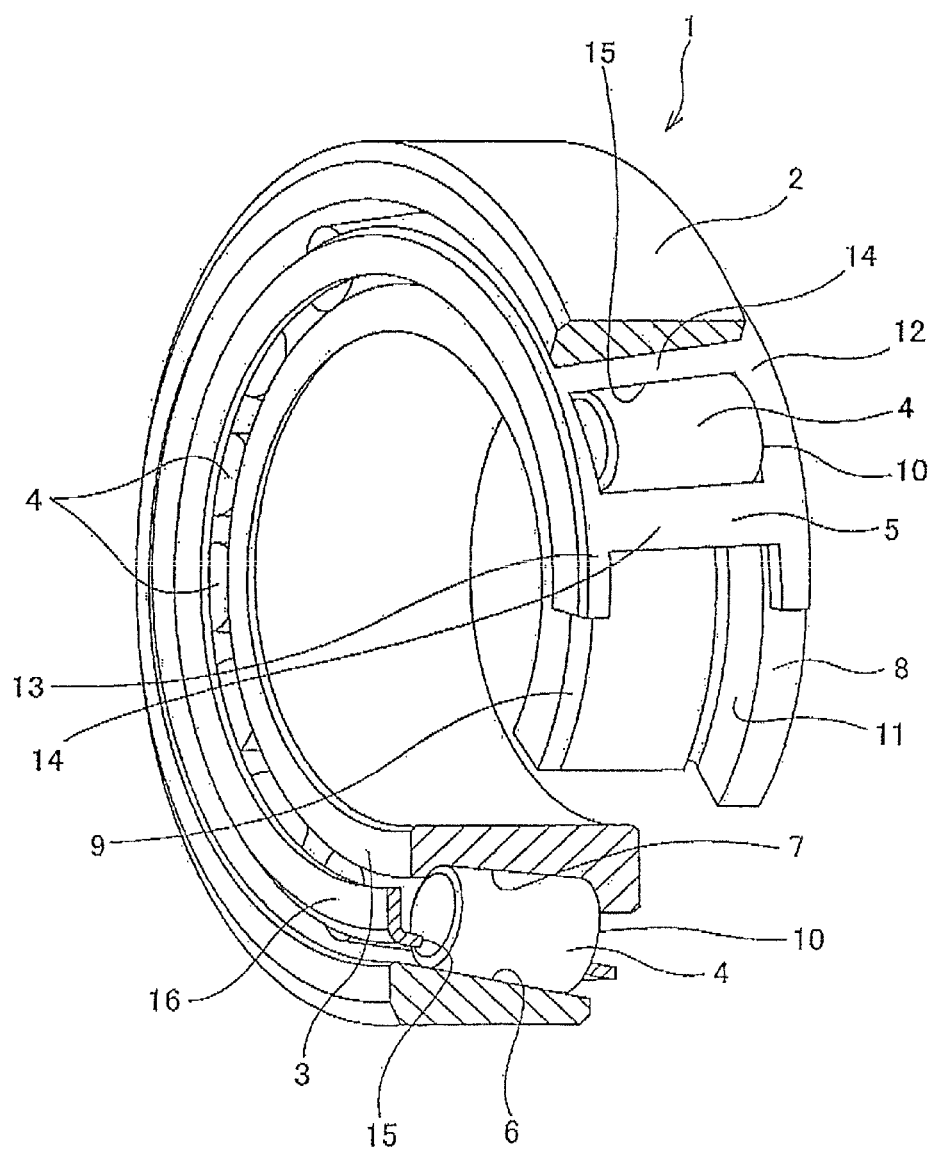
FIG. 35 illustrates a first example of conventional construction of a tapered roller bearing, and is a partial cross-sectional perspective view.
Figure 36:
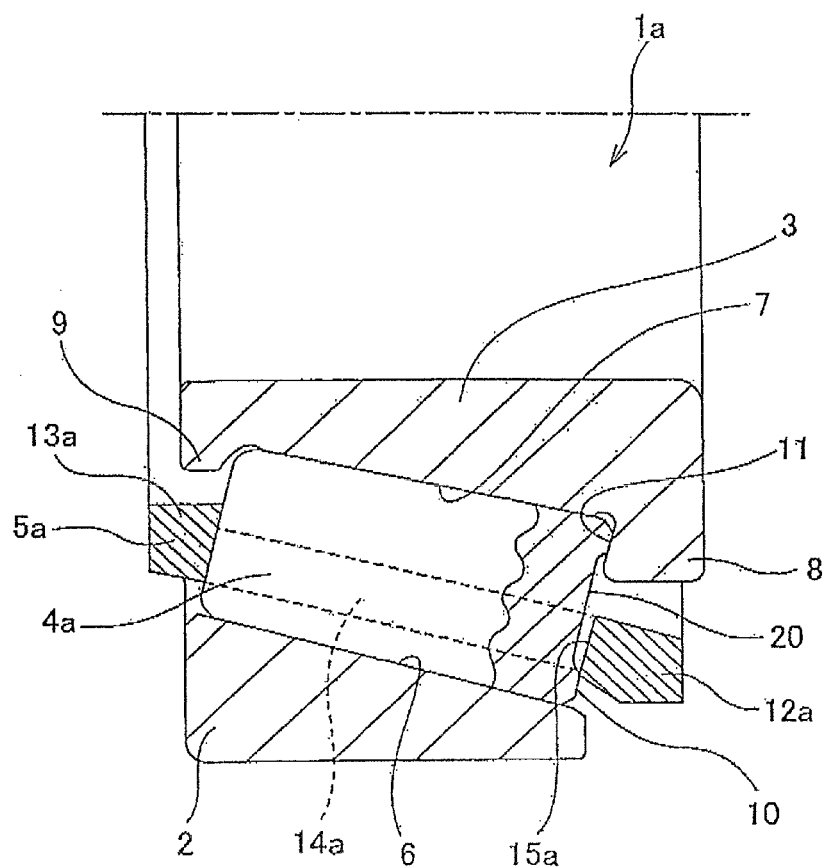
FIG. 36 illustrates a second example of conventional construction of a tapered roller bearing, and is a partial cross-sectional perspective view.
Figure 37:
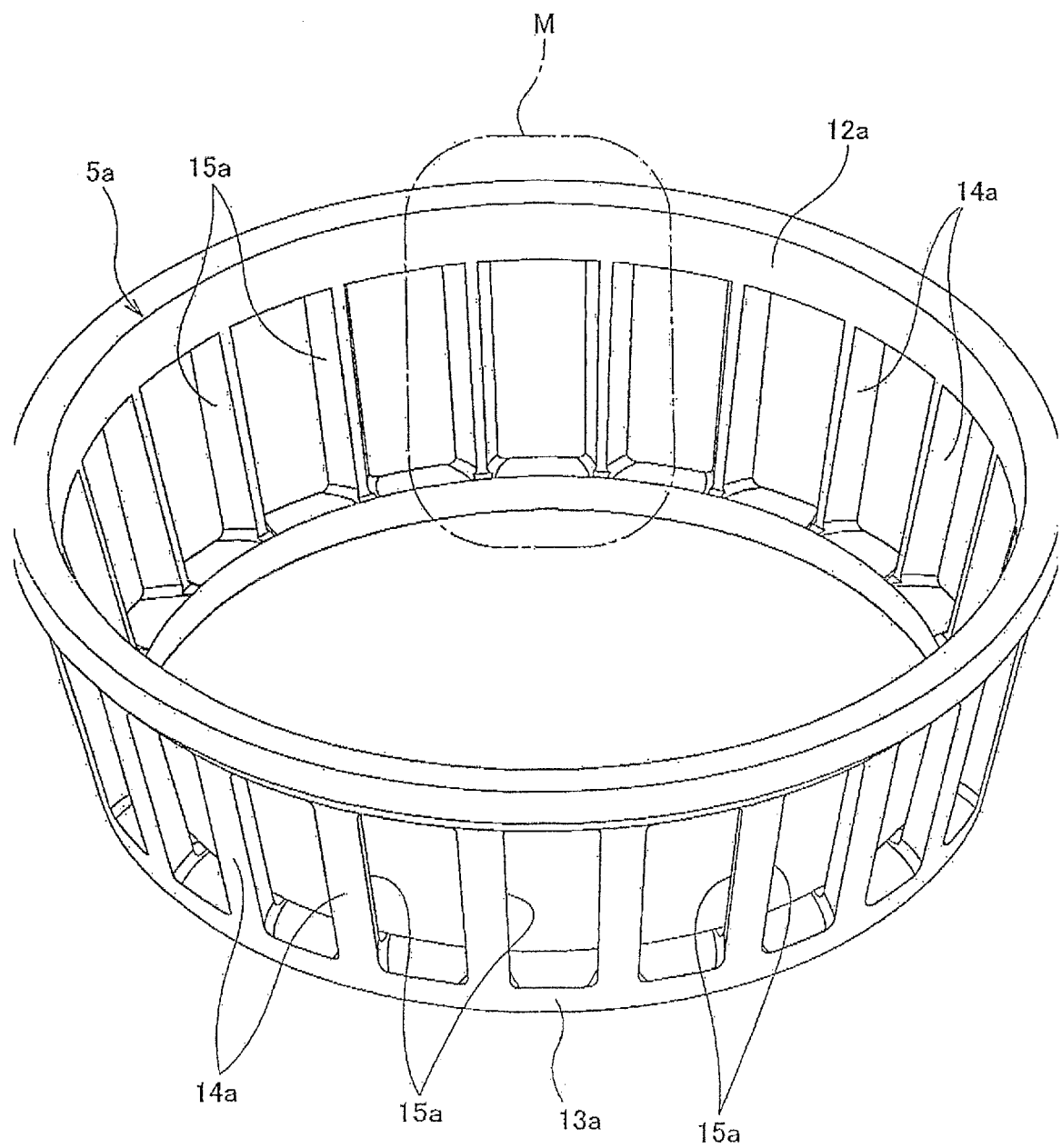
FIG. 37 is a perspective view of a retainer that is assembled in a second example of conventional construction, and illustrates the large-diameter side and the state as seen from the outside in the radial direction.
Figure 38:
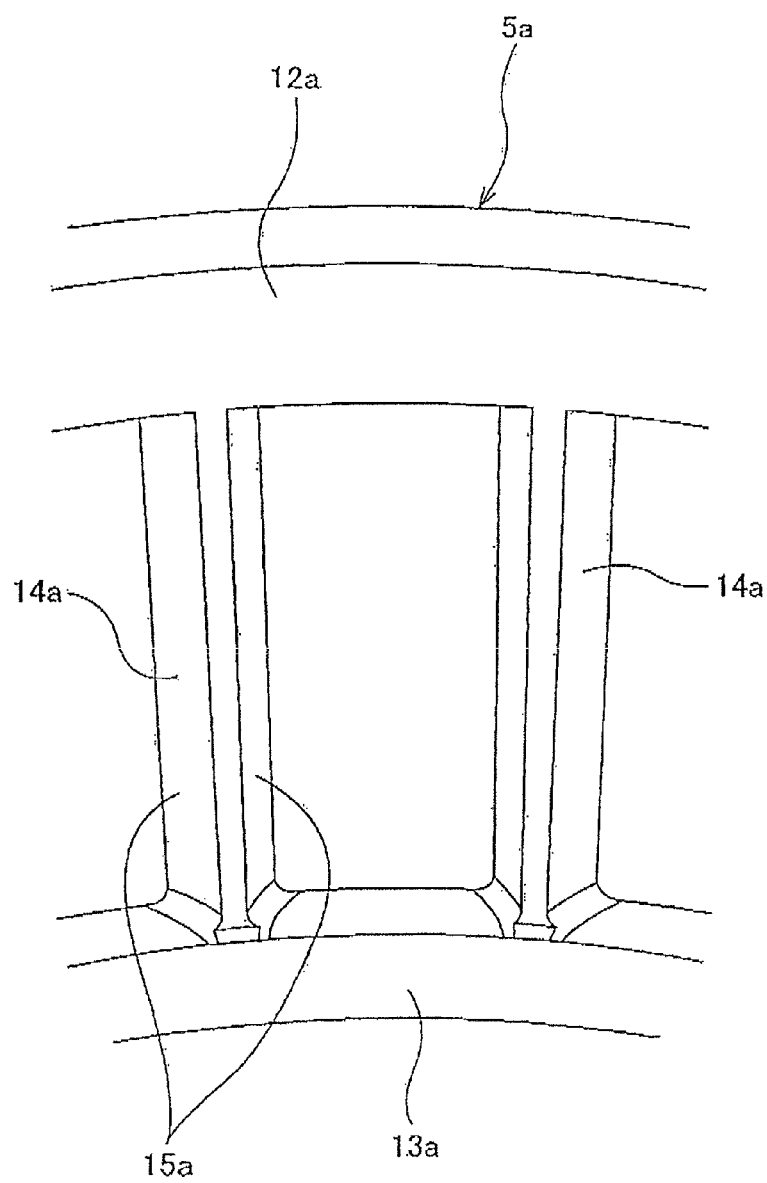
FIG. 38 is an enlarged view of part M in FIG. 37.
Figure 39:
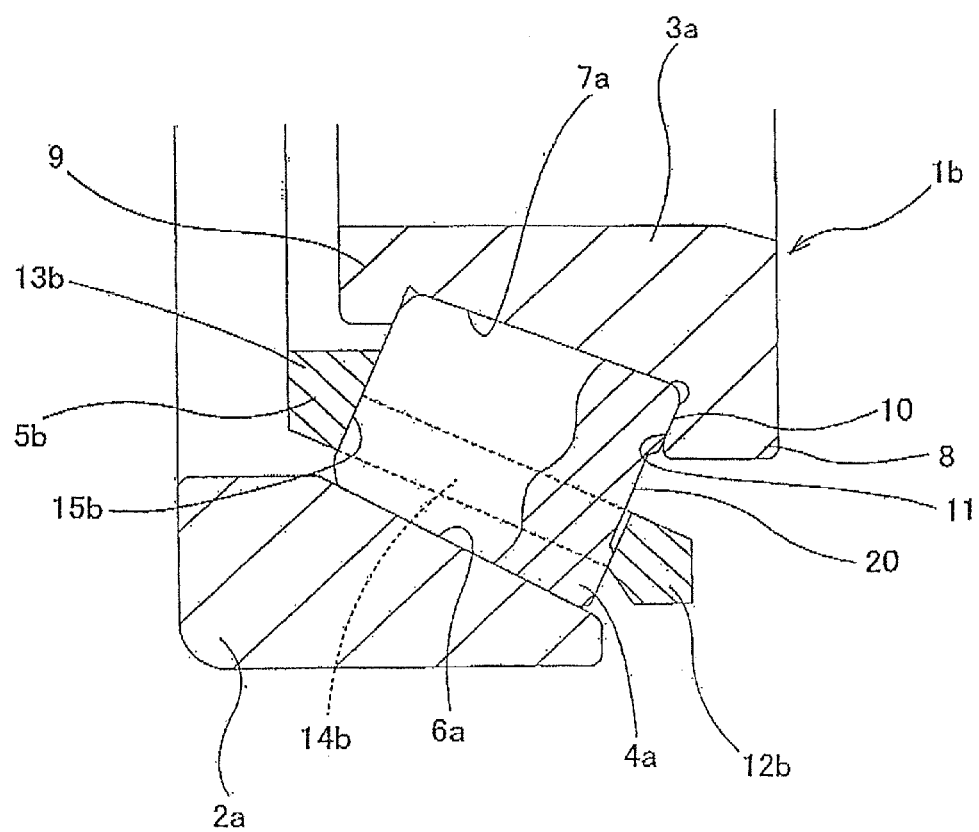
FIG. 39 is a partial cross-sectional view of a third example of conventional construction of a tapered roller bearing, and illustrates a tapered roller bearing having a large contact angle, which could easily become a problem when lubrication is insufficient.
Figure 40:
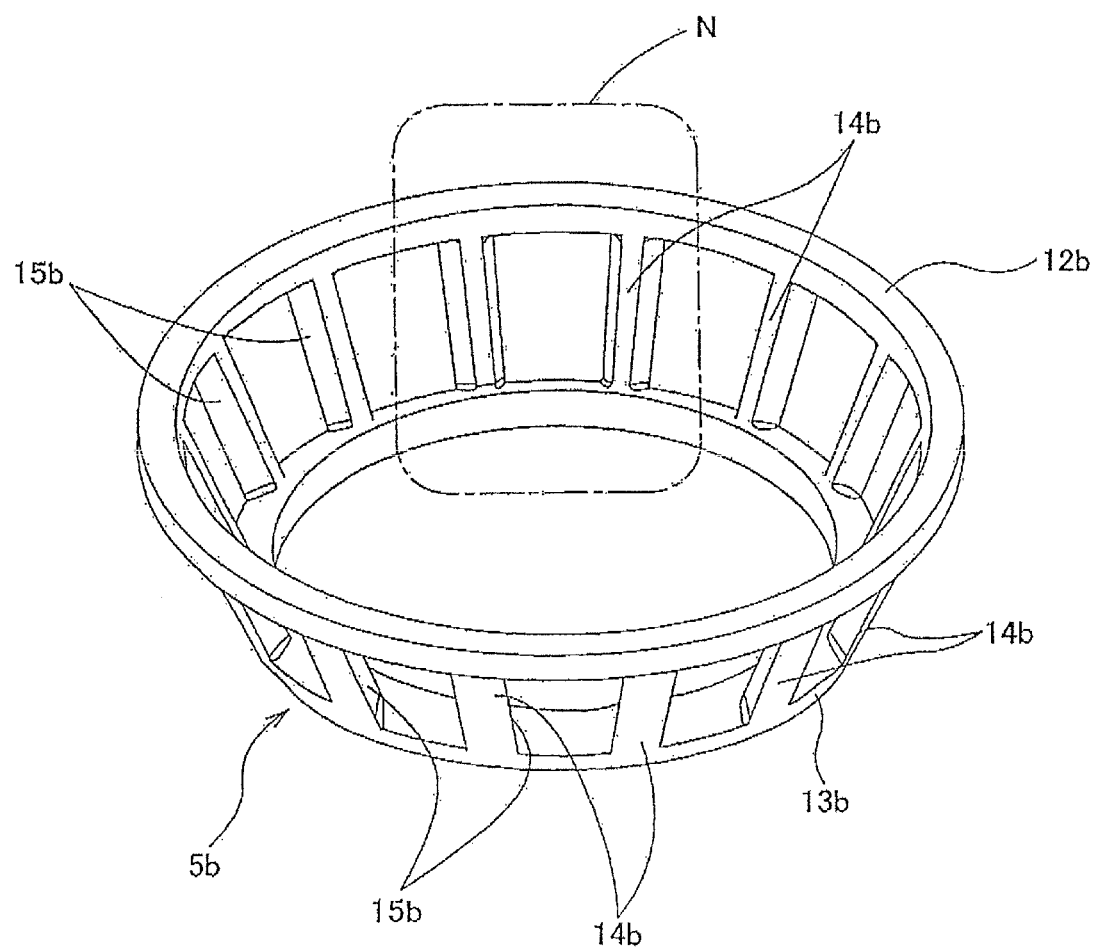
FIG. 40 is a perspective view of a retainer that is assembled in a third example of conventional construction, and illustrates the large-diameter side and the state as seen from the outside in the radial direction.
Figure 41:
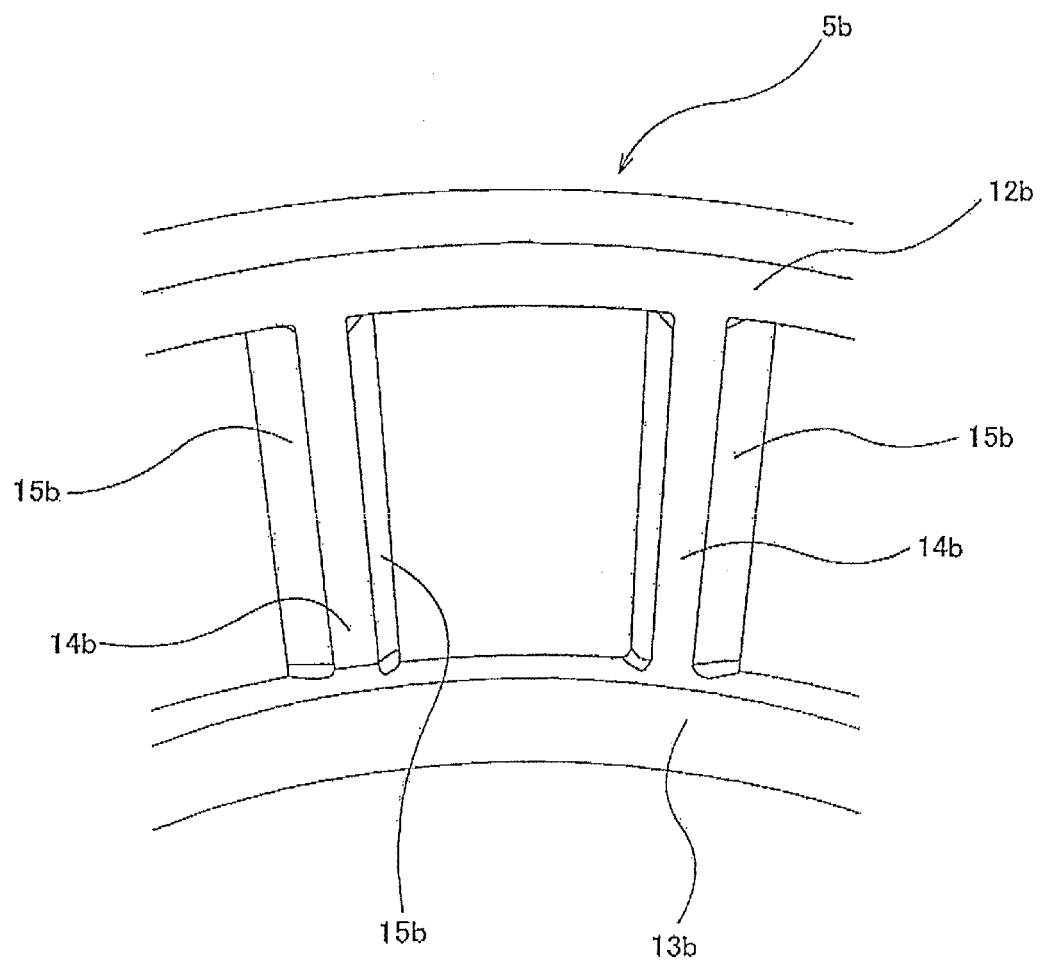
FIG. 41 is an enlarged view of part N in FIG. 40.

FIG. 1 to FIG. 4 illustrate a first example of an embodiment of the present invention. A feature of the present invention, including the construction of this example, is that the amount of time from when a state of insufficient lubrication occurs until rotation becomes impossible is extended by devising the shape and construction of the end sections on the large-diameter side and small-diameter side of a retainer, and the end surfaces on the large-diameter side of the tapered rollers. The other basic construction of the tapered roller bearing is the same as the tapered roller bearing having conventional construction as illustrated in FIG. 35 and FIG. 36, so the same reference numbers will be assigned to identical or equivalent parts, and any redundant explanation will be omitted or simplified such that the explanation below centers on the features of this example.

The retainer 5e of the tapered roller bearing 1e of this example is a so-called cage-type retainer that is formed entirely integrated into a partial tapered shape by injection molding of synthetic resin, or by performing cutting of a metal material. The type of synthetic resin that is used for injection molding is not particularly limited, and all types of synthetic resin, for example, polyamide 66 (PA66), polyamide 46 (PA46), polyphenylene sulfide (PPS) and the like, which are typically and conventionally used for injection molding of synthetic resin retainers, can be used. In the case of any of the synthetic resins, the synthetic resin can be used alone, or can be mixed with fibers for strength such as carbon fibers, glass fibers or the like, or can be mixed with ceramic whiskers for strength. As a metal material, it is possible to use a ferrous alloy such as stainless steel, or a copper alloy such as brass.

In any case, oil retaining concave sections 19 are formed in portions of the large-diameter side rim section 12e between pairs of column sections 14e that are adjacent in the circumferential direction, or in other words, in the inner circumferential surface of the portions that coincide with the pockets 15e that are in phase in the circumferential direction and that are aligned with the end sections on the large-diameter side of these pockets 15e. These oil retaining concave sections 19, when seen from the radial direction of the retainer 5e, or in other words, the shape as seen from the inner diameter side, are tab shaped, with the width in the circumferential direction being as wide as the side of the pockets 15e, and becoming more narrow going in a direction away from the pockets 15e. Moreover, the depth of the oil retaining concave sections 19 in the radial direction (thickness direction) of the retainer 5e is as deep as the sides of the pockets 15e, and decreases going in a direction away from the pockets 15e.

The depth of the oil retaining concave sections 19 becomes zero on the outside end sections of the large-diameter side rim sections 12e. Therefore, these oil retaining concave sections 19 are open only on the inner-diameter side of the retainer 5e and the sides of the pockets 15e, and are not open on either side in the circumferential direction and on the outside in the axial direction. Moreover, of the oil-retaining concave sections 19, in the center section in the width direction in the circumferential direction, the bottom section, which is the portion that is the deepest in the width direction, is inclined with respect to the center axis of the retainer 5e in a direction toward the outside in the radial direction while going toward the pocket 15e by an angle of $\theta_1$. That is, the oil retaining concave sections 19 are inclined in a direction toward the outside in the radial direction of the retainer 5e going in a direction approaching the pockets 15e so that they are deepest in the center section in the width direction, and so that in the axial direction as well, the center section in the width direction becomes deeper going toward the pockets 15e.

Furthermore, concave sections 20 are formed in the center section of end surfaces 10 on the large-diameter side of the tapered rollers 4a that are held inside the pockets 15e such that they can roll freely. In the case of this example, these concave sections 20 are circular, however, they could also be the ring shape that remains when the center section of the end surfaces 10 on the large-diameter side is not recessed. In either case, the center of the concave sections 20 is located on the center axis of the tapered rollers 4a. Of the bottom surface of the oil retaining concave section 19, the portion that opens to the inside surface of the pocket 15e faces the concave section 20 that is formed in the end surface 10 on the large-diameter side of the tapered roller 4a that is held inside the pocket 15e. The portion of the bottom section of the oil retaining concave section 19 that opens to the inside surface of the pocket 15e in the radial direction of the tapered roller 4a (point α in FIG. 2) is located further on the inside than the outer edge of the concave section 20. Therefore, the entire opening of the oil retaining concave section 19 on the inside surface side of the pocket 15e faces the concave section 20. Consequently, nearly all of the lubrication oil that is inside the oil retaining concave section 19 and that is pressed against the bottom section of the oil retaining concave section 19 due to centrifugal force that is caused by the rotation of the retainer 5e tends to flow from the opening on the inner surface side of the pocket 15e into the concave section 20. Nearly the entire length of the edge section of the opening of the oil retaining concave section 19 on the pocket 15e side, comes in sliding contact with or closely faces through a small space the flat section of the end surface 10 on the large-diameter side that is located around the concave section 20. Therefore, it becomes difficult for the lubrication oil that flowed into the concave section 20 to flow outward in the radial direction of the tapered roller bearing 1e and becomes lost regardless of the centrifugal force caused by the revolving motion of the tapered roller 4a and rotating motion of the retainer 5e.

Figure 1:
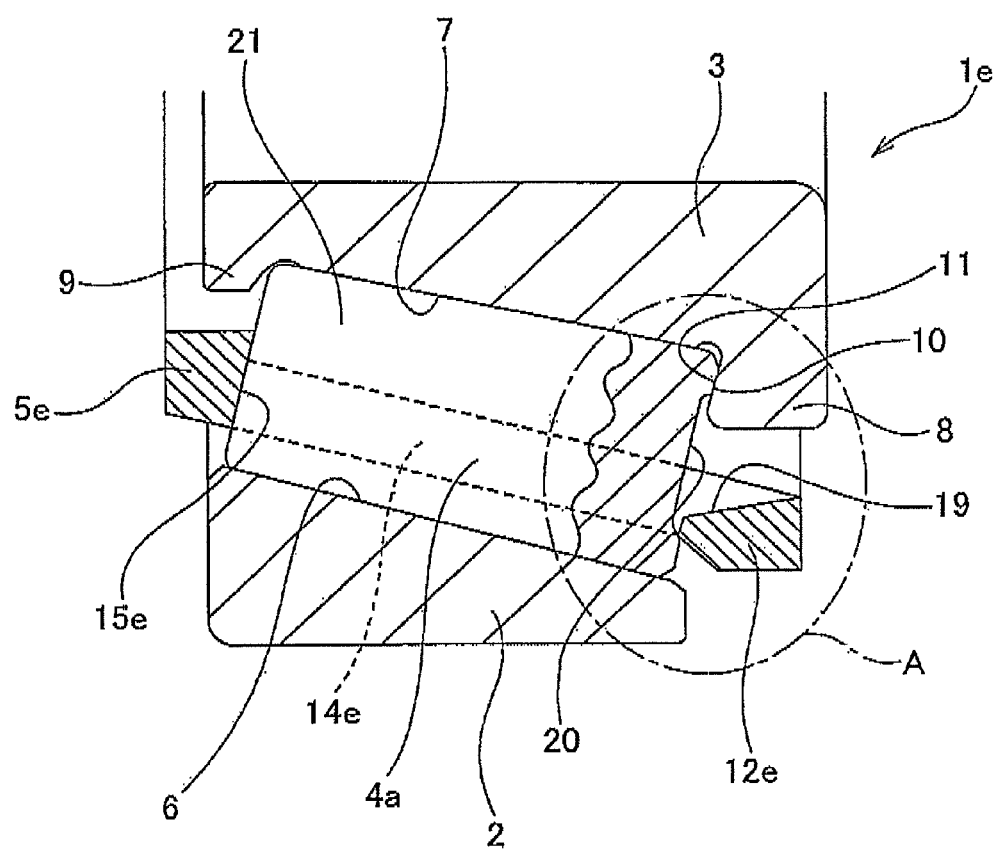
FIG. 1 illustrates a first example of an embodiment of the present invention, and is a partial cross-sectional view of a tapered roller bearing.
Figure 2:
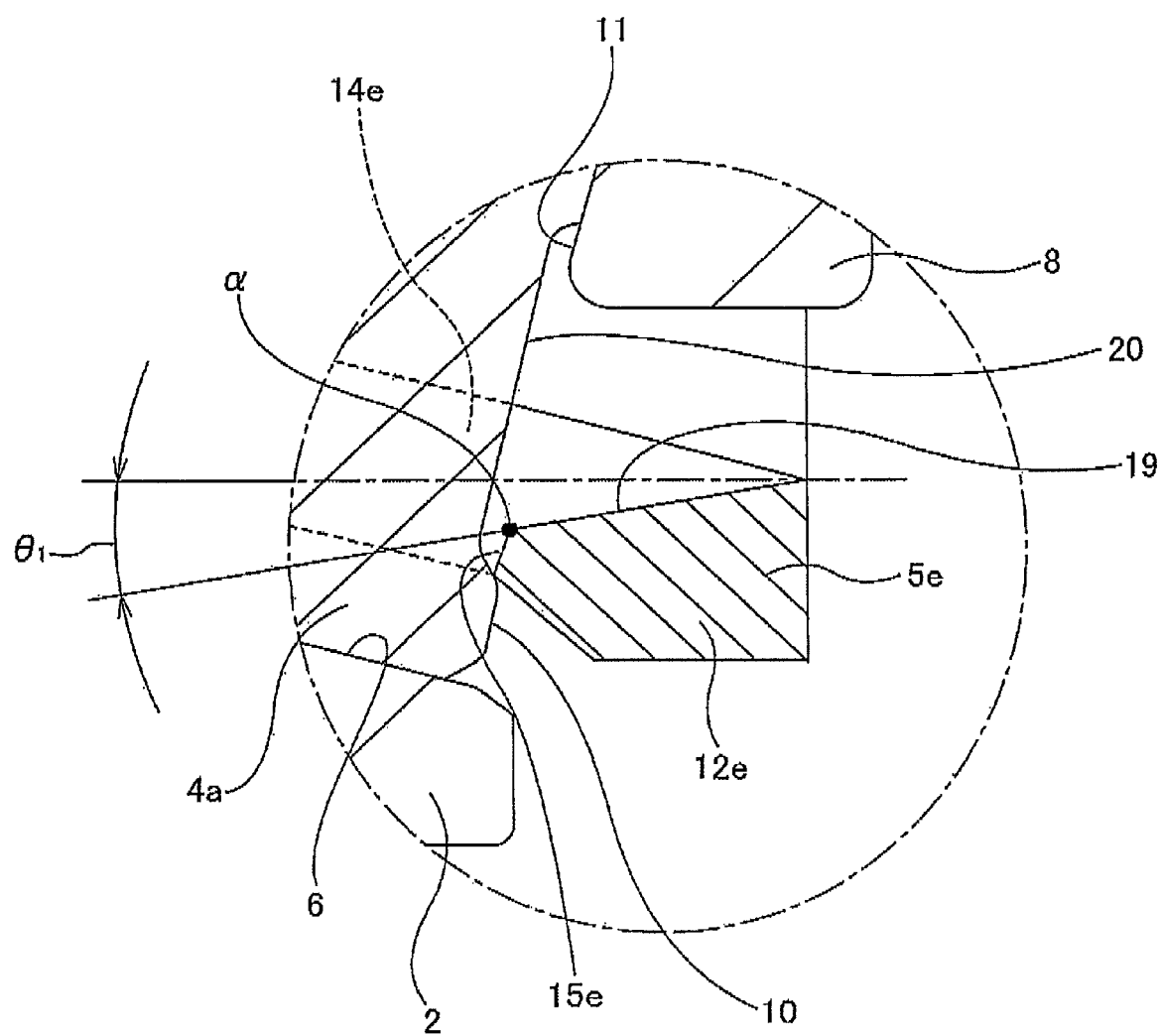
FIG. 2 is an enlarged view of part A in FIG. 1.
Figure 3:
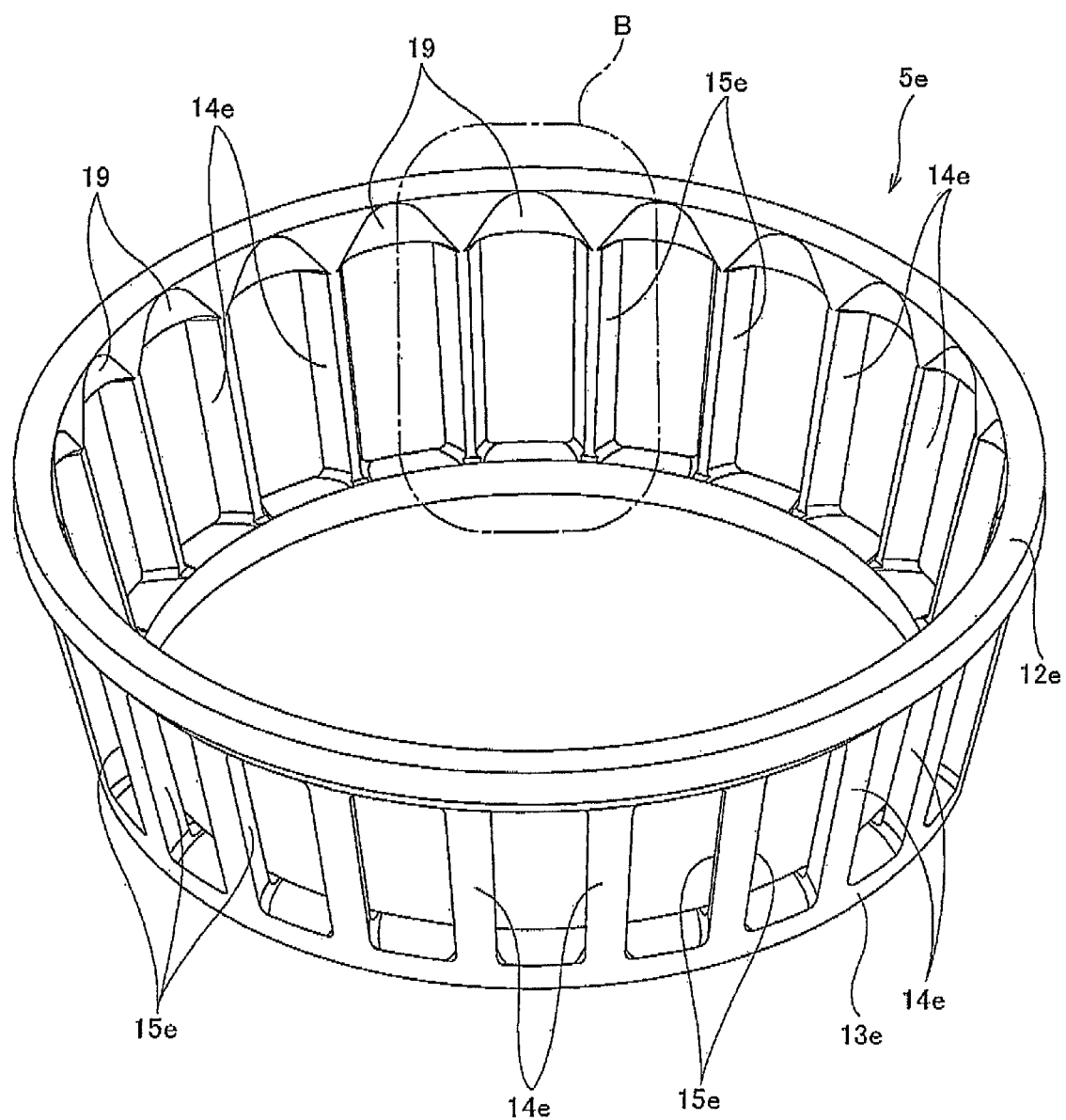
FIG. 3 is a perspective view of a retainer that is assembled in a first example of an embodiment of the present invention, and illustrates the large-diameter side and the state as seen from the outside in the radial direction.
Figure 4:
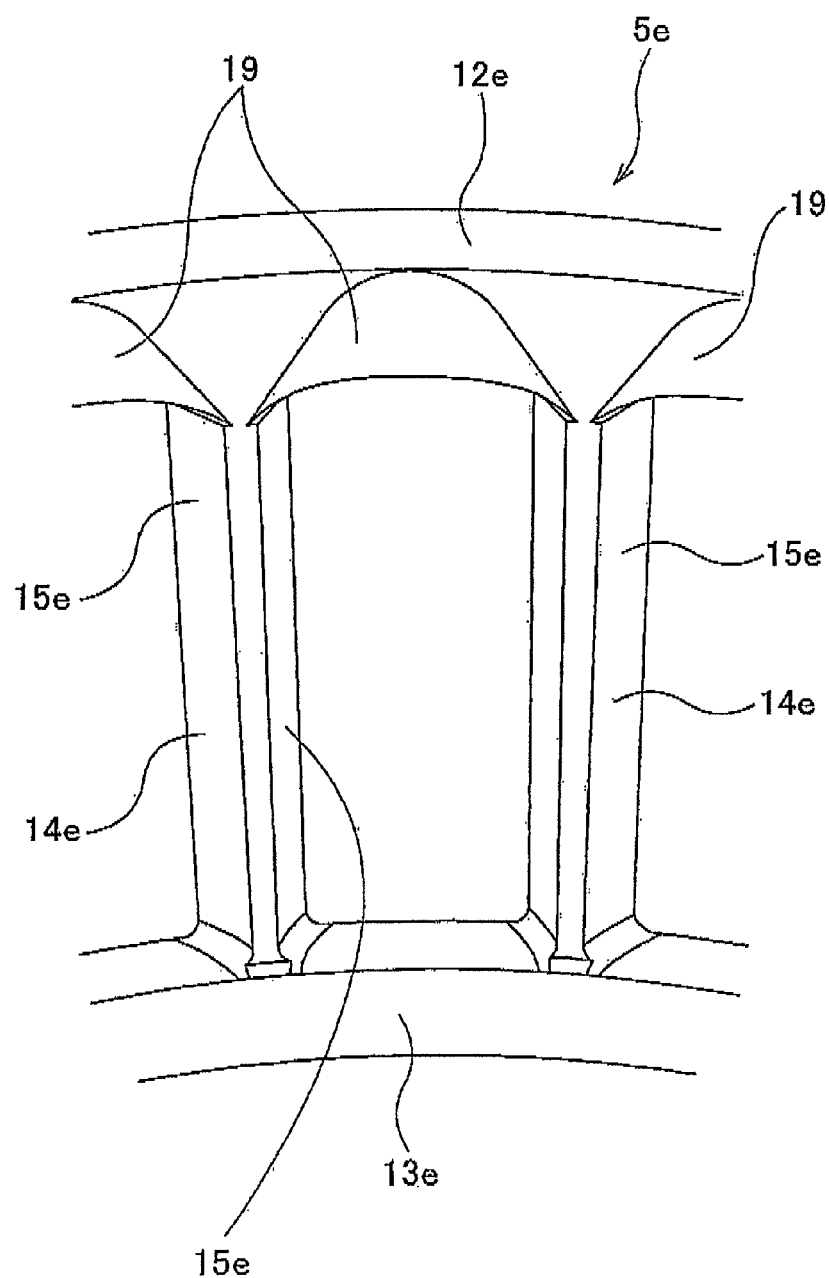
FIG. 4 is an enlarged view of part B in FIG. 3.

During operation of a rotating mechanical apparatus in which the tapered roller bearing 1e of this example, which is constructed as described above, is assembled, the pumping action caused by the centrifugal force created by the revolving motion of the tapered rollers 4a causes the lubrication oil to flow through the internal bearing space 21 inside the bearing, which is located between the inner circumferential surface of the outer ring 2 and the outer circumferential surface of the inner ring 3, from the small-diameter side of the outer raceway 6 and inner raceway 7 toward the large-diameter side, or in other words, from the upper left toward the lower right in FIG. 1. When there is a sufficient amount of lubrication oil, the lubrication oil that flows inside this internal bearing space 21 in this way, also sufficiently lubricates the areas of sliding contact between the end surfaces 10 on the large-diameter side of the tapered rollers 4a and the inside surface 11 in the axial direction of the large-diameter flange section 8 that is formed on the end section on the large-diameter side of the outer circumferential surface of the inner ring 3. Moreover, in this state, part of the lubrication oil that flows in the internal bearing space 21 flows inside the oil retaining concave sections 19 that are formed at a plurality of locations on the inner circumferential surface of the outside-diameter side rim section 12e, and while flowing from the opening section on the pocket 15e side, is discharged to the edge side of the outside end in the axial direction of this large-diameter side rim section 12e. In other words, the lubrication oil that first enters into the oil retaining concave sections 19 is pushed from the oil retaining concave sections 19 by lubrication oil that newly flows in from the opening section on the pocket 15e side. Therefore, during normal operation when lubrication oil is sufficiently supplied, there is always lubrication oil accumulated inside these oil retaining concave sections 19.

When the amount of lubrication oil flowing inside the internal bearing space 21 is reduced from this state or becomes zero due to trouble or failure of the lubrication oil supply pump or leakage of lubrication oil from inside the casing, the feeding of lubrication oil through the openings on the pocket 15e side into the oil retaining concave sections 19 is reduced or stopped. When the feeding of lubrication oil through these openings is reduced or stopped in this way, the lubrication oil that has already accumulated inside the oil retaining concave sections 19 stops being pushed from the inside of these oil retaining concave sections 19 toward the edge on the outside end of the large-diameter rim section 12e, and remains stored inside these oil retaining concave sections 19. In this state, the lubrication oil that is inside these oil retaining concave sections 19 tends to be pushed toward the bottom surface of these oil retaining concave sections by the centrifugal force caused by the rotation of the retainer 5e. As described above, the bottom surface of these oil retaining concave sections 19 is inclined in the width direction and axial direction, so a large portion of the lubrication oil that is accumulated inside these oil retaining concave sections 19 enters into the portion of the concave sections 20 that are formed in the end surfaces 10 on the large-diameter side of the tapered rollers 4a that are held in the pockets 15e near the outside in the radial direction of the tapered roller bearing 1e. Then, as the tapered rollers 4a roll, the lubrication oil that has entered into the concave sections 20 is fed to the areas of sliding contact between the end surfaces 10 on the large-diameter side and the inside surface 11 in the axial direction of the large-diameter side flange section 8, and this lubrication oil permeates into and lubricates these areas of sliding contact.

As can be clearly seen from the explanation above, at the instant that trouble or leakage occurs, a large portion of the lubrication oil that is stored inside the oil retaining concave sections 19 can be used to lubricate the areas of sliding contact. Therefore, it is possible to sufficiently lengthen the time from when a state of insufficient lubrication occurs until the bearing cannot rotate due to seizure. According to testing by the inventors to investigate seizure due to oil dipping, the time until seizure occurred due to a depletion of lubrication oil was nearly three times longer with the tapered roller bearing 1e having construction as illustrated in FIGS. 1 to 4 than in the case of the conventional construction illustrated in FIG. 35 to FIG. 36. Therefore, by providing measures such as using a sensor to detect the occurrence of insufficient lubrication, it becomes possible to have sufficient time to perform measures for slowing the operating speed or safely stopping operation before seizure occurs. It is also possible to move the vehicle to a safe, out of the way location before seizure occurs so that it is possible to shorten the time for restoring the railway, or so that a traffic jam does not occur. Furthermore, it becomes easier to prevent the rotation support unit from becoming impossible to rotate, or prevent trouble in other parts from occurring due to insufficient lubrication, as well as it becomes more difficult for problems to occur such as an increase in expenses and time required for making repairs.

Example 2

Figure 5:
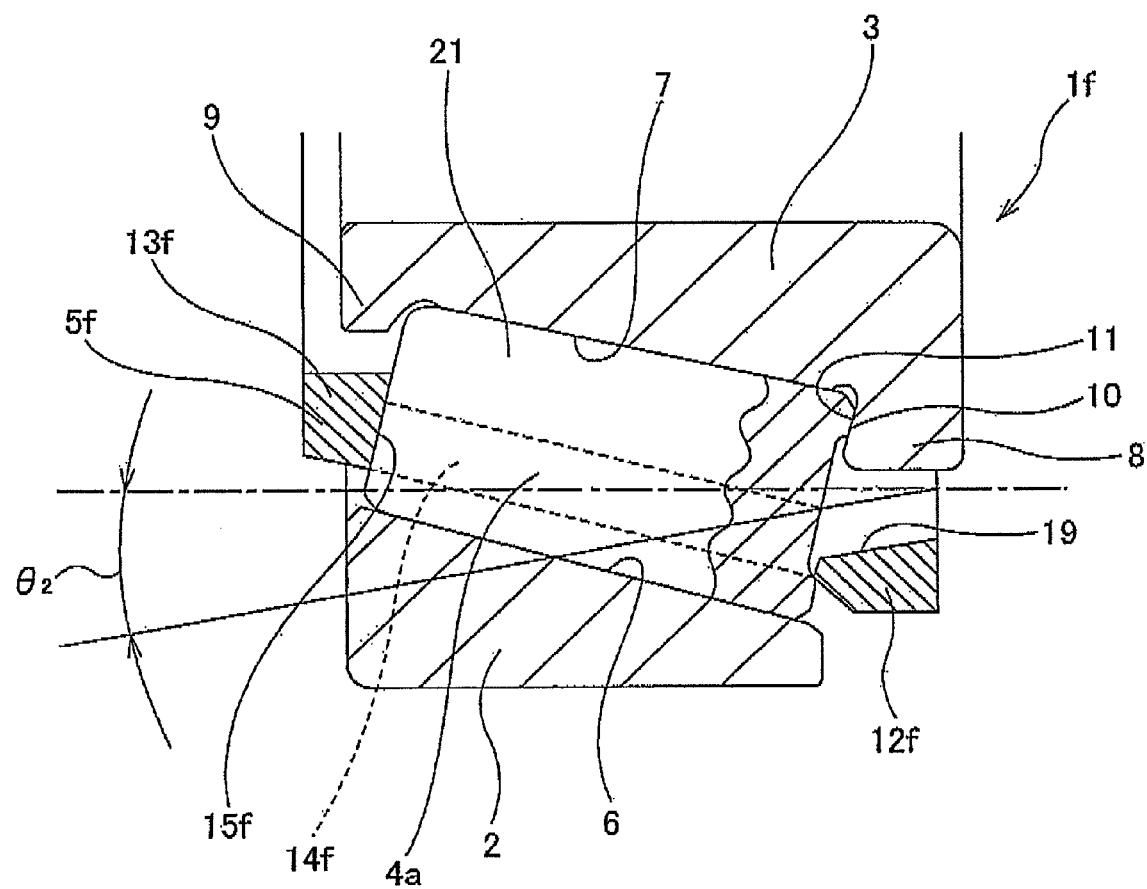
FIG. 5 illustrates a second example of an embodiment of the present invention, and is a partial cross-sectional view of a tapered roller bearing.
Figure 6:
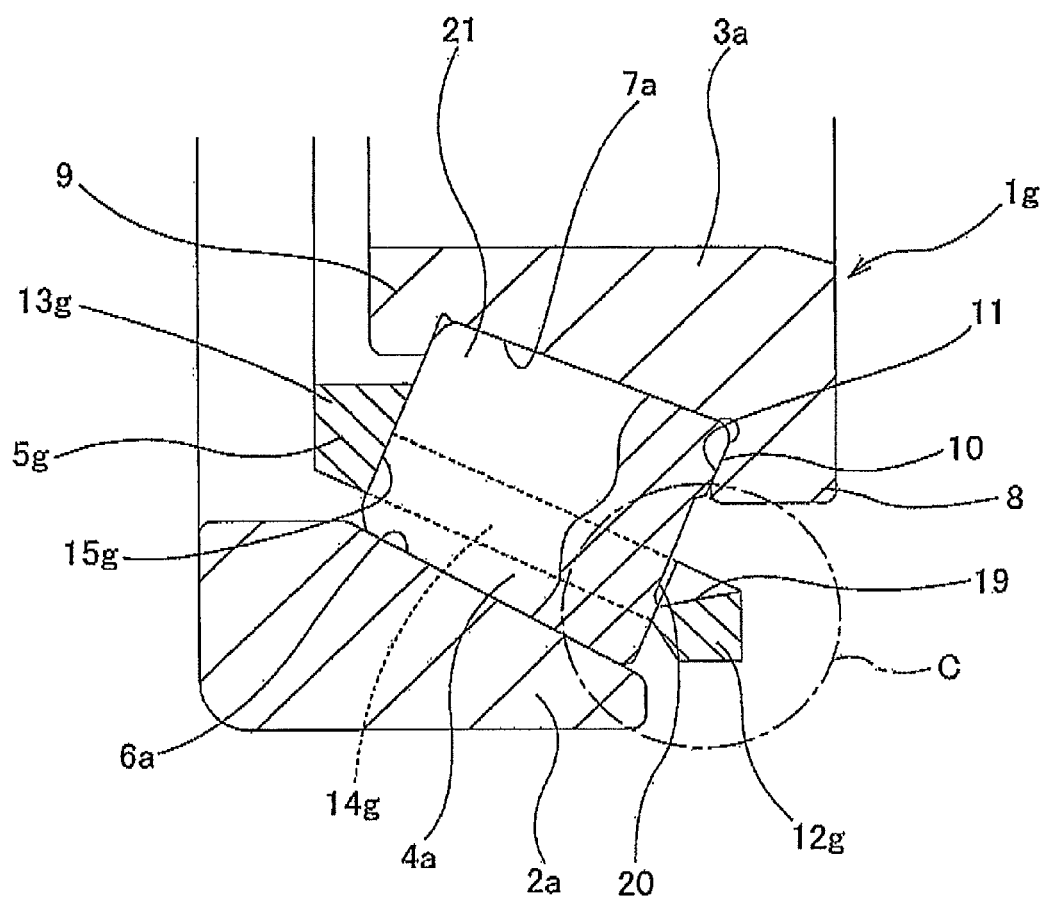
FIG. 6 illustrates a third example of an embodiment of the present invention, and is a partial cross-sectional view of a tapered roller bearing.
Figure 7:
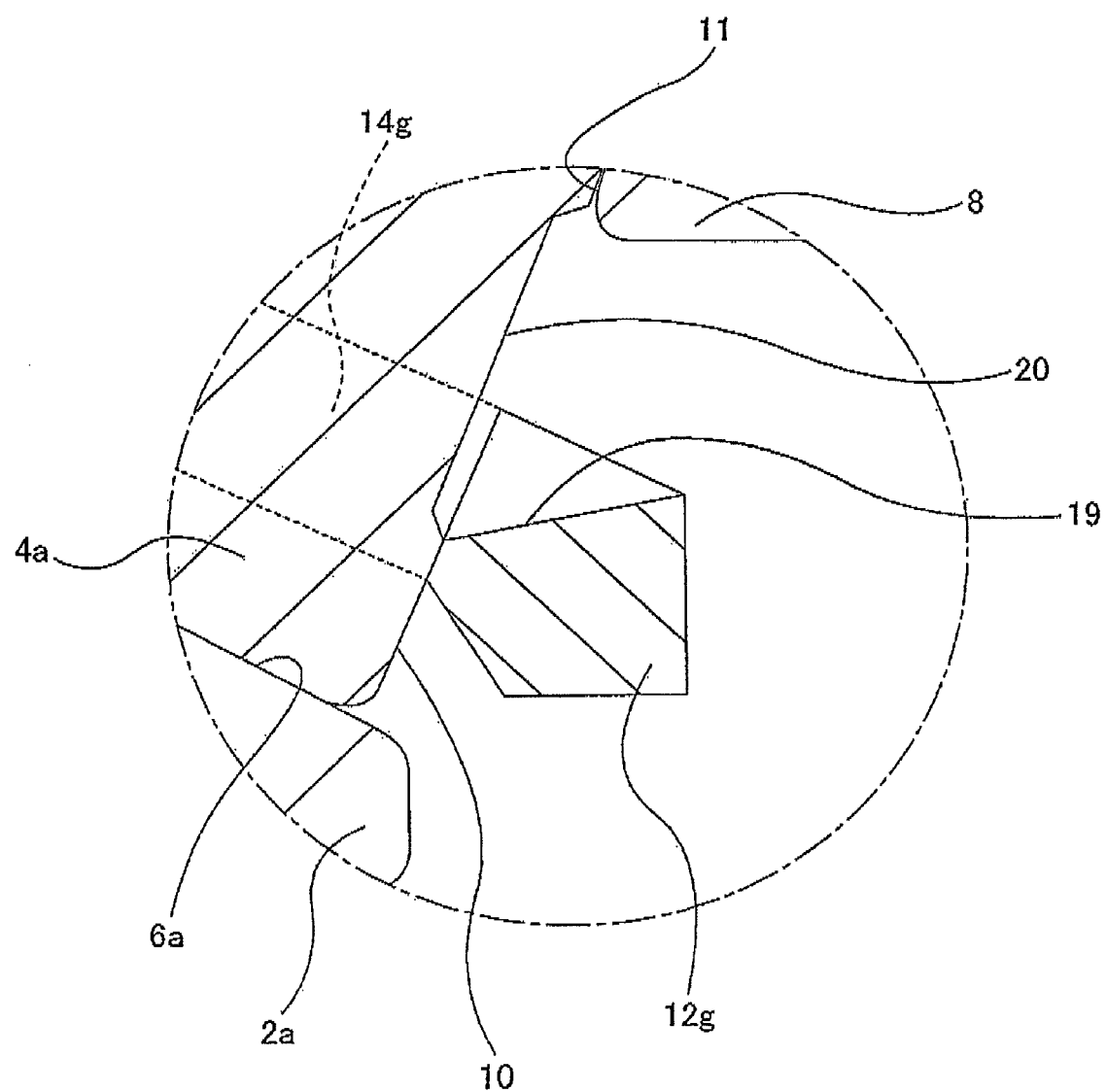
FIG. 7 is an enlarged view of part C in FIG. 6.
Figure 8:
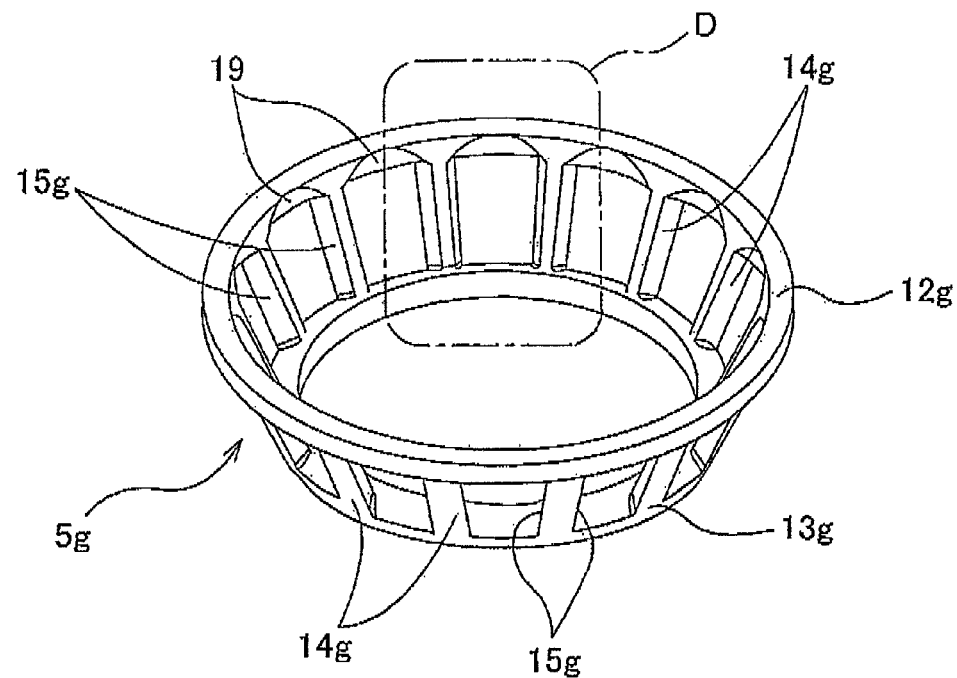
FIG. 8 is a perspective view of a retainer that is assembled in a third example of an embodiment of the present invention, and illustrates the large-diameter side and the state as seen from the outside in the radial direction.
Figure 9:
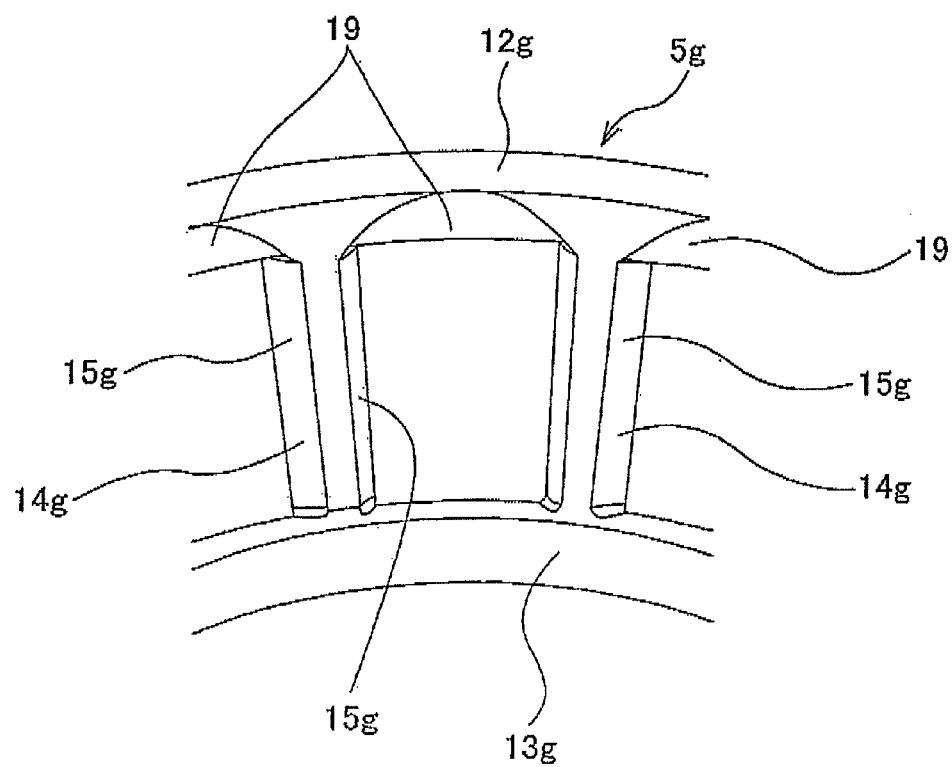
FIG. 9 is an enlarged view of part D in FIG. 8.

FIG. 5 illustrates a second example of an embodiment of the present invention. In this example, not only is the bottom section of the oil retaining concave sections 19, which are formed on the inner circumferential surface of the large-diameter rim section 12f in portions that correspond with the pockets 15f, but the inner circumferential surface of the large-diameter rim section 12f itself, which is separated in the circumferential direction from the oil retaining concave sections 19, is inclined by an angle $\theta_2$ with respect to the center axis of the retainer 5f in a direction toward the outside in the radial direction when going toward the pockets 15f.

With construction such as this example, not only the lubrication oil that is stored in the oil retaining concave sections 19, but the lubrication oil that adheres to the inner circumferential surface of the large-diameter side rim section 12f as well is efficiently directed to the end surfaces 10 on the large-diameter side of the tapered rollers 4a that are held inside the pockets 15f. As a result, at the instant that insufficient lubrication occurs, the lubrication oil that remains on the end sections on the large-diameter side of the retainer 5f can be effectively used for lubricating the areas of sliding contact between the end surfaces 10 on the large-diameter side of the tapered rollers 4a and the inner surface 11 in the axial direction of the large-diameter side flange section 8 that is formed on the end section on the large-diameter side of the outer circumferential surface of the inner ring 3, and thus it is possible to lengthen the time from when a state of insufficient lubrication occurs until rotation becomes impossible.

The construction and function of the other parts are the same as in the first example of an embodiment described above, so any redundant drawings and explanations are omitted.

Example 3

FIG. 6 to FIG. 9 illustrate a third example of an embodiment of the present invention. This example illustrates the case when the present invention is applied to a tapered roller bearing 1g in which the contact angle of the tapered rollers 4a is large. As described above, in the case of a tapered roller bearing 1g in which the angle of inclination with respect to the center axis of the outer raceway 6a that is formed around the inner circumferential surface of the outer ring 2a and the inner raceway 7a that is formed around the outer circumferential surface of the inner ring 3a is large, and the inclination angle of the axis of rotation of the tapered rollers 4a with respect to the center axis of the outer ring 2a and inner ring 3a is 20° or greater, or further is 25° or more, the problem during a state of insufficient lubrication becomes even more severe. In other words, when a state of insufficient lubrication occurs, the time until severe damage, such as seizure occurs becomes short.

On the other hand, in the case of a tapered roller bearing having a large contact angle, the thrust load capacity can be increased, and may be able to be used in a rotation support unit to which a large thrust load is applied. Therefore, in the case of this example, by applying the present invention to a tapered roller bearing 1g having a large contact angle, it is possible to lengthen the time until severe damage, such as seizure, occurs even when the lubrication state of the rotation support unit to which a large thrust load is applied becomes insufficient. In order to apply the present invention to a tapered roller bearing 1g having a large contact angle in this way, a retainer in which the difference between the diameter of the large-diameter side rim section 12g and the diameter of the small-diameter side rim section 13g is large, and in which the angle of inclination of the plurality of column sections 14g that span between these rim sections 12g, 13g is large, can be used as the retainer 5g that is assembled in the construction of this example.

The construction and function of the other parts are the same as in the first example of an embodiment as illustrated in FIGS. 1 to 4 and described above, so the same reference numbers are assigned to identical parts, and any redundant explanation is omitted.

Example 4

Figure 10:
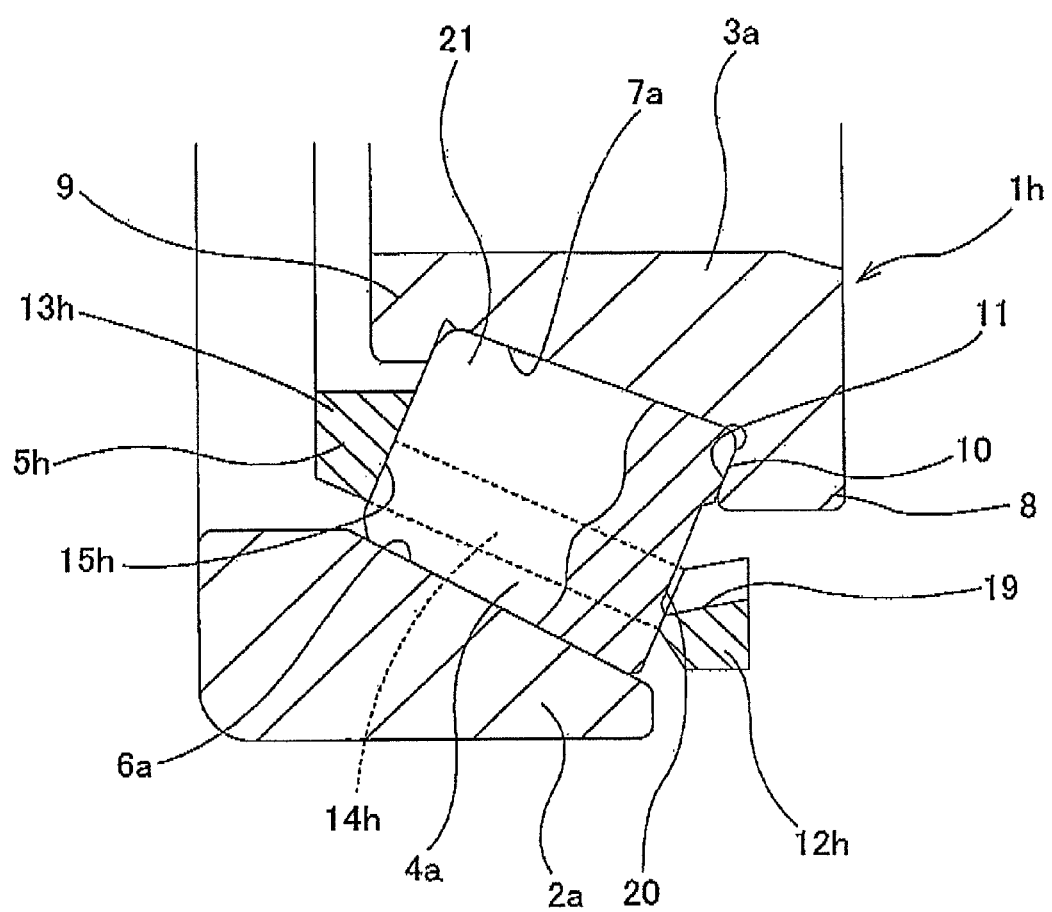
FIG. 10 illustrates a fourth example of an embodiment of the present invention, and is a partial cross-sectional view of a tapered roller bearing.
Figure 11:
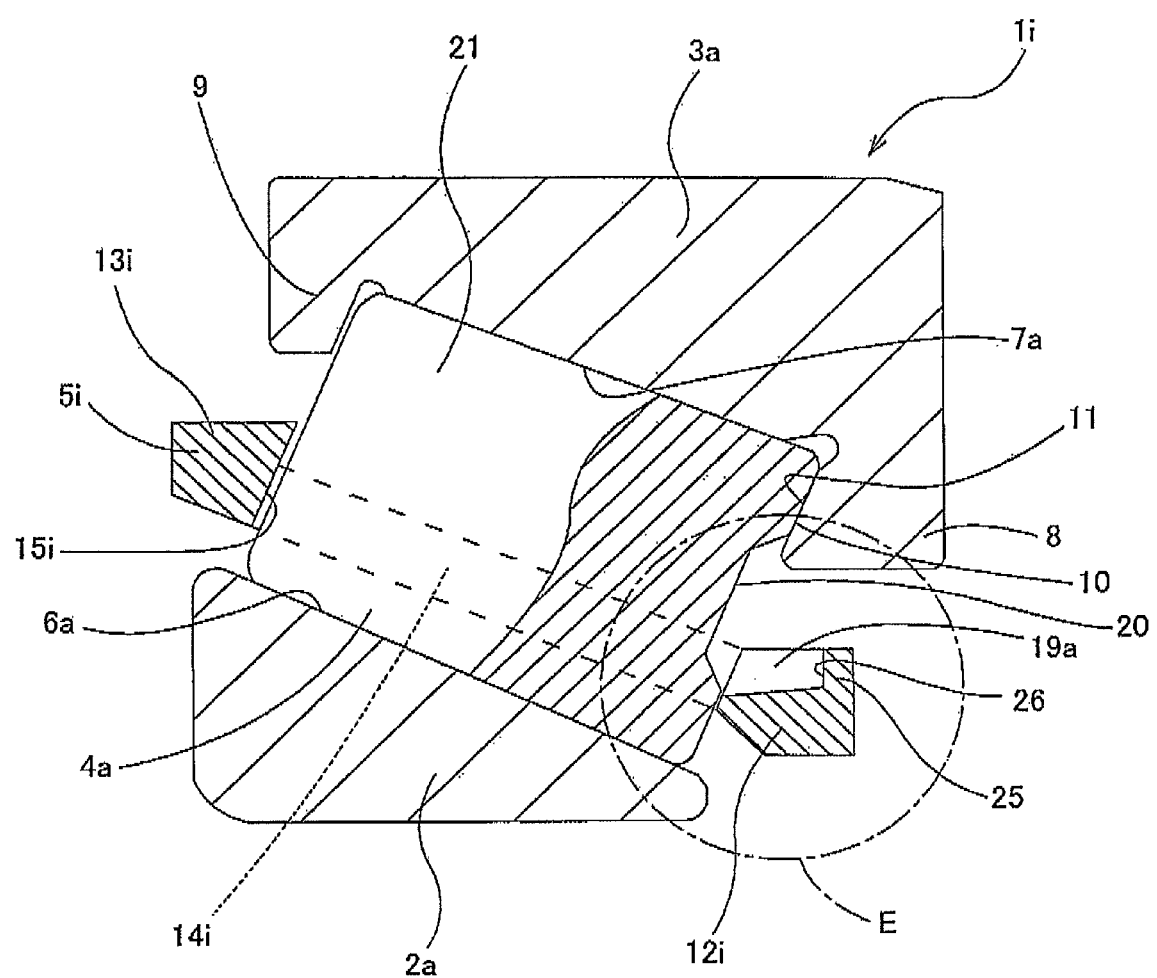
FIG. 11 illustrates a fifth example of an embodiment of the present invention, and is a partial cross-sectional view of a tapered roller bearing.
Figure 12:
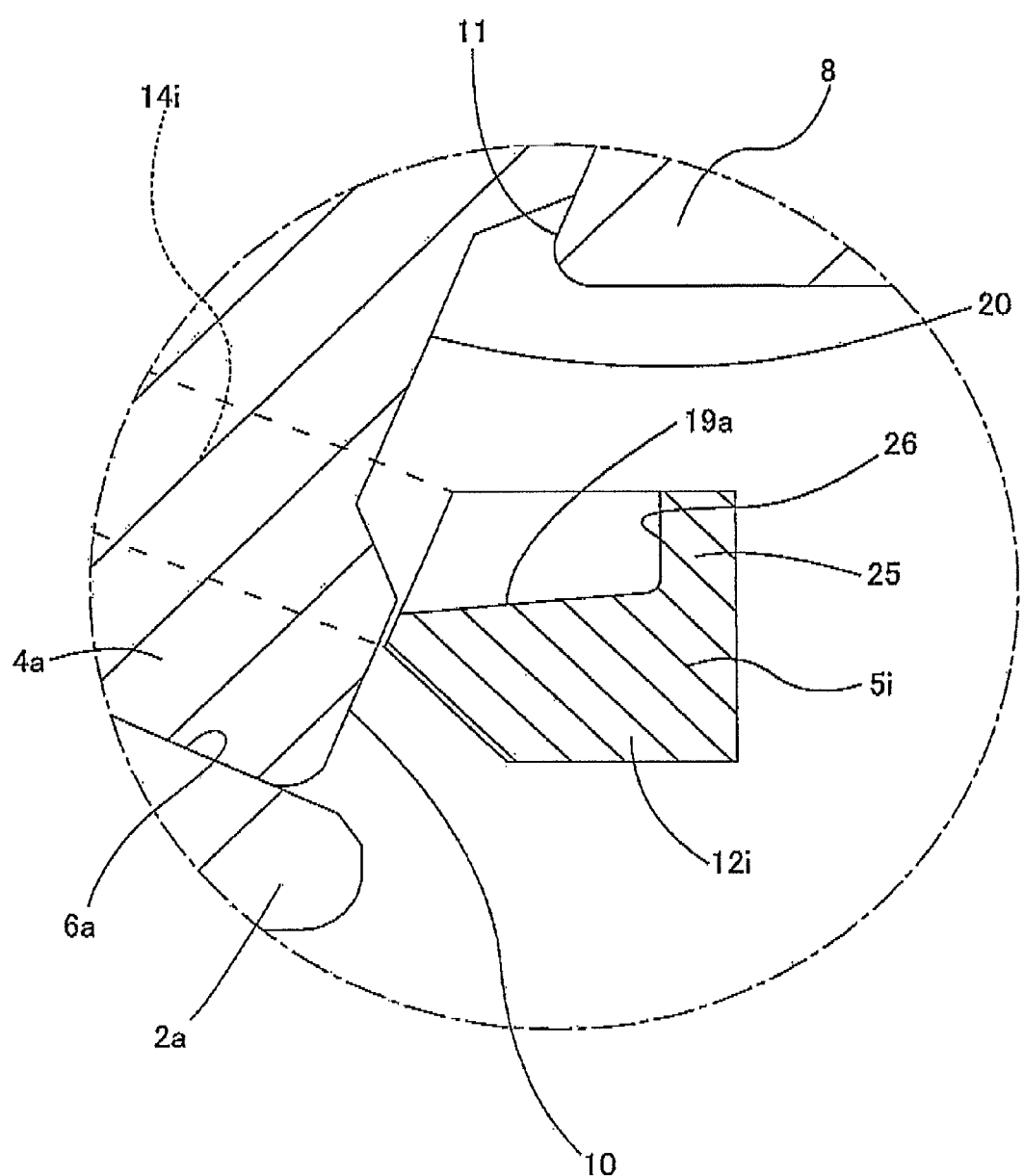
FIG. 12 is an enlarged view of part E in FIG. 11.
Figure 13:
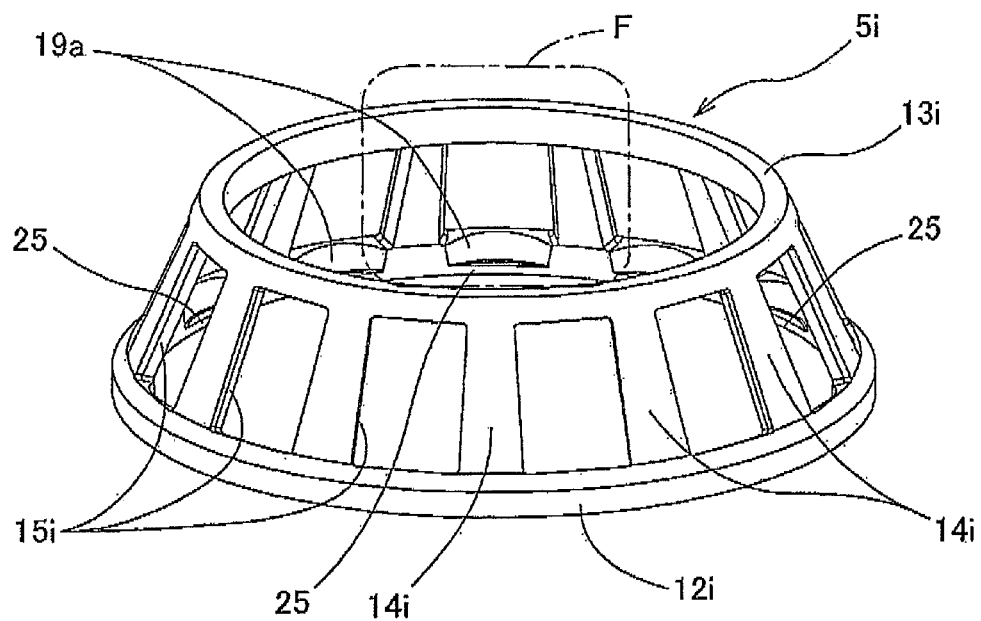
FIG. 13 is a perspective view of a retainer that is assembled in a fifth example of an embodiment of the present invention, and illustrates the small-diameter side and the state as seen from the outside in the radial direction.
Figure 14:
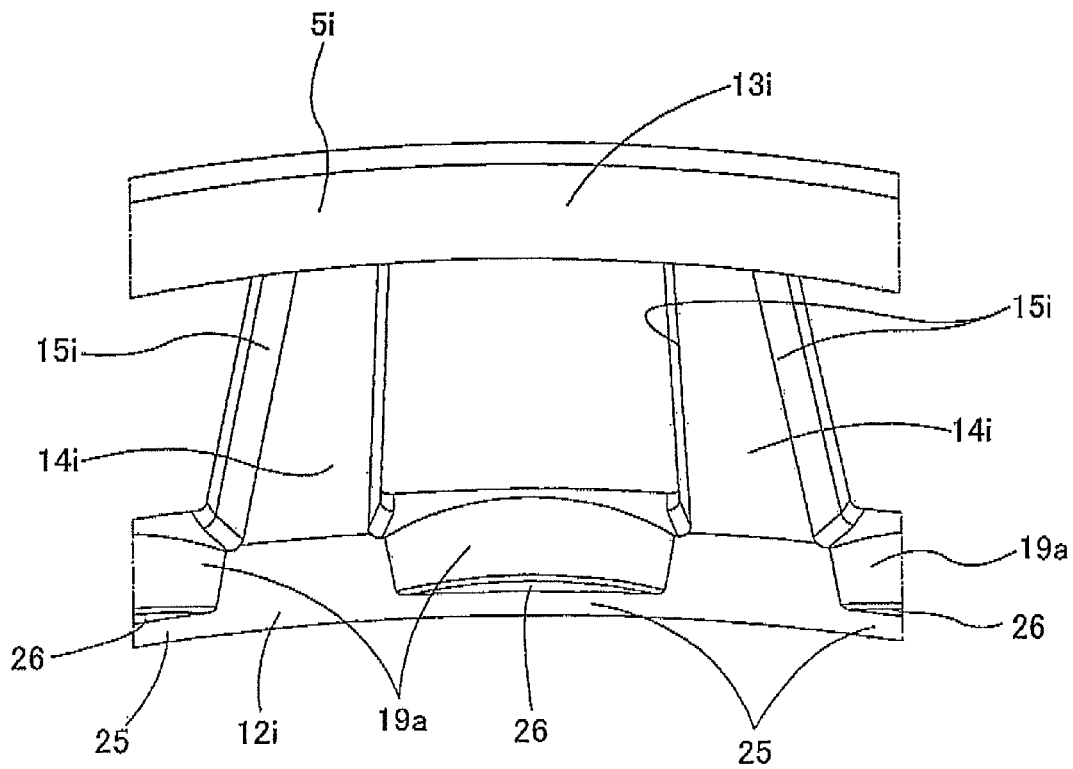
FIG. 14 is an enlarged view of part F in FIG. 13.

FIG. 10 illustrates a fourth example of an embodiment of the present invention. In this example, as in the third example of the embodiment described above, a case in which the present invention is applied to a tapered roller bearing 1h with tapered rollers 4a having a large contact angle is illustrated. Together with this large contact angle, the points of making the difference between the diameter of the large-diameter side rim section 12h and the diameter of the small-diameter side rim section 13h of the retainer 5h large, and making the angle of inclination of the column sections 14h large, are the same as in the third example of the embodiment described above, and the point of making the portion of the inner circumferential surface of the large-diameter side rim section 12h that is separated in the circumferential direction from the oil retaining concave sections 19 incline outward in the radial direction going toward the pockets 15h is the same as in the second example of the embodiment illustrated in FIG. 5 and described above, so any redundant drawings and explanations are omitted.

Example 5

FIG. 11 to FIG. 14 illustrate a fifth example of an embodiment of the present invention. In this example, the depth dimension of the oil retaining concave sections 19a, which are formed on the inner circumferential surface of the large-diameter side rim section 12i of the retainer 5i in the portions that correspond with the phase of the pockets 15i, is sufficiently large even in the back end sections of these oil retaining concave sections 19a. In other words, a dam 25 is formed on the side of the outside end surface of the large-diameter side rim section 12i (side on the right end in FIG. 11 and FIG. 12, and the side on the bottom end in FIG. 13 and FIG. 14) partitioning the inner section of the oil retaining concave sections 19a and the outside end surface of the large-diameter side rim section 12i so that inner section of the oil retaining concave sections 19a is not open to the outside end surface of the large-diameter side rim section 12i. In other words, the oil retaining concave sections 19a are given a depth such that the depth from the end section of the opening on the pocket 15i side to the back end section of the surface on the outside end of the large-diameter side rim section 12i is more recessed outward in the radial direction than the inner circumferential surface of this large-diameter side rim section 12i, and a stepped section 26 is provided between the back end section of the bottom surface of the oil retaining concave sections 19a and the inner circumferential surface of the large-diameter side rim section 12i. In this example, the inner diameter of portion of the inner circumferential surface of this large-diameter side rim section 12i that is separated from the oil retaining concave sections 19a does not change in the axial direction, and is a simple cylindrical shaped surface.

With the construction of this example in which oil retaining concave sections 19a that have the form as described above are provided for each pocket 15i, it is possible to increase the capacity of these oil retaining concave sections 19a, and thus it is possible to increase the amount of lubrication oil that is stored inside the oil retaining concave sections 19a. Furthermore, when there is insufficient lubrication, the lubrication oil that is stored inside these oil retaining concave sections 19a, without flowing out to the outside end surface side of the large-diameter side rim section 12i, can be more effectively used for lubricating the areas of sliding contact between the end surfaces 10 on the large-diameter side of the tapered rollers 4a and the inside surface 11 in the axial direction of the large-diameter side flange section 8 that is formed around the outer circumferential surface of the inner ring 3a. As a result, the amount of time from when the lubrication state becomes insufficient until severe damage such as seizure occurs can be lengthened even more.

The construction and function of other parts is the same as in the other examples described above, so the same reference numbers are given to identical or equivalent parts, and any redundant explanation is omitted.

Next, the method of manufacturing the retainer 5i that is assembled in this fifth example of the embodiment by injection molding of synthetic resin will be explained. This manufacturing method can be applied to all of the forms of a synthetic resin retainer disclosed in this specification.

Figure 15:
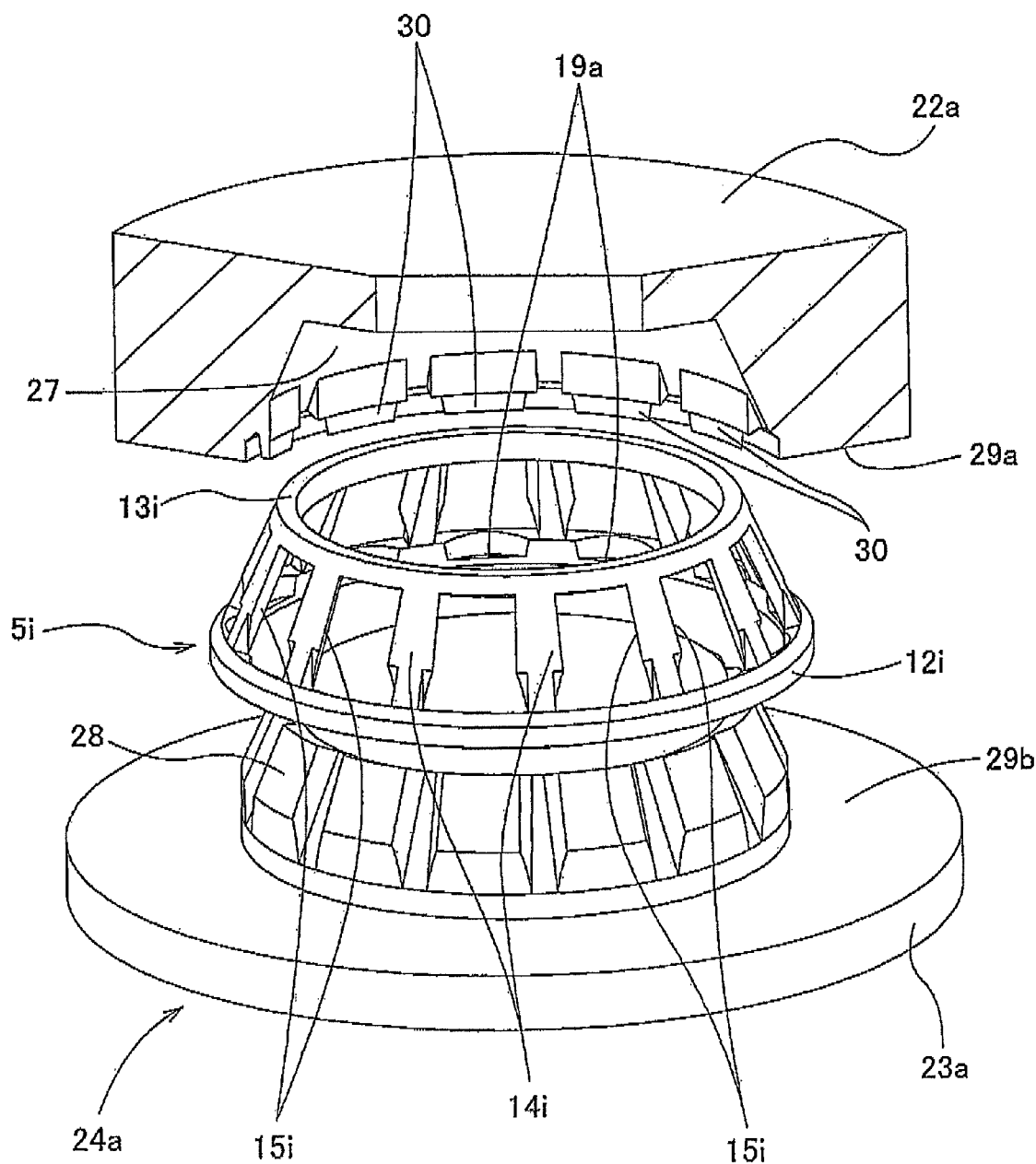
FIG. 15 is a partial cross-sectional perspective view of a die apparatus that is used when forming the retainer of a fifth example of an embodiment of the present invention using injection molding, and illustrates a pair of dies of that die apparatus that are separated from each other.
Figure 16:
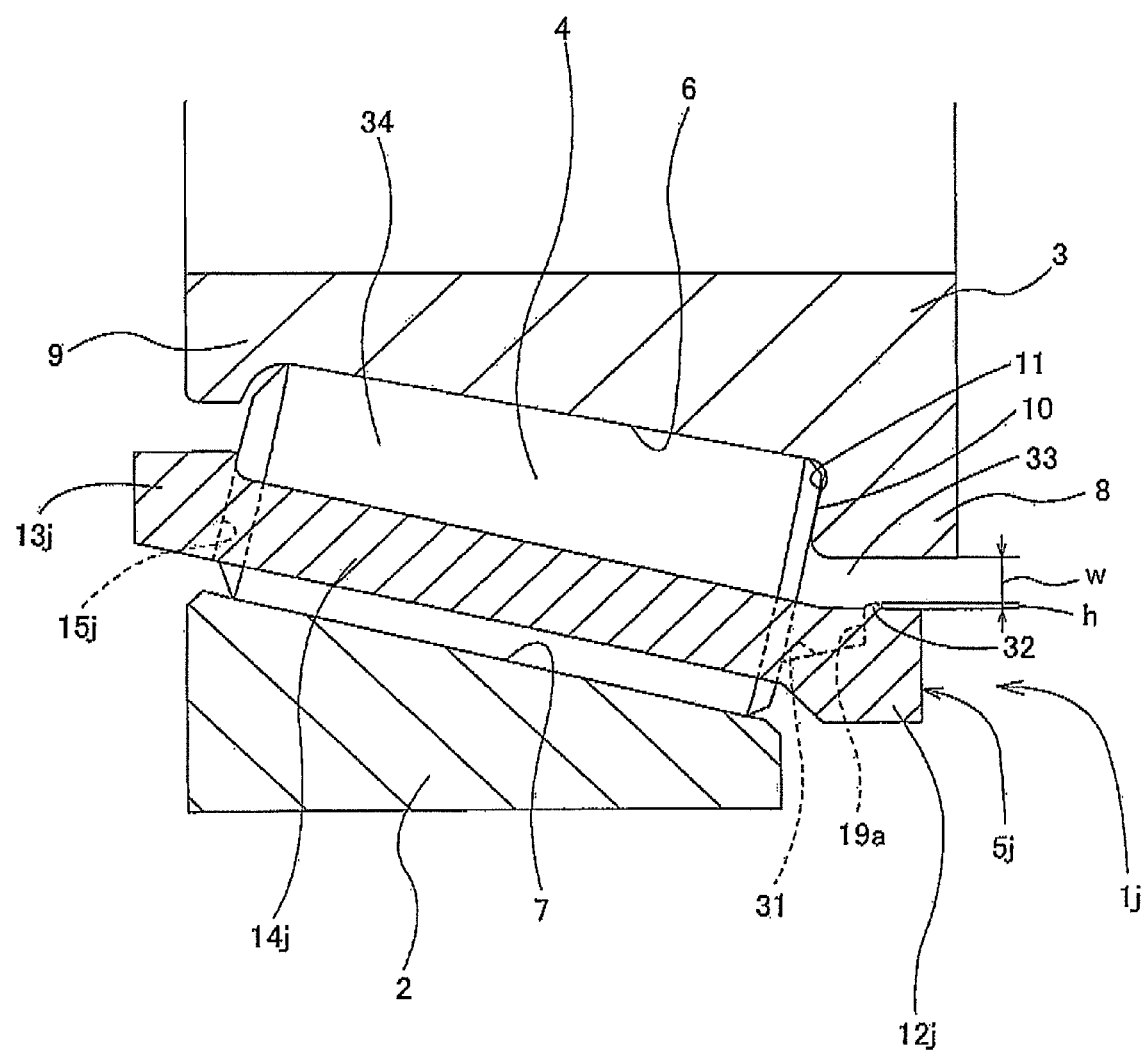
FIG. 16 illustrates a sixth example of an embodiment of the present invention, and is a partial cross-sectional view of a tapered roller bearing.
Figure 17:
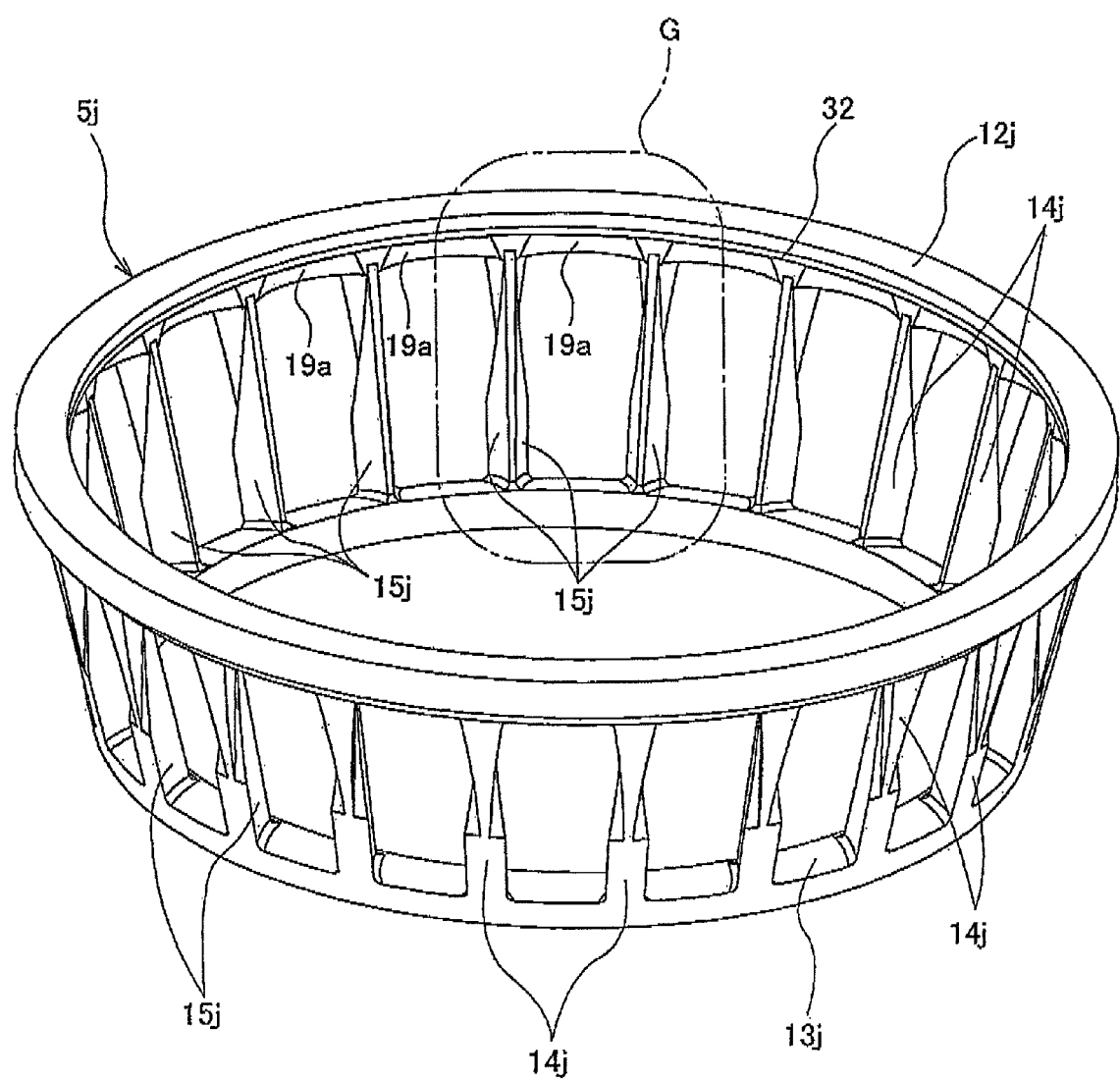
FIG. 17 is a perspective view of a retainer that is assembled in a sixth example of an embodiment of the present invention, and illustrates the large-diameter side and the state as seen from the outside in the radial direction.
Figure 18:
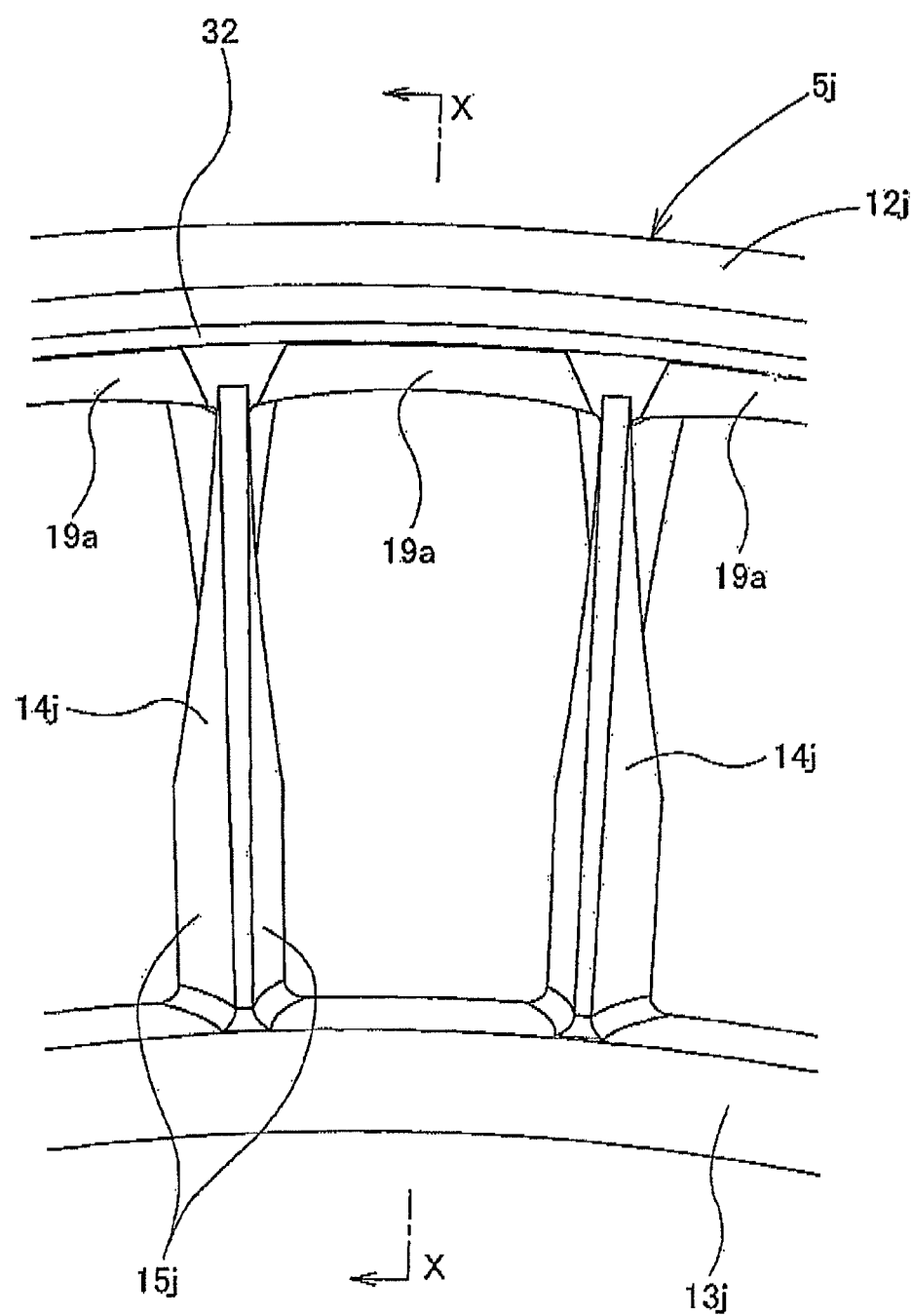
FIG. 18 is an enlarged view of part G in FIG. 17.
Figure 19:
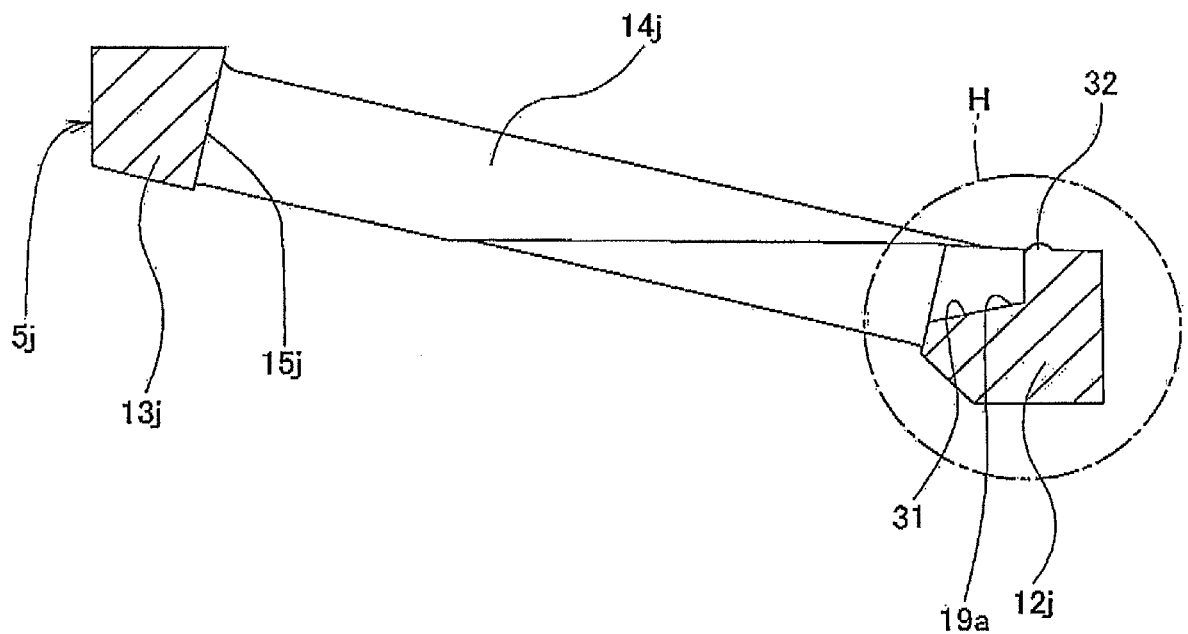
FIG. 19 is cross-sectional view of section X-X in FIG. 18.
Figure 20:
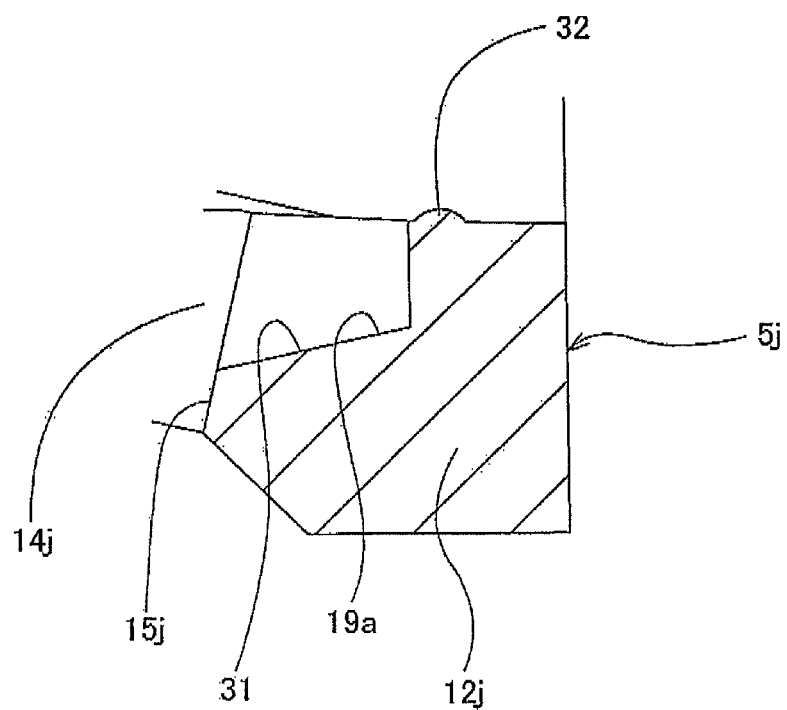
FIG. 20 is an enlarged view of part H in FIG. 19.
Figure 21:
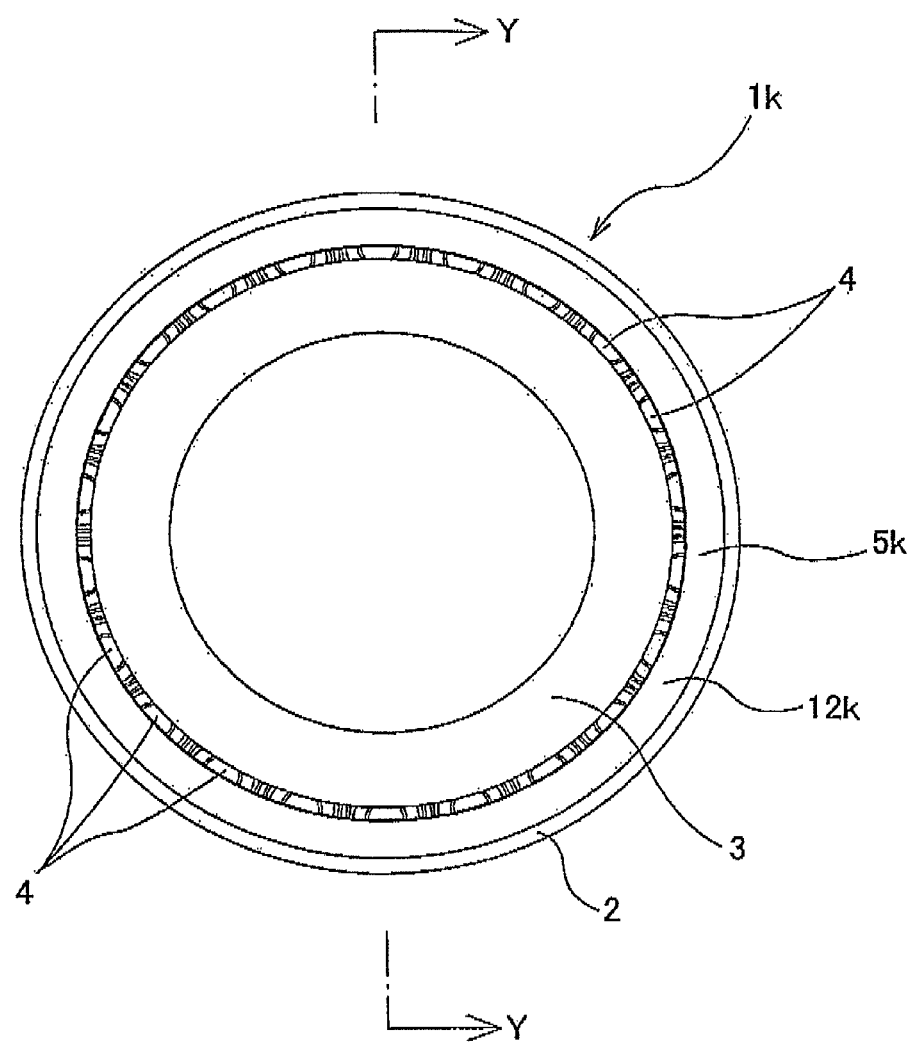
FIG. 21 illustrates a seventh example of an embodiment of the present invention, and is an end view as seen from the side where a large-diameter side flange section is formed around the outer circumferential surface of the inner ring.
Figure 22:
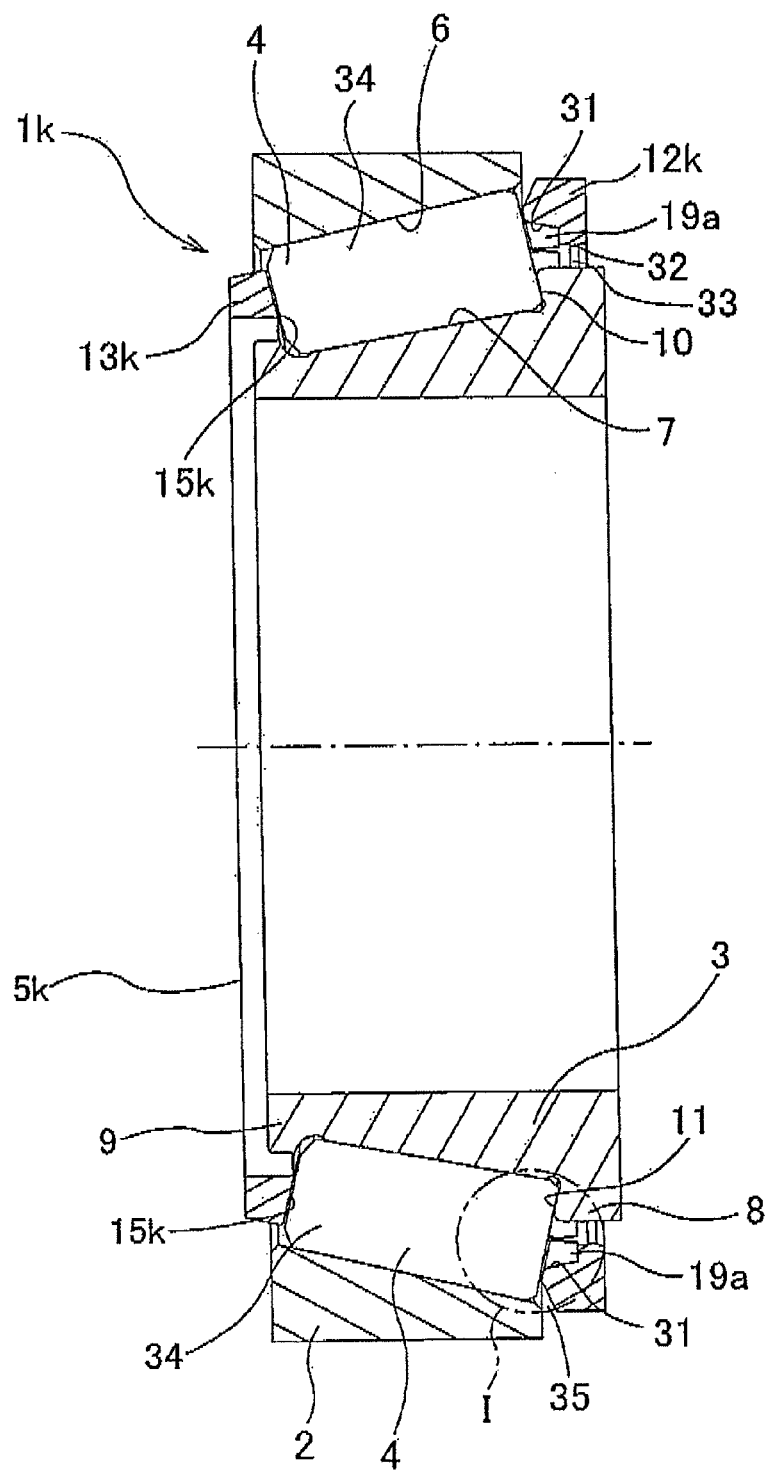
FIG. 22 is a cross-sectional view of section Y-Y in FIG. 21.
Figure 42:
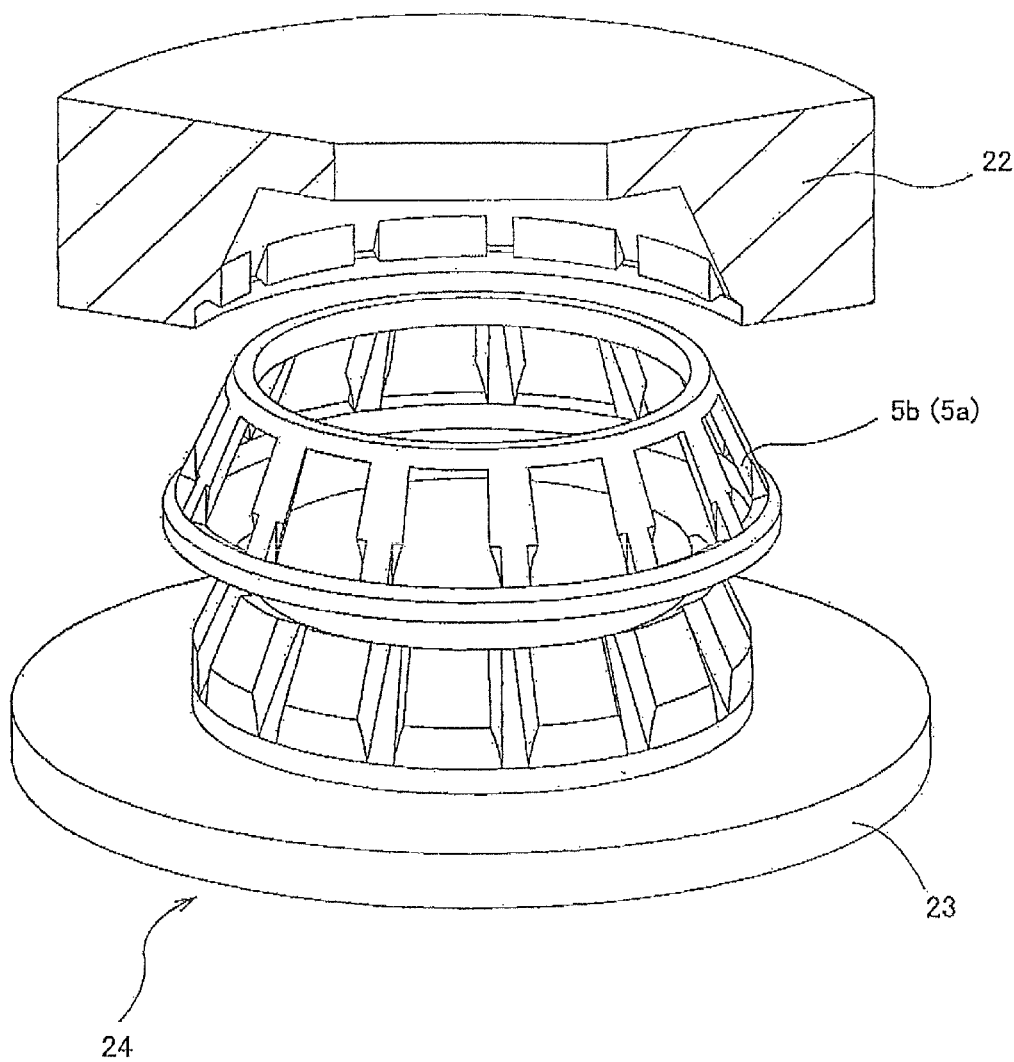
FIG. 42 is a partial cross-sectional perspective view of a die apparatus that is used when forming the retainer of a tapered roller bearing having conventional construction using injection molding, and illustrates a pair of dies of that die apparatus that are separated from each other.
Figure 43:
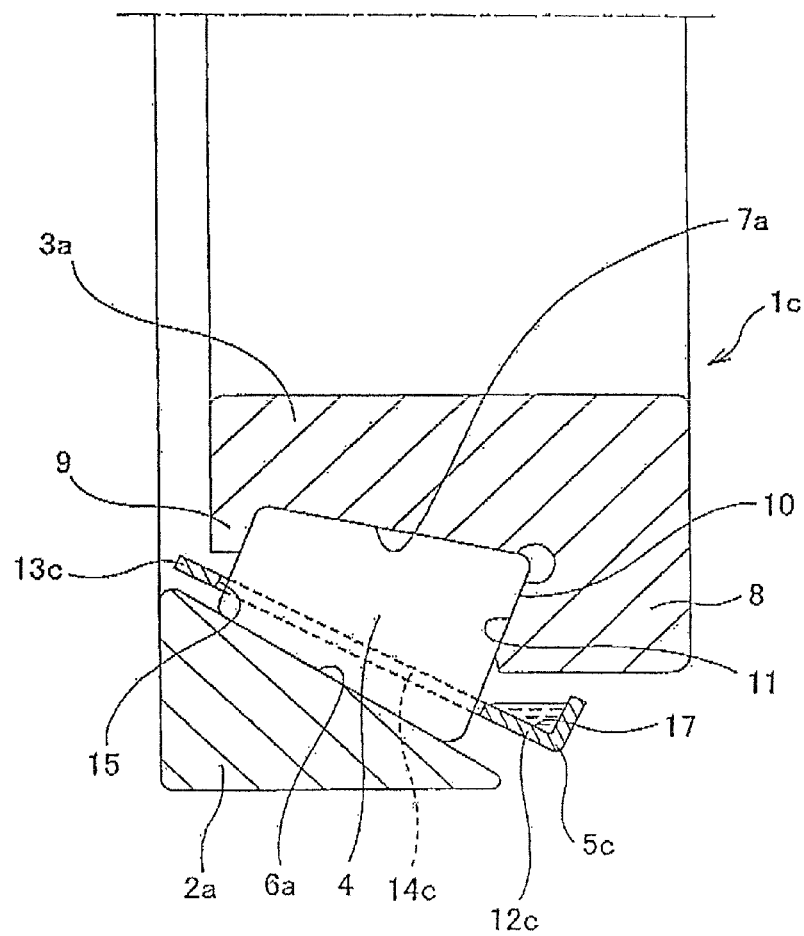
FIG. 43 is a partial cross-sectional view of a fourth example of conventional construction of a tapered roller bearing, in which measures for preventing seizure are taken.
Figure 44:
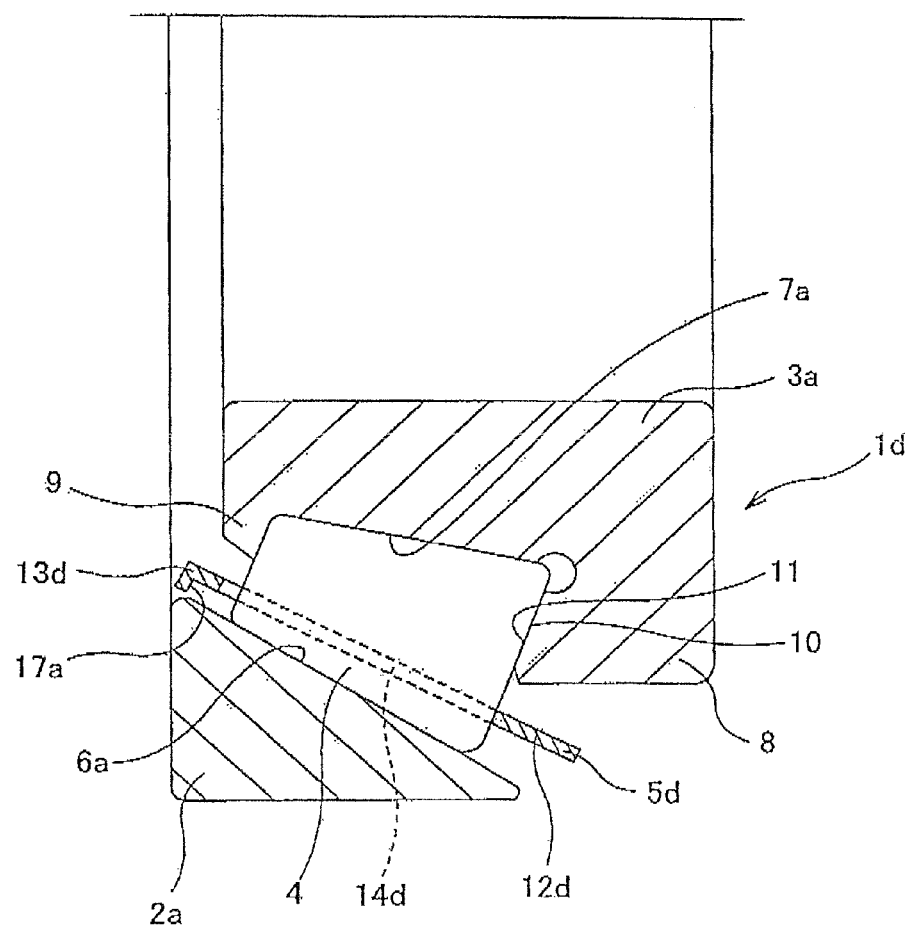
FIG. 44 is a partial cross-sectional view of a fifth example of conventional construction of a tapered roller bearing, in which measures for preventing seizure are taken.
Figure 45:
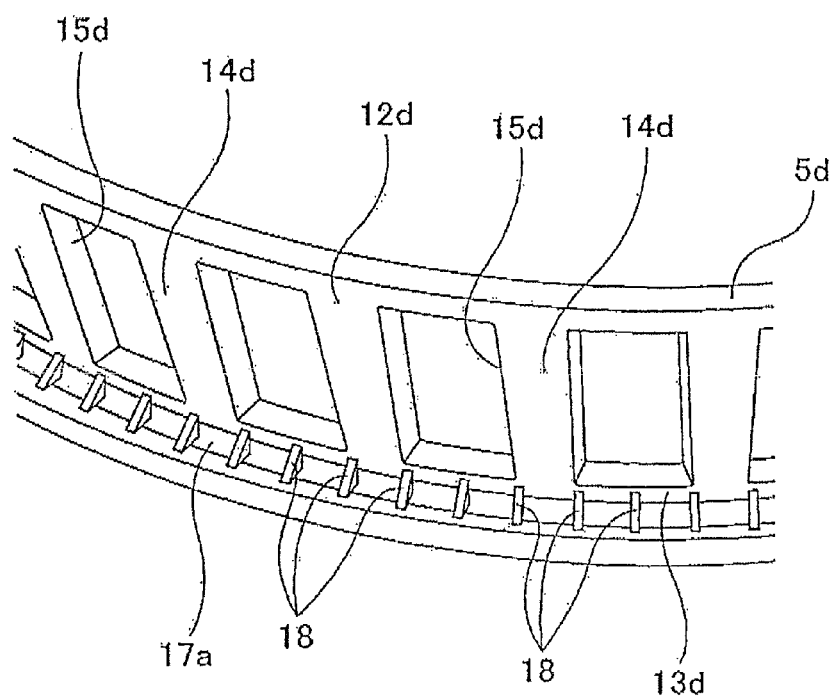
FIG. 45 is a perspective view of a retainer that is assembled in a fifth example of conventional construction, and illustrates a part of the retainer as seen from the large diameter side and the outside in the radial direction.

FIG. 15 illustrates a die apparatus 24a that is used in this manufacturing method. The basic construction of this die apparatus 24a is the same as the conventional die apparatus 24 illustrated in FIG. 42. In other words, the die apparatus 24a of this example comprises a pair of dies 22a, 23a that are arranged so as to be concentric with each other and so as to be able to move toward or away from each other in the axial direction. These dies 22a, 23a are such that when the end surfaces in the axial direction that face each other are brought together, a formation space (cavity) is formed on the inside of this section that has been brought together. Heated molten thermoplastic synthetic resin, to which pressure is applied, is fed through feed openings (gates) that are formed in one or in both of the dies 22a, 23a into the formation space, and the retainer 5i is injection molded by axial drawing.

Of the dies 22a, 23a, a concave molding section 27 is formed in the center section of the end surface in the axial direction (bottom surface in FIG. 15) of one die 22a that is illustrated on the top in FIG. 15, and an convex molding section 28 is formed in the center section of the end surface in the axial direction (top surface in FIG. 15) of the other die 23a that is illustrated on the bottom in FIG. 15. The portions near the outer perimeter of the end surfaces in the axial direction of these dies 22a, 23a that surround the concave molding section 27 or the convex molding section 28 are flat surfaces 29a, 29b that can come in close contact with each other such that molten synthetic resin that is fed into the formation space cannot leak out. When these flat surfaces 29a, 29b are in contact with each other, the formation space is formed in the portion that is surrounded by the concave molding section 27 and the convex molding section 28.

Particularly, in this example, in the portion further near the inside in the radial direction than the edge section of the opening of the concave molding section 27 that is formed on the end surface in the axial direction of the one die 22a, convex sections 30 for forming the respective oil retaining concave sections are provided in the portions that corresponds to the pockets 15i of the retainer 5i to be formed, or in other words, in the portions that are in phase in the circumferential direction with the pockets 15i. These convex sections 30 for forming the oil retaining concave sections 19a are for forming oil retaining concave sections 19a in the portions of the inner circumferential surface of the large-diameter side rim section 12i of the retainer 5i that correspond with the pockets 15i, and are formed in the portions near the inner diameter of the formation space for forming the large-diameter side rim section 12i. The tip end surfaces (bottom end surface) of the convex sections 30 for forming the oil retaining concave sections are flat surfaces, and are located further in the portions that are further recessed in the axial direction (up/down direction) than the flat surface 29a. The back end sections of the oil retaining concave sections 19a are formed such that the dam section 25 explained in FIG. 11 to FIG. 14 can be formed. Moreover, the cross-sectional area of the tip end sections of the convex sections 30 for forming the oil retaining concave sections is ensured, in other words, the tip end sections for the convex sections 30 for forming the oil retaining concave sections are prevented from becoming a thin, pointed shape. The tip end sections of the convex sections 30 for forming the oil retaining concave sections 19a are such that they are not easily damaged, making it possible to maintain the durability of the die apparatus 24a. Furthermore, in order that there are no so-called undercut portions in any portion of the dies 22a, 23a where the portions on the base end side are recessed more than the portions on the tip end side, it is possible to perform injection molding by axial drawing of the retainer 5i with just a pair of dies 22a, 23a.

With the flat surfaces 29a, 29b of the dies 22a, 23a, having construction described above, brought in contact together, molten synthetic resin can be fed through a feed opening (not illustrated in the figure) that is formed in one of the dies 22a, 23 into the formation space. This kind of feed opening is formed in the formation space in at least the formation space for forming the large-diameter side rim section 12i of the retainer 5i and similarly in the formation space for forming the small-diameter side rim section 13i. Furthermore, the position of each feed opening coincides with each other between the formation spaces for the rim sections in the circumferential direction of the formation spaces for these rim sections. Preferably, the feed openings are formed in part of the formation space for the large-diameter side rim section and the formation space for the small-diameter side rim section in each of the sections between the portions where column sections 14i that are adjacent in the circumferential direction are to be formed.

When performing injection molding of the retainer 5i using a die apparatus 24a having construction as described above, synthetic resin in a molten state is fed through each of the feed openings that are provided in the formation spaces for the large-diameter side and small-diameter side rim sections into the formation space of the die apparatus 24a. After doing so, this synthetic resin flows in the circumferential direction through the formation spaces for both rim sections, and then in order to form the column sections, enters into formation spaces for forming the column sections from both ends of the formation spaces for forming the column sections. The synthetic resin collies with each other in the middle section of the formation spaces for forming the column sections and welds are formed here. Welds are not formed in the end sections of each of the column sections 14i or in the connecting sections between the column sections 14i and the large-diameter side rim section 12i or small-diameter side rim section 13i. Therefore, even when used over a long period of time, it is difficult for damage such as cracking to occur in these connecting sections, and thus it is easier to maintain the durability of the retainer 5i. The molten synthetic resin that flowed from the adjacent feed openings in the circumferential direction toward the formation spaces for each of the column sections, flows together in the inlet portions of the formation spaces for each of the column sections, and then enters into the formation spaces for each of the column sections. In the inlet portion the temperature of the synthetic resin is still sufficiently high, so a weld is not formed in that portion.

Example 6

FIG. 16 to FIG. 20 illustrate a sixth example of an embodiment of the present invention. In this example, a ridge 32 that protrudes inward in the radial direction is formed all the way around the circumference of the portion in the middle section in the axial direction of the inner circumferential surface of the large-diameter side rim section 12*j* that is closer to the outside end surface of the large-diameter side rim section 12*j* than the oil retaining concave sections 19*a*. The height (h) of this ridge 32 is preferably as large as possible without hindering the removal of the retainer 5*i* from the dies after injection molding, and so that the width (w) in the radial direction of the annular clearance 33 that is formed between the edge on the tip end (inner circumferential edge) of this ridge 32 and the outer circumferential surface of the large-diameter side flange section 8 that is formed on the end section of the inner ring 3 is within a range that is not too narrow. The width (w) in the radial direction of this annular clearance 33 must be maintained at a certain width in order that the resistance against the flowing movement of lubrication oil inside the internal bearing space 34, that is located between the inner circumferential surface of the outer ring 2 and the outer circumferential surface of the inner ring 3, does not become excessively large during operation of the tapered roller bearing 1*j*. On the other hand, from the aspect of maintaining the amount of lubrication oil that can be supplied to the areas of sliding contact between the end surfaces 10 on the large-diameter side of the tapered rollers 4 that are held inside the pockets 15*j* and the inside surface 11 in the axial direction of the large-diameter side rim section when the lubrication oil supply pump described later fails, the height (h) of the ridge 32 is preferably as large as possible.

With the tapered roller bearing 1*j* of this example, constructed as described above, during normal operation, new lubrication oil flows into each of the oil retaining concave sections 19*a*, and the lubrication oil that was stored in the oil retaining concave sections 19*a* is pushed out, however, the lubrication oil that overflowed from the oil retaining concave sections 19*a* is accumulated all around the entire inner circumferential surface of the large-diameter side rim section 12*j* in the portion closer to the pockets 15*j* than the ridge 32. In other words, due to the existence of this ridge 32, the capacity of the oil retaining concave sections 19*a* is increased by an amount corresponding to the height (h) of this ridge 32, and lubrication oil is accumulated in the portions between the oil retaining concave sections 19*a* with a phase in the circumferential direction that coincides with that of each of the column sections 14*j*.

From the aspect of efficiently collecting the lubrication oil that exists in the portion separated from the oil retaining concave sections 19*a* into oil retaining concave sections 19*a*, the position of the ridge 32 is preferably near these oil retaining concave sections 19*a*. On the other hand, by forming the ridge 32 in the outside end section in the axial direction of the inner circumferential surface of the large-diameter side rim section 12*j*, it is possible to store more lubrication oil in the portion between the pockets 15*j* on the inner circumferential surface of the large-diameter side rim section 12*j* up to the ridge 32. However, in that case, preferably consideration will be taken such as to restrict to the direction of inclination of the portion in between pockets so as to be able to effectively collect the lubrication oil that exists in this in-between portion in the oil retaining concave sections 19*a*.

In any case, as the amount of lubrication oil that is stored in this in-between portion increases, this lubrication oil flows over the inner circumferential edge of the ridge 32 and is discharged from the edge on the outside end in the axial direction of the large-diameter side rim section 12*j*. In other words, the lubrication oil that entered into the oil retaining concave sections 19*a* first is pushed out from the oil retaining concave sections 19*a* by the lubrication oil that newly flows in from the opening section, and is accumulated in the portion of the inner circumferential surface of the large-diameter side rim section 12*j* that nearer to the pockets than the ridge 32. Then, the lubrication oil that was accumulated in this portion is further pushed out toward the edge on the outside end in the axial direction of the large-diameter side rim section 12*j* by the lubrication oil that is pushed out from the oil retaining concave sections 19*a*. Therefore, during normal operation when lubrication oil is sufficiently supplied, lubrication oil is always accumulated and exists inside the oil retaining concave sections 19*a* and in the portion on the inner circumferential surface of the large-diameter side rim section 12*j* nearer to the pockets 15*j* than the ridge 32.

On the other hand, when feeding of lubrication oil from the opening section decreases or stops due to some kind of trouble or leakage, the lubrication oil that is already accumulated in the oil retaining concave sections 19*a* is no longer pushed out from the oil retaining concave sections 19*a* toward the edge on the outside end of the large-diameter side rim section 12*j*, and remains as is inside the oil retaining concave sections 19*a*. Similarly, the lubrication oil that exists in the portion on the inner circumferential surface of the large-diameter side rim section 12*j* that is nearer to the pockets 15*j* than the ridge 32 also remains in that portion. In this state, the lubrication oil that is inside these oil retaining concave sections 19*a* tends to be pushed against the bottom surface 31 of the oil retaining concave sections 19*a* by the centrifugal force caused by the rotation of the retainer 5*j*. The bottom surface 31 of the oil retaining concave sections 19*a* is inclined in both the width direction and the axial direction, so a large amount of the lubrication oil that is accumulated in the oil retaining concave sections 19*a* is fed toward the end surfaces 10 on the large-diameter side of the tapered rollers 4, then due to the rotating motion of the tapered rollers 4, that lubrication oil is fed to and penetrates into the areas of sliding contact between the end surfaces 10 on the large-diameter side and the inside surface 11 in the axial direction of the large-diameter side flange section 8, thus lubricating these areas of sliding contact. Moreover, as the amount of lubrication oil inside the oil retaining concave sections 19*a* decreases, the lubrication oil that is accumulated into the portion on the inner circumferential surface of the large-diameter side rim section 12*j* that is nearer to the pockets 15*j* than the ridge 32 enters into the oil retaining concave sections 19*a*, and then from these oil retaining concave sections 19*a* enters into the areas of sliding contact between the surfaces 10, 11.

As can be clearly seen from the explanation above, at the instant that trouble or leakage occurs, a large amount of the lubrication oil that is accumulated inside the oil retaining concave sections 19*a* and in the portion on the inner circumferential surface of the large-diameter side rim section 12*j* that is nearer to the pockets 15*j* than the ridge 32 can be used for lubrication of the areas of sliding contact between the surfaces 10 and 11. Therefore, it is possible to more sufficiently lengthen the time from when a state of insufficient lubrication occurs until rotation is not possible due to seizure.

In this example as well, it is possible to form a circular or ring-shaped concave section 20 in the center section of the end surfaces 10 on the large-diameter side of the tapered rollers 4. Moreover, instead of the portion on the inner circumferential surface of the large-diameter rim section 12*j* that is separated from the oil retaining concave sections 19*a* and the ridge 32 being a cylindrical surface that is parallel with the center axis of the retainer 5*j*, it can be a partial tapered concave inclined surface that is inclined outward in the radial direction when going in the direction toward the pockets 15*j*. The function of this construction, and the construction and function of the other parts are the same as in examples of the embodiment described above, so the same reference numbers are given to identical or equivalent parts, and any redundant explanation is omitted.

Example 7

FIG. 21 to FIG. 25 illustrates a seventh example of an embodiment of the present invention. In this example, in order to maintain the capacity of the oil retaining concave sections 19*a* while maintaining the strength and rigidity of the large-diameter side rim sections 12*k*, and in order to increase the resistance against lubrication oil that flows to the outside from the internal bearing space of the tapered roller bearing 1*k*, the outer diameter of the large-diameter rim section 12*k* is large and the inner diameter is small.

Figure 23:
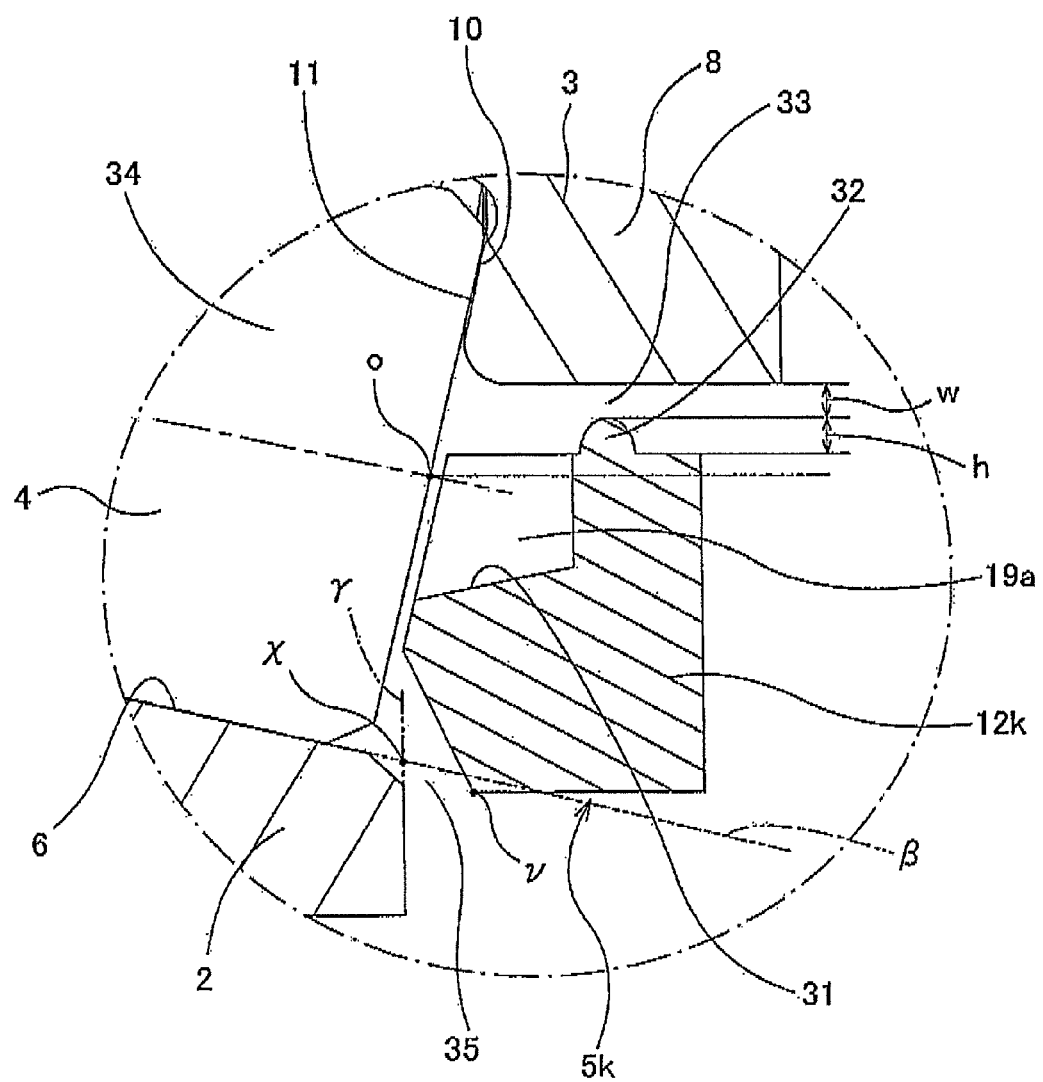
FIG. 23 is an enlarged view of part I in FIG. 22.
Figure 24:
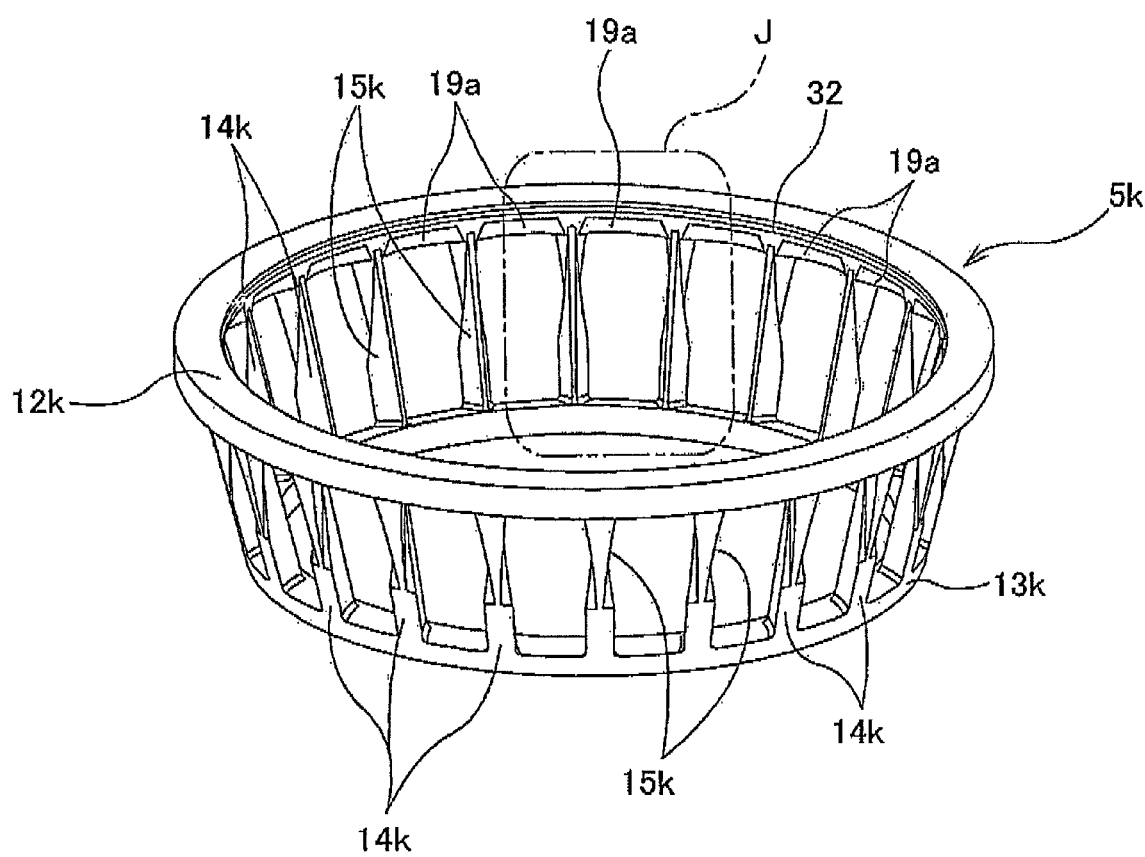
FIG. 24 is a perspective view of a retainer that is assembled in a seventh example of an embodiment of the present invention, and illustrates the large-diameter side and the state as seen from the outside in the radial direction.
Figure 25:
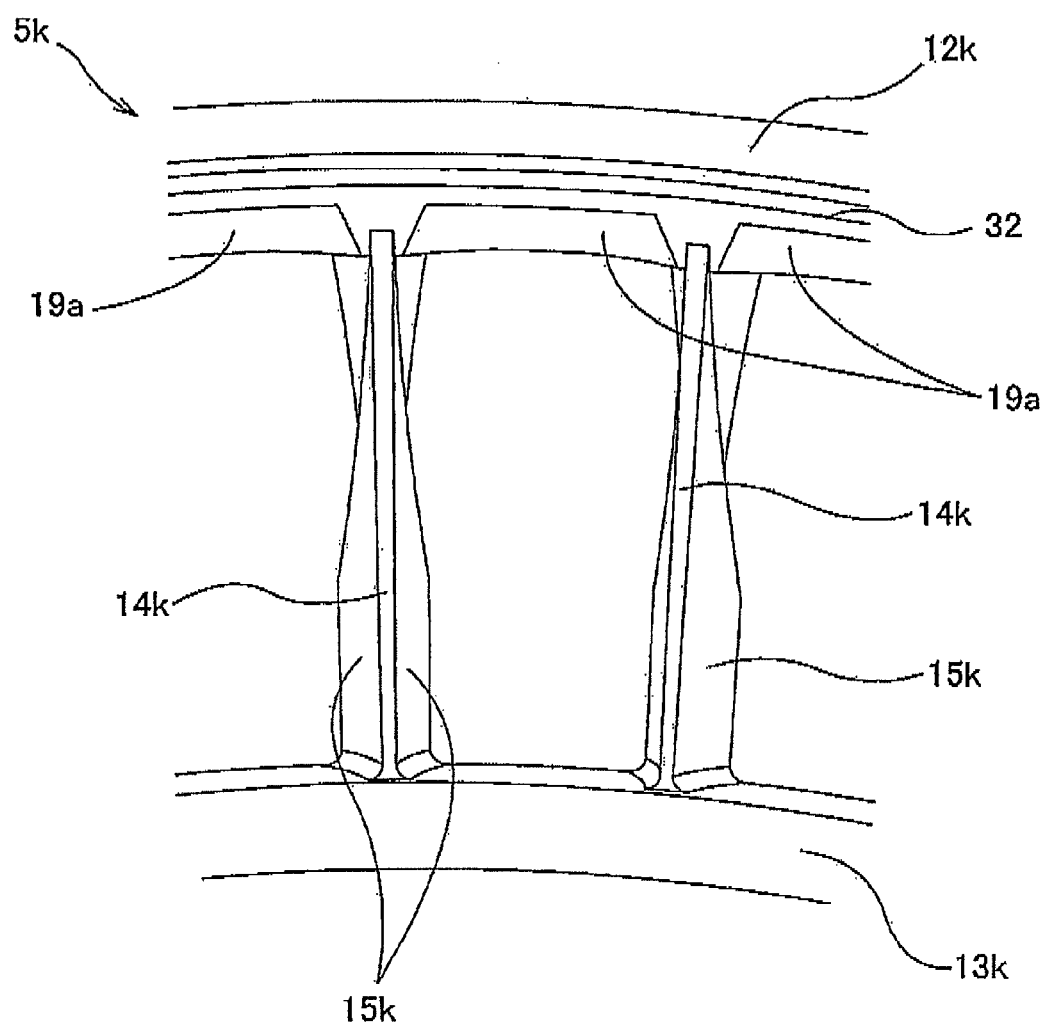
FIG. 25 is an enlarged view of part J in FIG. 24.

More specifically, the outer diameter of the large-diameter side rim section 12*k* is regulated as described below. That is, as illustrated in FIG. 23, the intersecting point $\chi$ between the extension line $\beta$ of the generating line of the inner circumferential surface of the outer ring 2 and the extension line $\gamma$ of the generating line of the end surface on the large-diameter side of the outer ring 2 is temporarily set. Moreover, point $\upsilon$, which represents the edge of the inside end that is the end in the axial direction of the outer circumferential surface of the large-diameter side rim section 12*k* that is near the end surfaces 10 on the large-diameter side of the tapered rollers 4, is temporarily defined. This point $\upsilon$ on the outer circumferential surface of the large-diameter side rim section 12*k* is located further on the outside in the radial direction of the inner ring 3 and outer ring 2 of the tapered roller bearing 1*k* than the point $\chi$ on the inner circumferential surface of the outer ring 2. Also, as illustrated in FIG. 23, preferably part of the large-diameter side rim section 12*k* is located on the extension line of the generating line $\beta$ of the inner circumferential surface of the outer ring 2, and the width of the annular clearance 35 through which the lubrication oil that flows in the internal bearing space 34 from the small-diameter side to the large-diameter side flows through last is narrow and bent into a non-linear shape.

Moreover, in regards to the inner diameter of the large-diameter side rim section 12*k*, the position in the radial direction of the edge on the inside end, which is the edge of the end in the axial direction of the inner circumferential surface of the large-diameter side rim section 12*k* that is near the end surfaces 10 on the large-diameter side of the tapered rollers 4, is located further on the inside in the radial direction of the outer ring 2 and inner ring 3 than the position in the radial direction of the center point o of the end surface 10 on the large-diameter side of the tapered rollers 4.

In this example, the outer diameter of the large-diameter side rim section 12*k* is large and the inner diameter is kept small, so it is possible to sufficiently increase the thickness dimension in the radial direction. Therefore, in consideration of maintaining the strength and rigidity required for this large-diameter rim section 12*k* as well, it is possible to increase the depth dimension of the oil retaining concave sections 19*a*, and thus it is possible to increase the capacity of the oil retaining concave sections 19*a*. Consequently, during normal operation, it is possible to sufficiently increase the amount of lubrication oil that exists in the oil retaining concave sections 19*a*.

Moreover, in this example, at the instant that trouble or leakage occurs, a large amount of the lubrication oil that is in the internal bearing space 34 can be used for lubrication of the areas of sliding contact. In other words, by making the outer diameter of the large-diameter side rim section 12*k* large, and by making the width of the annular clearance 35 narrow and bent, it becomes easier for the lubrication oil that is passing through the internal bearing space 34 to accumulate inside this internal bearing space 34. Therefore, as described above, at the instant when trouble or leakage occurs, a large amount of the lubrication oil that is in the internal bearing space 34 can also be used for lubrication of the areas of sliding contact.

In this example as well, as in the sixth example of the embodiment, it is possible to form a ridge 32 all the way around the middle section in the axial direction of the inner circumferential surface of the large-diameter side rim section 12*k* nearer to the surface on the outside end of the large-diameter side rim section 12*k* than the oil retaining concave sections 19*a*, with this ridge 32 protruding inward in the radial direction. The function and effect of this kind of construction is the same as that of the sixth example.

As can be clearly seen from the explanation above, at the instant that trouble or leakage occurs, a large amount of the lubrication oil that is accumulated in the oil retaining concave sections 19*a*, and that is accumulated on the inner circumferential surface of the large-diameter side rim section 12*k* nearer to the pockets 15*k* than the ridge 32 can be used for lubricating the areas of sliding contact between the surfaces 10 and 11. Furthermore, in addition to this, a large amount of the lubrication oil that is inside the internal bearing space 34 can be used for lubricating these areas of sliding contact. Therefore, it is possible to sufficiently lengthen the time from when a state of insufficient lubrication occurs until rotation stops due to seizure. The construction and function of the other parts are the same as in the other examples of the embodiment, so the same reference numbers are given to identical or equivalent parts, and any redundant explanation is omitted.

Examples 8 to 10

Eighth through tenth examples of an embodiment of the present invention will be explained using FIGS. 26A to 26C. The seventh example of the embodiment described above comprises all of the following three elements: 1) the position in the radial direction of the edge on the inside end, which is the edge of the end in the axial direction of the outer circumferential surface of the large-diameter rim section 12*k* that is near the end surface on the large-diameter side of the tapered rollers 4, is located further on the outside than the position in the radial direction of the intersecting point between the generating line of the inner circumferential surface of the outer ring 2 and the generating line of the end surface on the large-diameter side of the outer ring 2; 2) a ridge 32 that protrudes inward in the radial direction is formed all the way around the middle section in the axial direction of the inner circumferential surface of the large-diameter side rim section 12*k* in the portion nearer to the surface on the outside end of the large-diameter side rim section 12*k* than the oil retaining concave sections 19*a*; and 3) the position in the radial direction of the edge on the inside end, which is the edge of the end in the axial direction of the inner circumferential surface of the large-diameter side rim section 12*k* that is near the end surface on the large-diameter side of the tapered rollers 4, is located further inside than the position in the radial direction of the center point of the end surface on the large-diameter side of the tapered rollers 4. However, the construction of the eighth example of the embodiment illustrated in FIG. 26A comprises only the element 1). The construction of the ninth example of the embodiment illustrated in FIG. 26B comprises the elements 1) and 2). Furthermore, the construction of the tenth example of the embodiment illustrated in FIG. 26C comprises the elements 1) and 3).

Figure 26:
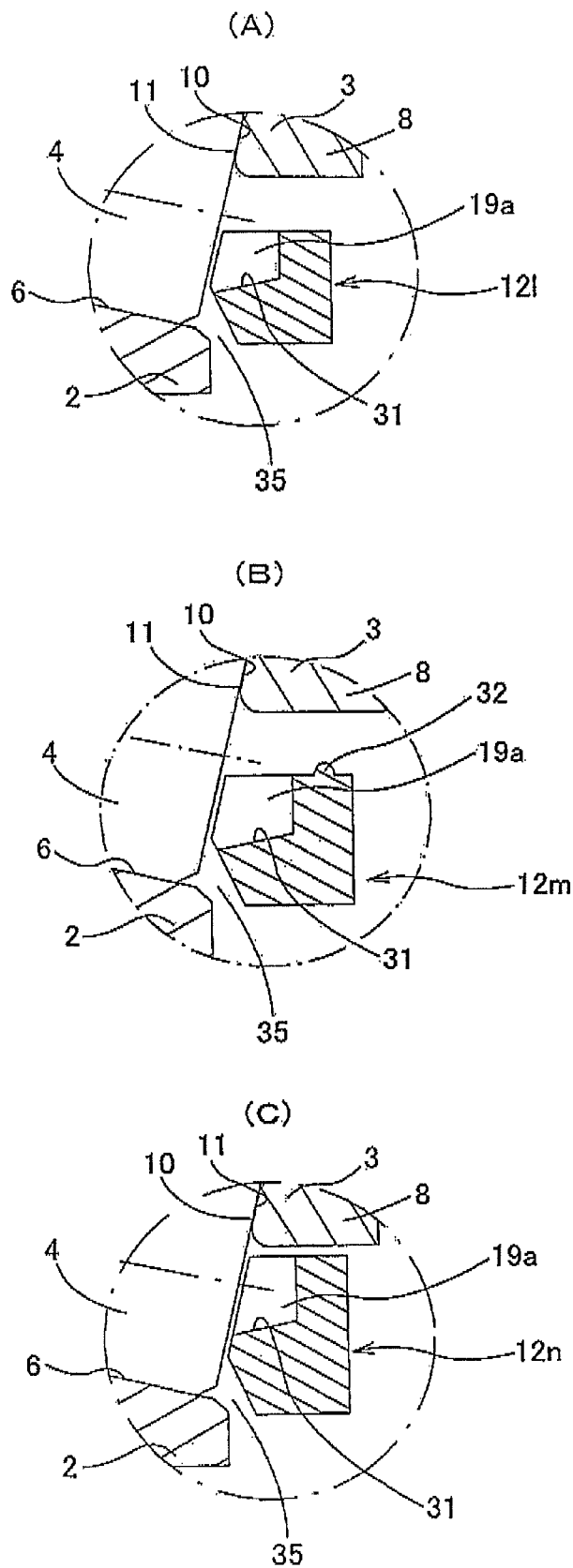
FIGS. 26A to 26C respectively illustrate an eighth example, a ninth example and a tenth example of an embodiment of the present invention, and are enlarged cross-sectional views similar to that of FIG. 23.

That is, the construction of the eighth example of the embodiment illustrated in FIG. 26A is such that, together with omitting the ridge 32 from the construction of the seventh example of the embodiment (FIG. 22 to FIG. 25), the inner diameter of the large-diameter side rim section 12*l* is larger than in the case of the construction of the seventh example. Moreover, the construction of the ninth example of the embodiment illustrated in FIG. 26B is such that the inner diameter of the large-diameter side rim section 12*m* is larger than in the case of the construction of the seventh example. Furthermore, the construction of the tenth example of the embodiment illustrated in FIG. 26C is such that, together with omitting the ridge 32 from the construction of the seventh example of the embodiment described above (FIG. 22 to FIG. 25), the portion of the inner circumferential surface of the large-diameter side rim section 12*n* that is separated from the oil retaining concave sections 19*a* is a simple cylindrical surface. The construction of these eighth through tenth examples of the embodiment is such that when compared with the construction of the seventh example of the embodiment described above, the amount of lubrication oil that can be used for lubricating the areas of sliding contact between the end surfaces 10 on the large-diameter side of the tapered rollers 4 and the inside surface 11 in the axial direction of the large-diameter side flange section 8 on the outer circumferential surface of the inner ring 3 after a state of insufficient lubrication occurs is less, however, when compared with the conventional construction, the amount of lubrication oil that can be used for lubricating these areas of sliding contact after a state of insufficient lubrication occurs is greater.

[Testing to Confirm the Effect of the Seventh through Tenth Examples]

Figure 27:
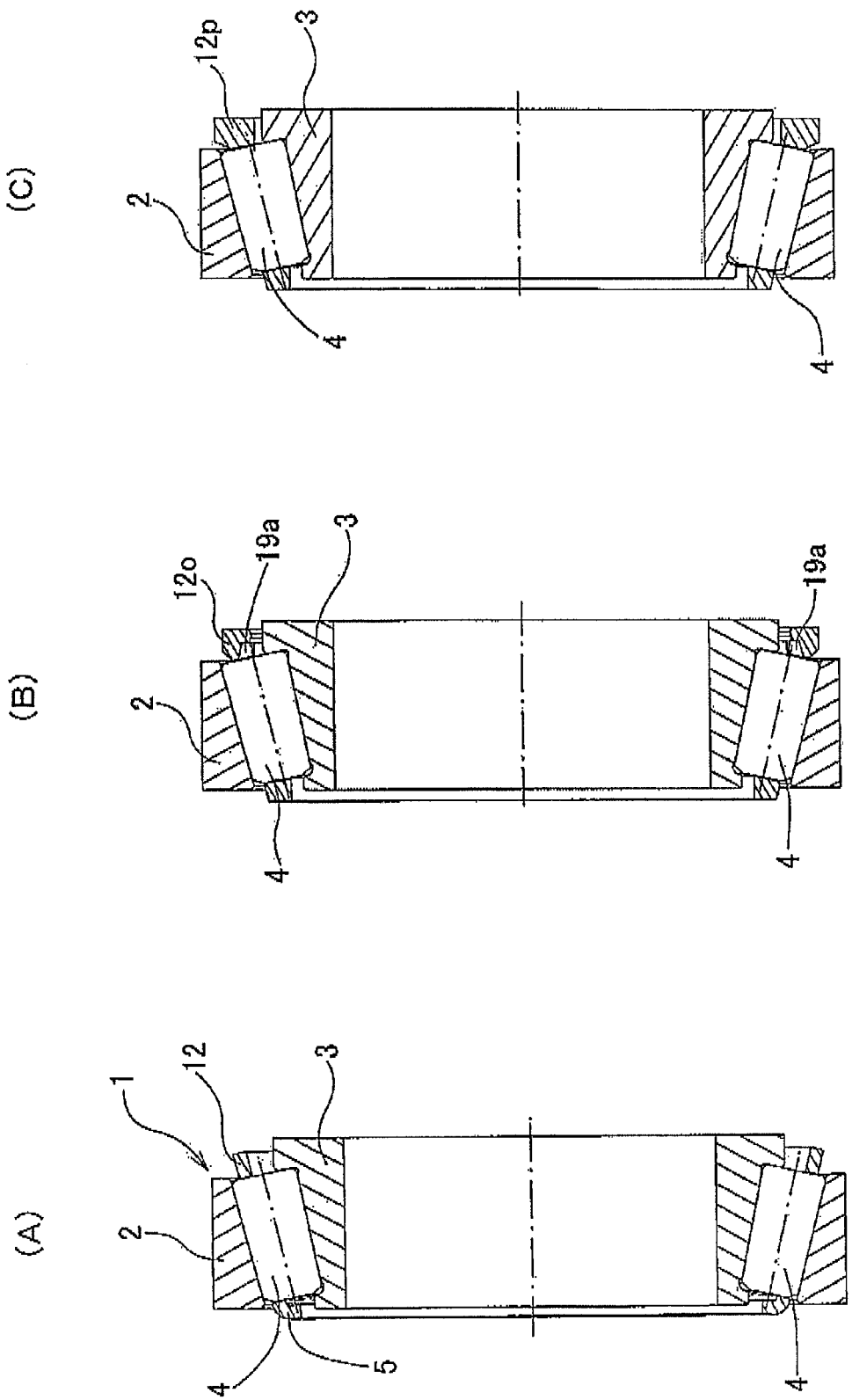
FIGS. 27A to 27C respectively illustrate basic construction, a first comparative example and a second comparative example for comparing with the seventh through tenth examples of an embodiment of the present invention, and are cross-sectional views similar to that of FIG. 22.
Figure 28:
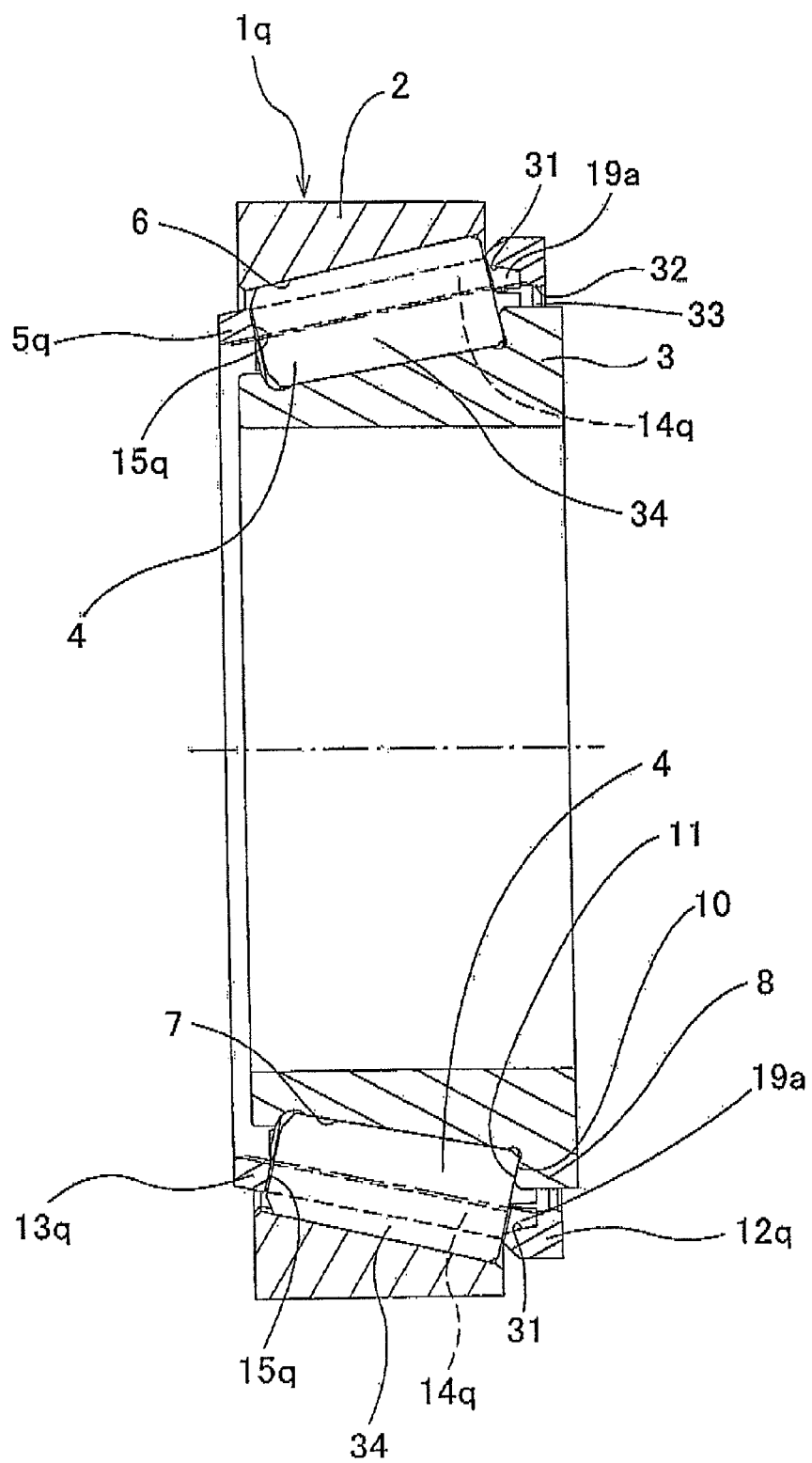
FIG. 28 is a cross-sectional view illustrating an eleventh example of an embodiment of the present invention.
Figure 29:
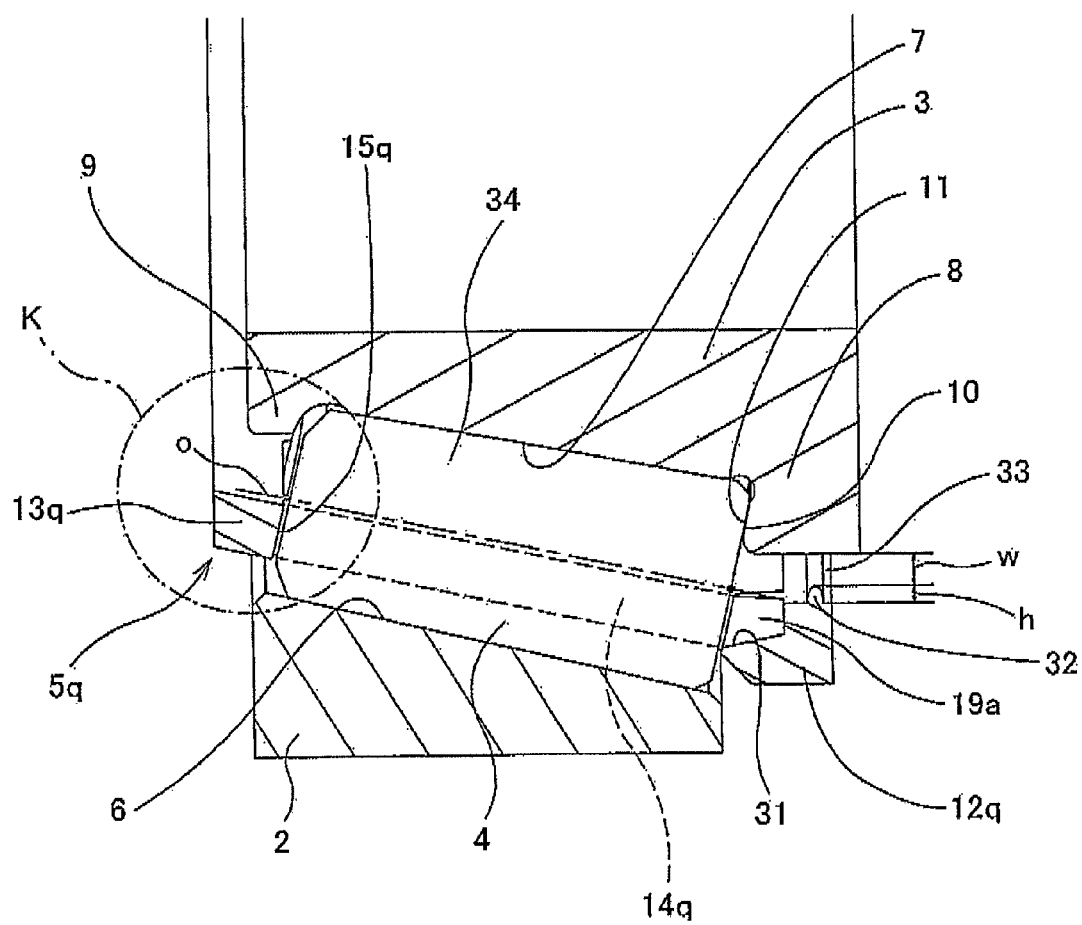
FIG. 29 is an enlarged cross-sectional view of the bottom section in FIG. 28.
Figure 30:
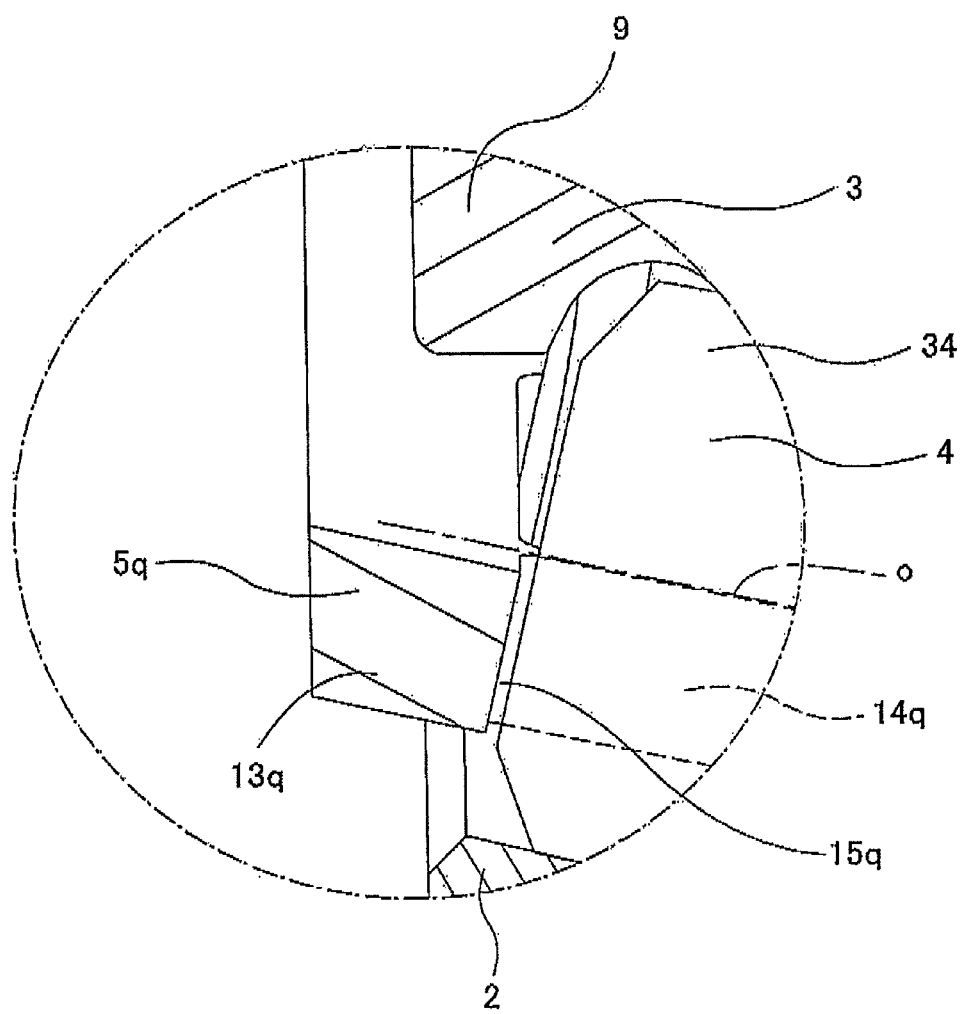
FIG. 30 is an enlarged view of part K in FIG. 29.
Figure 31:
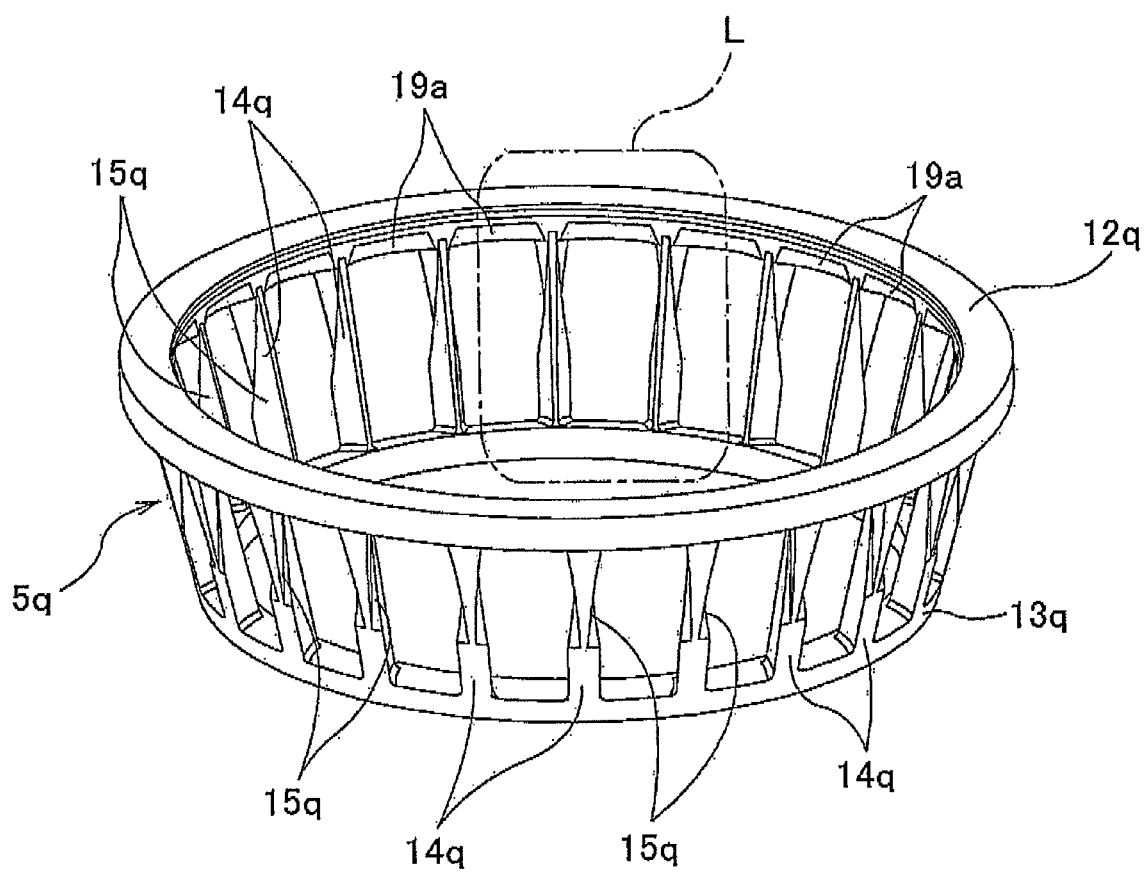
FIG. 31 is a perspective view of a retainer that is assembled in an eleventh example of an embodiment of the present invention, and illustrates the large-diameter side and the state as seen from the outside in the radial direction.
Figure 32:
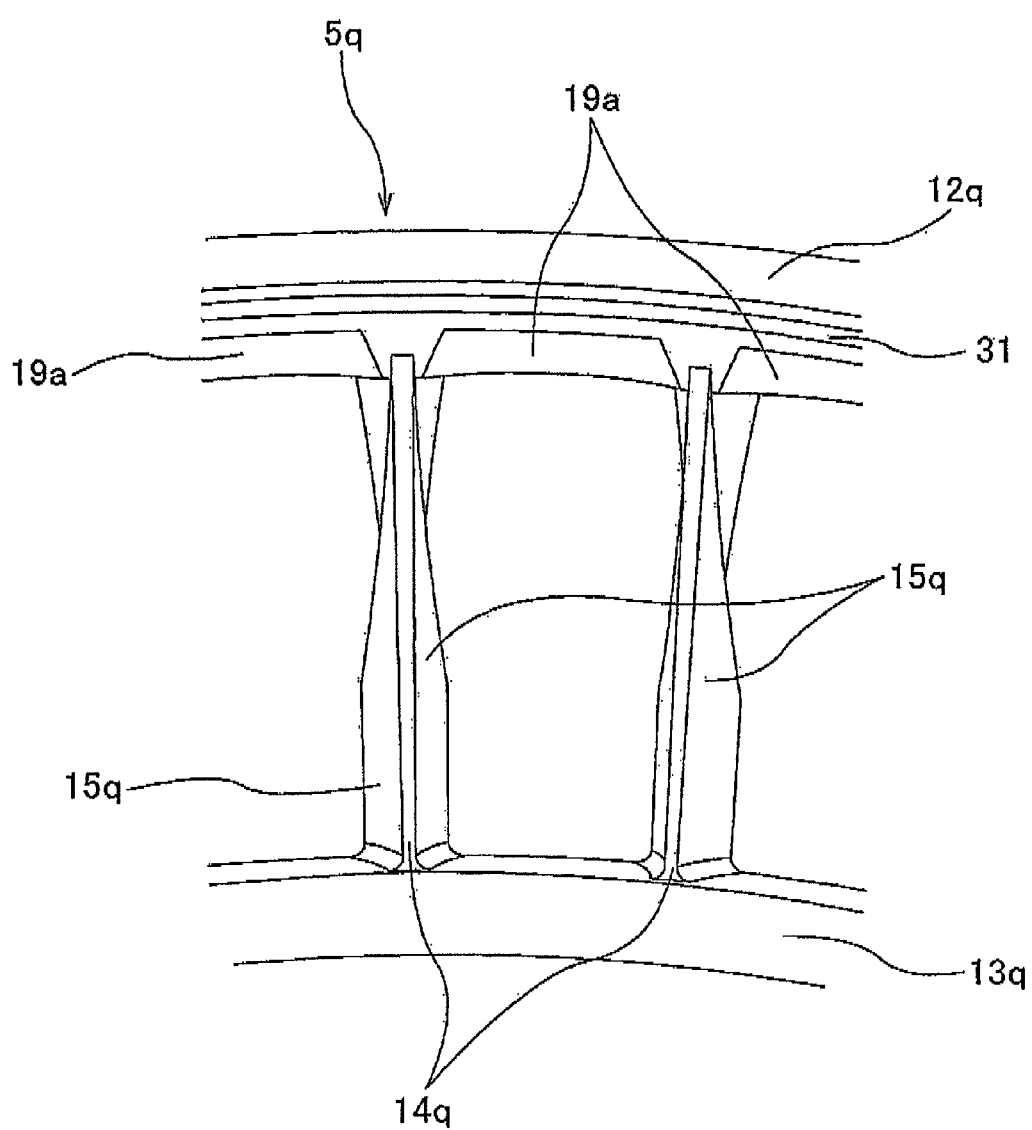
FIG. 32 is an enlarged view of part L in FIG. 31.

The results of computer simulation that was performed in order to confirm the effect of the seventh through tenth examples of the embodiment will be explained. This simulation was performed to compare the amount of lubrication oil that could be used in order to lubricate the areas of sliding contact after an adequate lubrication oil supply was stopped. As the basis of this comparison, the amount of lubrication oil that could be supplied to the areas of sliding contact after adequate lubrication oil supply was stopped in a tapered roller bearing 1 that comprised a retainer 5 made of metal plate as illustrated in FIG. 27A was taken to be "1". Except for the basic construction illustrated in FIG. 27A, the conditions other than the shape and dimensions of the large-diameter side rim section were the same for a retainer made entirely of synthetic resin. The simulation condition was the state of a small amount of lubrication (state in which the amount of supplied lubrication oil was greatly reduced from that of normal operation, and when left as is would result in seizure occurring), and the operating state was a stationary outer ring 2 and an inner ring 3 that was rotated at 3000 rpm.

The object of the simulation, in addition to the construction of the seventh example illustrated in FIG. 21 to FIG. 25 and described above and the construction of the eighth through tenth examples illustrated in FIG. 26A to FIG. 26C, includes the comparative examples 1 and 2 illustrated in FIG. 27B and FIG. 27C. Of these, the comparative example 1 that is illustrated in FIG. 27B is construction in which oil retaining concave sections 19*a* are formed on the large-diameter side section 12*o*, however the outer diameter of the large-diameter side rim section 12*o* is not particularly large. On the other hand, the comparative example 2 illustrated in FIG. 27C has construction in which the outer diameter of the large-diameter rim section 12*p* is large, however oil retaining concave sections are not provided. The comparative example 1 illustrated in FIG. 27B is merely an object for comparison for confirming the effect of the examples 7 to 10, and the construction is within the scope of the present invention.

With the construction illustrated in FIG. 27A as a reference, the results of finding the amount of lubrication oil provided for lubrication of the areas of sliding contact for the construction of examples 7 to 10 and the comparative examples 1 and 2 are given below in order from the least amount.

| | |
|---|---|
| Reference construction in FIG. 27A | 1 |
| Comparative example 1 in FIG. 27B | 1.17 |
| Comparative example 2 in FIG. 27C | 1.19 |
| Example 8 in FIG. 26A | 1.34 |
| Example 9 in FIG. 26B | 1.48 |
| Example 10 in FIG. 26C | 1.90 |
| Example 7 in FIG. 21 to FIG. 25 | 2.01 |

From the results of the simulation above, it can be seen that in the case of the seventh to tenth examples of this embodiment of the present invention, even in a state of insufficient lubrication, it is possible to more sufficiently maintain an amount of lubrication oil supplied for lubricating the areas of sliding contact. Moreover, it can also be seen that by combining the elements 1) to 3) above, it is possible to obtain an effect that is greater than the sum of the individual elements.

The time from when a state of insufficient lubrication occurs until severe damage such as seizure occurs is greatly extended by just increasing the amount of lubrication oil in the areas of sliding contact a small amount. Therefore, increasing the amount of lubrication oil in the areas of sliding contact even just a little is important for making it easier to perform adequate prevention after the occurrence of a state of insufficient lubrication such as described above.

Example 11

FIG. 28 to FIG. 32 illustrate an eleventh example of an embodiment of the present invention. In this example, at least part of the inner circumferential surface of the small-diameter side rim section 13*q* that is formed on the end section on the small-diameter side of the retainer 5*q* is located further on the outside in the radial direction of the outer ring 2 and inner ring 3 than the center axis (axis of rotation) o of the tapered rollers 4. In other words, when compared with the portion where the position in the axial direction of the tapered rollers 4 coincide, at least the inner diameter of part of the small-diameter side rim section 13*q* is larger than the pitch-circle diameter of the tapered rollers 4. In the example in the figures, all around the inner circumferential surface of the small-diameter side rim section 13*q* is located further on the outside in the radial direction of the outer ring 2 and inner ring 3 than the center axis (axis of rotation) o of the tapered rollers 4. Moreover, the portion of the small-diameter side rim section 13*q* whose inner diameter is to be increased, becomes large in the state going through the entire width of this small-diameter side rim section 13*q*.

Preferably the small-diameter-side rim section 13*q* is made large around the entire circumference, however, by making the inner diameter of at least part large, it is possible to increase the amount of lubrication oil that can be obtained. However, in regards to the portion where the inner diameter is increased, the small-diameter side rim section 13q is increased in a state passing through the width direction (axial direction).

In this example as well, as in the sixth and seventh examples, it is possible to form a ridge 32 that protrudes inward in the radial direction around the middle section in the axial direction of the inner circumferential surface of the large-diameter side rim section 12q in the portion nearer to the outside end surface of the large-diameter side rim section 12q than the oil retaining concave sections 19a. The function and effect of this construction is the same as in the sixth and seventh examples.

In this example, at least part of the inner circumferential surface of the small-diameter side rim section 13q is located further on the outside in the radial direction of the outer ring 2 and inner ring 3 than the center axis of the tapered rollers 4. Therefore, the portion near the inner diameter of the opening section on the upstream end of the internal bearing space 34 is opened wide so that there is no interference with the small-diameter side rim section 13q. Therefore, it becomes easier to take the fluid that includes the lubrication oil that exists around the tapered roller bearing 1q into the internal bearing space 34 through the opening on the upstream end. Consequently, even in a state where the amount of lubrication oil that exists around the tapered roller bearing 1q is insufficient, the lubrication oil that exists around the bearing is efficiently taken into the internal bearing space 34 and fed to the areas of sliding contact. In a state where insufficient lubrication has occurred, the lubrication oil that is fed to the areas of sliding contact is the total of the lubrication oil that is stored inside the oil retaining concave sections 19a, the lubrication oil that is stored in the portion around the inner circumferential surface of the large-diameter side rim section 12q that is nearer to the pockets 15q than the ridge 32, and the lubrication oil that is fed into the internal bearing space 34 through the opening on the upstream end. Therefore, it is possible to sufficiently lengthen the time from when a state of insufficient lubrication occurs until rotation becomes impossible due to seizure. The construction and function of other parts are the same as in some of the other examples, so the same reference numbers are given to identical or equivalent parts, and any redundant explanation is omitted.

[Testing to Confirm the Effect of Example 11]

Next, the results of computer simulation that was performed in order to confirm the effect of the invention will be explained. This simulation was performed with the object of comparing the amount of lubrication oil that was supplied to and exists in the areas of sliding contact between the end surfaces 10 on the large-diameter side of the tapered rollers 4 and the inner surface 11 in the axial direction of the large-diameter side flange section 8 when a state of insufficient lubrication occurred.

Figure 33:
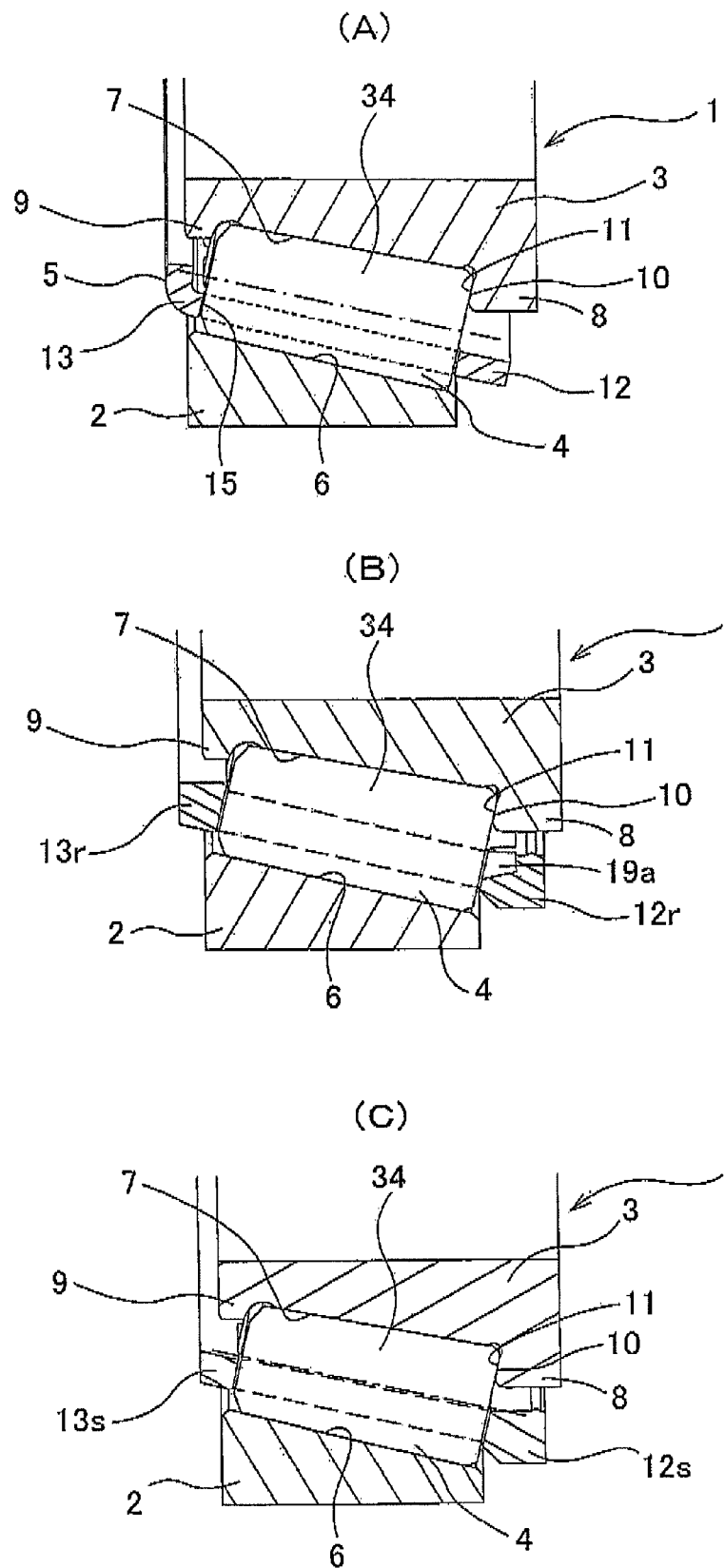
FIGS. 33A to 33C respectively illustrate basic construction, a third comparative example and a fourth comparative example for comparing with the eleventh example of an embodiment of the present invention, and are enlarged cross-sectional views similar to that of FIG. 29.

The basis for comparison is the amount of lubrication oil that exists in the areas of sliding contact in a state of insufficient lubrication inside a tapered roller bearing 1 in which a retainer 5 made of metal plate as illustrated in FIG. 33A is assembled, this amount taken to be "1". Except for the basic construction illustrated in FIG. 33A, the conditions other than the shape and dimensions of the large-diameter side rim section were the same for a retainer made entirely of synthetic resin. The simulation condition was the state of a small amount of lubrication (state in which the amount of supplied lubrication oil was greatly reduced from that of normal operation, and when left as is would result in seizure occurring), and the operating state was a stationary outer ring 2 and an inner ring 3 that was rotated at 3000 rpm.

The object of the simulation, in addition to the construction of example 11 illustrated in FIG. 28 to FIG. 32 and described above, included comparative examples 3 and 4 illustrated in FIG. 33B and FIG. 33C. Of these, the comparative example 3 illustrated in FIG. 33B is construction in which oil retaining concave sections 19a are formed in the large-diameter side rim section 12r, however the small-diameter side rim section 13r exists in the center section of the opening on the upstream end of the internal bearing space 34, or in other words, the inner circumferential surface of this small-diameter side rim 13r is located further inside in the radial direction than the center axis of the tapered rollers 4. On the other hand, the comparative example 4 illustrated in FIG. 33C is construction in which the inner circumferential surface of the small-diameter side rim section 13s is located further on the outside in the radial direction than the center axis of the tapered rollers 4, and there are no oil retaining concave sections. The comparative example illustrated in FIG. 33B is merely for comparison for confirming the effect of example 11, and the construction thereof is within the scope of the present invention.

With the construction illustrated in FIG. 33A as a reference, the results that were found for the amount of lubrication oil supplied to the areas of sliding contact in the case of the construction of example 11 of the embodiment of the present invention, and the construction of comparative examples 3 and 4 described above are illustrated in FIG. 34.

Figure 34:
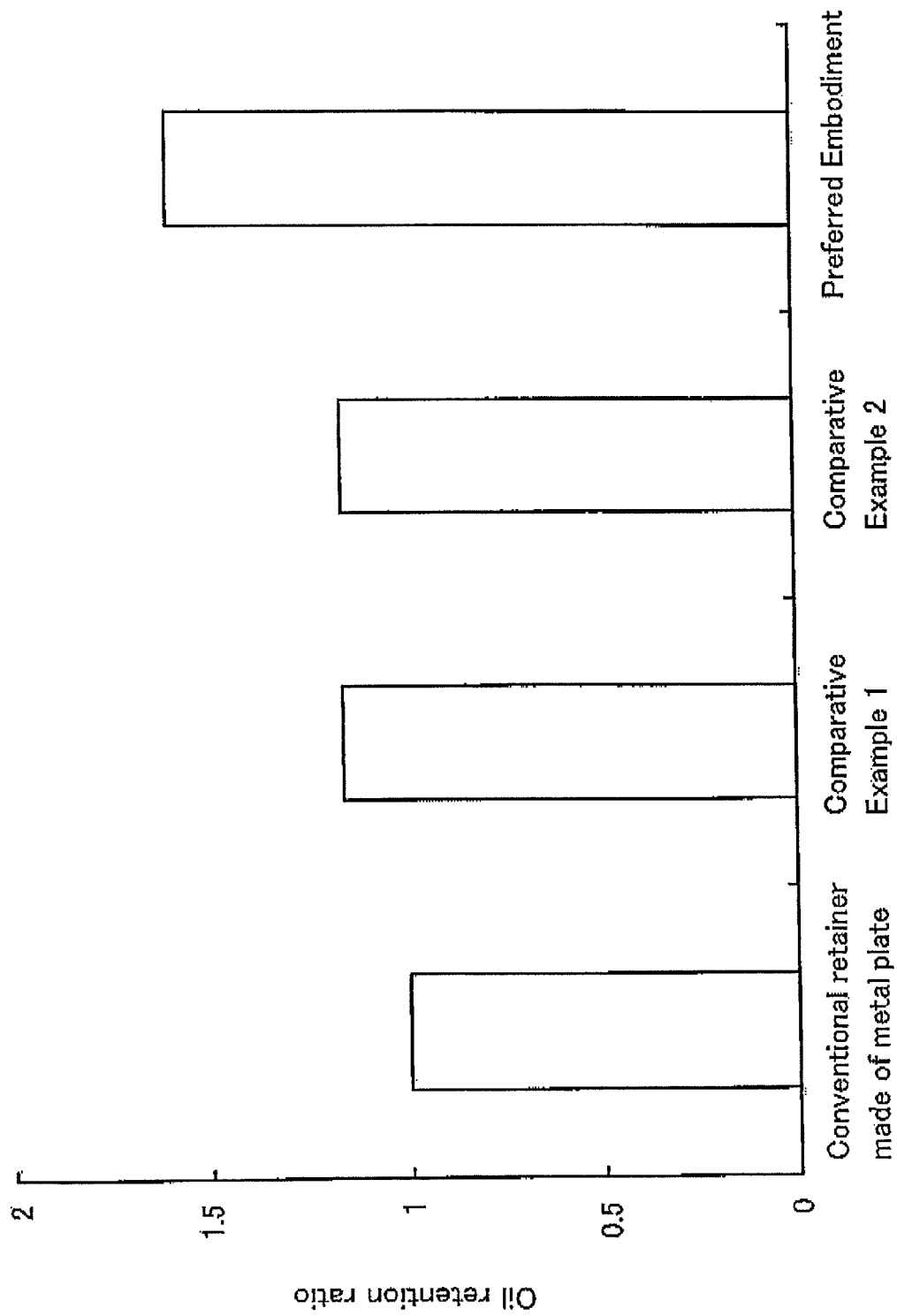
FIG. 34 is a bar graph illustrating the simulation results for confirming the results of the eleventh example of an embodiment of the present invention.

From the simulation results illustrate in FIG. 34, it can be seen that in the case of the eleventh example of the embodiment of the present invention, it is possible to maintain an amount of supplied lubrication oil for lubrication of the areas of sliding contact even in a state of insufficient lubrication. Particularly, it can be seen that by using a small-diameter side rim section 13q having a large inner diameter together with forming oil retaining concave sections 19a it is possible to greatly increase the amount of lubrication oil that can be supplied to the areas of sliding contact when compared with the case of using each respective construction separately, or in other words, the amount can be increased more than the total of these individual effects. More specifically, in the case of individual construction, the amount could be increased about 1.16 times that of the reference construction, however, by combining construction, it is possible to increase the amount by approximately 1.6 times.

The time from when a state of insufficient lubrication occurs until severe damage such as seizure occurs can be greatly extended by simply increasing the amount of lubrication oil in the areas of sliding contact by just a small amount. Therefore, in order to make it easier to perform adequate prevention after a state of insufficient lubrication occurs such as described above, it is important to increase the amount of lubrication oil in the areas of sliding contact by even a small amount.

INDUSTRIAL APPLICABILITY

The tapered roller bearing of the present invention is not limited to being used to support an axle of a railway car, the transmission shaft of a drive apparatus, or the pinion shaft of a differential gear of an automobile, but can also be used for supporting various kinds of rotating shafts that rotate in a state of large radial loading and thrust loading, such as the main shaft in machine tools or rotating shafts in various kinds of industrial machinery.

EXPLANATION OF REFERENCE NUMBERS 1, 1a to 1t Tapered roller bearing
2, 2a Outer ring 3, 3a Inner ring
4, 4a Tapered roller
5, 5a to 5t Retainer
6, 6a Outer raceway
7, 7a Inner raceway
8 Large-diameter side flange section
9 Small-diameter side flange section
10 End surface on the large-diameter side
11 Inside surface in the axial direction
12, 12a to 12s Large-diameter side rim section
13, 13a to 13t Small-diameter side rim section
14, 14a to 14t Column section
15, 15a to 15t Pocket
16 Bent plate section
17, 17a Oil retaining section
18 Partition plate section
19, 19a Oil retaining concave section
20 Concave section
21 Internal bearing space
22, 22a Die
23, 23a Die
24, 24a Die apparatus
25 Dam
26 Stepped section
27 Concave molding section
28 Convex molding section
29a, 29b Flat surface
30 Convex sections for forming oil retaining concave sections
31 Bottom surface of the oil retaining concave section
32 Ridge
33 Annular clearance
34 Internal bearing space
35 Annular clearance

What is claimed is:

1. A tapered roller bearing, comprising:
an outer ring having a tapered concave shaped outer raceway formed around an inner circumferential surface thereof;
an inner ring that is placed on an inner-diameter side of the outer ring so as to be concentric with the outer ring, and has a tapered convex shaped inner raceway formed around an outer circumferential surface thereof, and a large-diameter side flange section that protrudes outward in a radial direction from an end section on a large-diameter side of the inner raceway;
a plurality of tapered rollers that are placed between the inner raceway and the outer raceway so as to be able to roll freely and such that an end surface on a large-diameter side of the rollers face a side surface in the axial direction of the large-diameter side flange section; and
a retainer made of synthetic resin for holding the tapered rollers;
the retainer comprising:
a large-diameter side rim section and a small-diameter side rim section that are ring shaped and that are placed concentric with each other about a center axis and spaced apart in the axial direction, and a plurality of column sections that span between both of the rim sections such that portions that are surrounded by both rim sections and a pair of column sections that are adjacent to each other in the circumferential direction form pockets for holding the tapered rollers; and
oil retaining concave sections that are recessed outward in the radial direction are formed in portions of the inner circumferential surface of the large-diameter side rim section which coincide with the pockets in the circumferential direction, so as to be independent from each other a portion of a bottom surface of each of the oil retaining concave section that is the deepest with respect to the inner circumferential surface of the large-diameter side rim section being open toward each of the pockets,
the deepest portion of the bottom surface of each of the oil retaining concave sections that is open to an inner surface of each of the pockets faces toward the end surface on the large-diameter side of the tapered roller that is held inside the pocket, and
the bottom surfaces of the oil retaining concave sections are inclined in a direction outward in the radial direction going toward the pockets with respect to the center axis of the retainer.

2. A tapered roller bearing, comprising:
an outer ring having a partial tapered concave shaped outer raceway formed around an inner circumferential surface thereof;
an inner ring that is placed on an inner-diameter side of the outer ring so as to be concentric with the outer ring, and has a partial tapered convex inner raceway formed around an outer circumferential surface thereof, and a large-diameter side flange section that protrudes outward in the radial direction from an end section on the large-diameter side of the inner raceway;
a plurality of tapered rollers that are placed between the inner raceway and the outer raceway so as to be able to roll freely and such that an end surface on the large-diameter side of the rollers face a side surface in the axial direction of the large-diameter side flange section; and
a retainer for holding the tapered rollers;
the retainer comprising:
a large-diameter side rim section and a small-diameter side rim section that are ring shaped and that are placed concentric with each other about a center axis and spaced apart in the axial direction, and a plurality of column sections that span between both of the rim sections such that portions that are surrounded by both rim sections and a pair of column sections that are adjacent to each other in the circumferential direction form pockets for holding the tapered rollers; and
an oil retaining concave section that is recessed outward in the radial direction are formed in a portion of the inner circumferential surface of the large-diameter side rim section which coincides with at least part of the pockets in the circumferential direction, so as to be independent from each other, a portion of the bottom surface of each of the oil retaining concave section that is the deepest with respect to the inner circumferential surface of the large-diameter side run section being open toward each if the pockets,
the deepest portion of the bottom surface of each of the oil retaining concave sections that is open to an inner surface of each of the pockets faces toward the end surface on the large-diameter side of the tapered roller that is held inside the pocket,
a cross-sectional shape of each of the oil retaining concave sections in a plane perpendicular to a center axis of the retainer is a circular arc shape,
a curvature radius of the cross-sectional circular arc shape of the bottom surface of each of the oil retaining concave sections is less than a curvature radius of the inner circumferential surface of the large-diameter side rim section, and
the inner circumferential surface of the large-diameter side rim section, is a cylindrical shape surface that is parallel with the center axis if the retainer, or is an inclined surface that inclines in a direction outward in the radial direction going toward the pocket side with respect to the center axis of the retainer.

3. The tapered roller bearing according to claim 2, wherein the oil retaining concave section has a depth in a direction that is recessed outward in the radial direction more than the inner circumferential surface of the large-diameter side rim section from an end section on the opening side on the pocket side to a back end section on the side of the surface on the outside end, such that a dam is formed that blocks an inside section of the oil retaining concave section and the surface on the outside end of the large-diameter rim section.

4. The tapered roller bearing according to claim 2, wherein the bottom surface of the oil retaining concave sections is inclined in a direction outward in the radial direction going toward the pocket.

5. The tapered roller bearing according to claim 2, wherein the position in the radial direction of an edge on the inside end of an outer circumferential surface of the large-diameter rim section, the edge on the inside end thereof being one of end edges in the axial direction of the outer circumferential surface that is near the end surface on the large-diameter side of each of the tapered rollers, is located further on the outside in the radial direction of the inner ring and the outer ring than the position in the radial direction of an intersecting point between a generating line of the inner circumferential surface of the outer ring and a generating line of the end surface on the large-diameter side of the outer ring.

6. The tapered roller bearing according to claim 5, wherein the position in the radial direction of an edge on the inside end of the inner circumferential surface of the large-diameter rim section, the edge on the inside end thereof being one of end edges in the axial direction of the inner circumferential surface that is near the end surface on the large-diameter side of each of the tapered rollers, is located further on the inside in the radial direction of the inner ring and the outer ring than the position in the radial direction of a center point of the end surface on the large-diameter side of each of the tapered rollers.

7. The tapered roller bearing according to claim 2, wherein a ridge that protrudes inward in the radial direction is formed around the entire circumference of part of the inner circumferential surface of the large-diameter side rim section that is nearer the surface on the outside end of the large-diameter side rim section than the oil retaining concave section.

8. The tapered roller bearing according to claim 2, wherein an inner circumferential surface of the small-diameter side rim section is located further on the outside in the radial direction of the inner ring and outer ring than the center axis of each of the tapered rollers.

9. The tapered roller bearing according to claim 2, wherein the retainer is made by feeding pressurized molten thermoplastic synthetic resin through a plurality of feed opening into a formation space of a die apparatus, and a weld is formed by collision between the molten synthetic resins that are fed from different feed openings, in a portion of the retainer that is separated from connecting sections between the rim sections and the column sections.

10. The tapered roller bearing according to claim 2, wherein the tapered roller bearing is located between a driving source and drive wheels of a vehicle, and is used for supporting a rotating shaft of a vehicle drive system that transmits a rotation driving force of the drive source to the drive wheels.

* * * * *